(12) United States Patent
Takahashi et al.

(10) Patent No.: US 11,330,300 B2
(45) Date of Patent: May 10, 2022

(54) ENCODING DEVICE AND ENCODING METHOD, AND DECODING DEVICE AND DECODING METHOD

(71) Applicant: SONY CORPORATION, Tokyo (JP)

(72) Inventors: Yoshitomo Takahashi, Kanagawa (JP); Ohji Nakagami, Tokyo (JP)

(73) Assignee: SONY CORPORATION, Tokyo (JP)

( * ) Notice: Subject to any disclaimer, the term of this patent is extended or adjusted under 35 U.S.C. 154(b) by 795 days.

(21) Appl. No.: 14/649,704

(22) PCT Filed: Nov. 28, 2013

(86) PCT No.: PCT/JP2013/082013
§ 371 (c)(1),
(2) Date: Jun. 4, 2015

(87) PCT Pub. No.: WO2014/091933
PCT Pub. Date: Jun. 19, 2014

(65) Prior Publication Data
US 2015/0319461 A1 Nov. 5, 2015

(30) Foreign Application Priority Data

Dec. 11, 2012 (JP) .............................. JP2012-270408

(51) Int. Cl.
*H04N 19/59* (2014.01)
*H04N 19/57* (2014.01)
(Continued)

(52) U.S. Cl.
CPC ......... *H04N 19/597* (2014.11); *H04N 19/577* (2014.11); *H04N 19/70* (2014.11); *H04N 13/161* (2018.05)

(58) Field of Classification Search
None
See application file for complete search history.

(56) References Cited

U.S. PATENT DOCUMENTS

2010/0020871 A1* 1/2010 Hannuksela ......... H04N 21/438
375/240.12
2010/0091845 A1 4/2010 Jeon et al.

FOREIGN PATENT DOCUMENTS

CN 101491095 A 7/2009
JP 2009-532934 9/2009
(Continued)

OTHER PUBLICATIONS

Apr. 12, 2016, European Search Report for related EP Application No. 13861701.4.
(Continued)

*Primary Examiner* — Mikhail Itskovich
(74) *Attorney, Agent, or Firm* — Paratus Law Group, PLLC

(57) ABSTRACT

The present technology relates to an encoding device, an encoding method, a decoding device, and a decoding method capable of improving the coding efficiency of an image of a plurality of viewpoints. A motion parallax prediction/compensation unit sets first image specifying information specifying a first image of a viewpoint present in a first direction from a viewpoint of a current coding image and second image specifying information specifying a second image of a viewpoint present in a second direction opposite to the first direction in a list (L0) in first order and sets the first image specifying information and the second image specifying information in a list (L1) in second order that is different from the first order. The motion parallax prediction/compensation unit and a calculation unit generate coded data by coding the current coding image based on the lists (L0 and L1). The present technology, for example, can be applied to an encoding device that codes a 3D image and the like.

9 Claims, 41 Drawing Sheets

(51) Int. Cl.
*H04N 19/70* (2014.01)
*H04N 13/161* (2018.01)
*H04N 19/597* (2014.01)
*H04N 19/577* (2014.01)

(56) References Cited

FOREIGN PATENT DOCUMENTS

| | | |
|---|---|---|
| JP | 2012-169763 | 9/2012 |
| JP | 2012169763 A | 9/2012 |
| WO | WO2007/114608 A1 | 10/2007 |
| WO | WO2011/013257 A1 | 1/2010 |

OTHER PUBLICATIONS

Rusert, et al., "AHG7: MV-HEVC inter-view reference picture list construction based on ViewId", Joint Collaborative Team on 3D Video Coding Extensions of ITU-T SG16 WP3 and ISO/IEC JTC1/SC29/WG11, Apr. 20-26, 2013, pp. 1-8, 4$^{th}$ Meeting: Incheon, KR.

Chen, et al., "On MVC reference picture list construction", Joint Video Team (JVT) of ISO/IEC MPEG & ITU-T VCEG (ISO/IEC JTC1/SC29/WG11 and ITU-T SG16 Q.6), Jan. 13-19, 2007, pp. 1-9.

Gerhard Tech, et al., MV-HEVC Working Draft 2, Joint Collaborative Team on 3D Video Coding Extension Development of ITU-T SG 16 WP 3 and ISO/IEC JTC 1/SC 29/WG 11, Oct. 13-19, 2012, pp. i-18, 2$^{nd}$ Meeting: Shanghai, CN.

Gerhard Tech, et al., MV-HEVC Working Draft 1, Joint Collaborative Team on 3D Video Coding Extension Development of ITU-T SG 16 WP 3 and ISO/IEC JTC 1/SC 29/WG 11, Jul. 16-20, 2012, pp. i-16, 1st Meeting: Stockholm, SE.

Gerhard Tech, et al., 3D-HEVC Test Model 1, Joint Collaborative Team on 3D Video Coding Extension Development of ITU-T SG 16 WP 3 and ISO/IEC JTC 1/SC 29/WG 11, Jul. 16-20, 2012, pp. 1-83, 1$^{st}$ Meeting: Stockholm, SE.

Jul. 13, 2017, JP communication issued for related JP application No. JP2014-551966.

Sep. 22, 2017, Chinese Office Action issued for related CN application No. 201380063924.X.

* cited by examiner

FIG. 1
(Prior Art)

| | | Descriptor |
|---|---|---|
| 1 | vps_extension() { | |
| 2 | while(!byte_aligned()) | |
| 3 | vps_extension_byte_alignment_reserved_one_bit | u(1) |
| 4 | num_additional_layer_operation_points | u(8) |
| 5 | num_additional_profile_level_sets | u(8) |
| 6 | for (i=0; i<=vps_max_layers_minus1; i++) { | |
| 7 | //mapping of layer ID to scalability dimension IDs | |
| 8 | num_types_zero_4bits[i] | u(4) |
| 9 | type_zero_4bits[i] | u(4) |
| 10 | view_id[i] | u(8) |
| 11 | if(i>0) | |
| 12 | num_direct_ref_layers[i] | u(6) |
| 13 | for (j=0; j<num_direct_ref_layers[i]; j++) | |
| 14 | ref_layer_id[i][j] | u(6) |
| 15 | } | |
| 16 | for (i=0; i<=num_additional_profile_level_sets; i++) { | |
| 17 | profile_tier_level(1,vps_max_sub_layers_minus1) | |
| 18 | for (i=0; i<num_additional_layer_operation_points; i++) { | |
| 19 | op_point(i) | |
| 20 | if(num_additional_profile_level_sets>0) | |
| 21 | profile_level_idx[i] | u(8) |
| 22 | } | |
| 23 | } | |

FIG. 5

| | | Descriptor |
|---|---|---|
| 1 | vps_extension( ) { | |
| 2 | while(!byte_aligned( )) | |
| 3 | vps_extension_byte_alignment_reserved_one_bit | u(1) |
| 4 | num_additional_layer_operation_points | u(8) |
| 5 | num_additional_profile_level_sets | u(8) |
| 6 | view_order_idc | u(2) |
| 7 | for(i=0;i<=vps_max_layers_minus1;i++) { | |
| 8 | //mapping of layer ID to scalability dimension IDs | |
| 9 | num_types_zero_4bits[i] | u(4) |
| 10 | type_zero_4bits[i] | u(4) |
| 11 | view_id[i] | u(8) |
| 12 | if(i>0) | |
| 13 | num_direct_ref_layers[i] | u(6) |
| 14 | for(j=0;j<num_direct_ref_layers[i];j++) | |
| 15 | ref_layer_id[i][j] | u(6) |
| 16 | } | |
| 17 | for(i=0;i<=num_additional_profile_level_sets;i++) { | |
| 18 | profile_tier_level(1,vps_max_sub_layers_minus1) | |
| 19 | for(i=0;i<num_additional_layer_operation_points;i++) { | |
| 20 | op_point(i) | |
| 21 | if(num_additional_profile_level_sets>0) | |
| 22 | profile_level_idx[i] | u(8) |
| 23 | } | |
| 24 | } | |

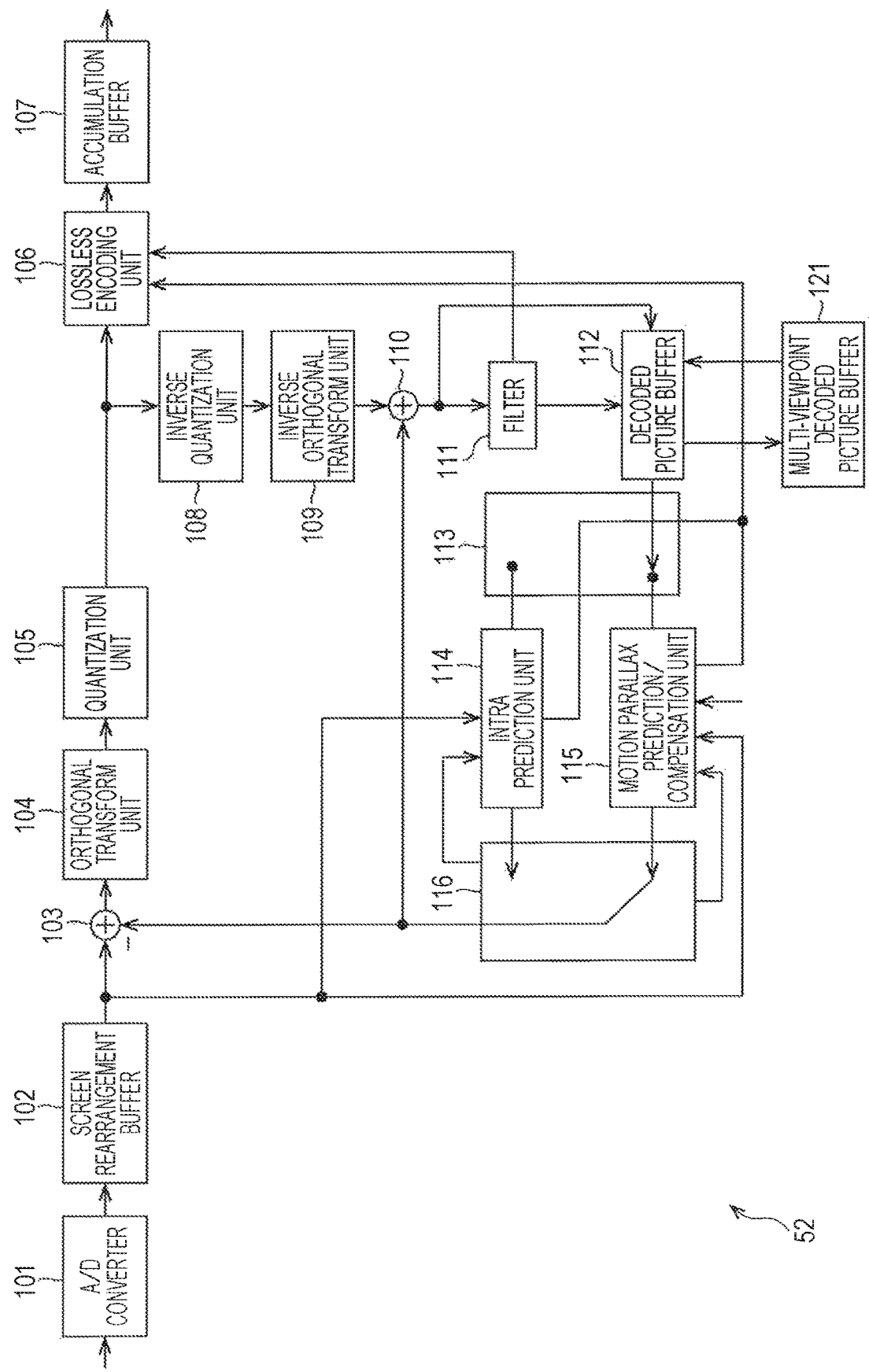

FIG. 8

```
1: tx=(16384+(Abs(td)>>1))/td
2: distScaleFactor=Clip3(-4096,4095,(tb*tx+32)>>6)
3: mvLXA=Clip3(-32768,32767,Sign2(distScaleFactor*mvLXA)*
4:    ((Abs(distScaleFactor*mvLXA)+127)>>8))
5: where td and tb are derived as
6:        1. If RefPicListX[refIdxLX]is inter reference picture,
7:           td=Clip3(-128,127,PicOrderCntVal-PicOrderCnt(refPicListA[refIdxA]))
8:           tb=Clip3(-128,127,PicOrderCntVal-PicOrderCnt(RefPicListX[refIdxLX]))
9:        1.Otherwise, if RefPicListX[refIdxLX]is inter-view reference picture,
10:          td=Clip3(-128,127,ViewOrderIdxVal-ViewOrderIdx(refPicListA[refIdxA]))
11:          tb=Clip3(-128,127,ViewOrderIdxVal-ViewOrderIdx(RefPicListX[refIdxLX]))
```

FIG. 9

```
1:  The following applies:
2:  for(i=0; i<NumIvCurr; i++)
3:  RefPicSetIvCurr[i]="inter-view reference picture with layer identifier equal to LayerIdInterView[i]"
4:
5:  rIdx=0
6:  while(rIdx<NumRpsCurrTempList0) {
7:      for(i=0; i<NumPocStCurrBefore && rIdx<NumRpsCurrTempList0; rIdx++, i++)
8:          RefPicListTemp0[rIdx]=RefPicSetStCurrBefore[i]
9:      for(i=0; i<NumPocStCurrAfter && rIdx<NumRpsCurrTempList0; rIdx++, i++)
10:         RefPicListTemp0[rIdx]=RefPicSetStCurrAfter[i]
11:     for(i=0; i<NumPocLtCurr && rIdx<NumRpsCurrTempList0; rIdx++, i++)
12:         RefPicListTemp0[rIdx]=RefPicSetLtCurr[i]
13:     for(i=0; i<NumIvCurr && rIdx<NumRpsCurrTempList0; rIdx++, i++)
14:         RefPicListTemp0[rIdx]=RefPicSetIvCurr[i]
15: }
16:
17: rIdx=0
18: while(rIdx<NumRpsCurrTempList1) {
19:     for(i=0; i<NumPocStCurrAfter && rIdx<NumRpsCurrTempList1; rIdx++, i++)
20:         RefPicListTemp1[rIdx]=RefPicSetStCurrAfter[i]
21:     for(i=0; i<NumPocStCurrBefore && rIdx<NumRpsCurrTempList1; rIdx++, i++)
22:         RefPicListTemp1[rIdx]=RefPicSetStCurrBefore[i]
23:     for(i=0; i<NumPocLtCurr && rIdx<NumRpsCurrTempList1; rIdx++, i++)
24:         RefPicListTemp1[rIdx]=RefPicSetLtCurr[i]
25:     for(i=0; i<NumIvCurr && rIdx<NumRpsCurrTempList1; rIdx++, i++)
26:         RefPicListTemp1[rIdx]=RefPicSetIvCurr[i]
```

FIG. 11

```
1:  The following applies:
2:  If(view_order_idc == 0 || view_order_idc == 1){
3:    j=0; k=0;
4:    for(i=0;i<NumIvCurr;i++){
5:      if(LayerIdInterView[i]<view_id)
6:        RefPicSetIvCurrBefore[j++] = "inter-view reference picture with layer identifier equal to LayerIdInterView[i]"
7:      else if(LayerIdInterView[i]>view_id)
8:        RefPicSetIvCurrAfter[k++] = "inter-view reference picture with layer identifier equal to LayerIdInterView[i]"
9:    }
10: }
11: rIdx=0
12: while(rIdx<NumRpsCurrTempList0) {
13:   for( i=0; i<NumPocStCurrBefore && rIdx<NumRpsCurrTempList0;rIdx++, i++)
14:     RefPicListTemp0[rIdx]=RefPicSetStCurrBefore[i]
15:   for( i=0; i<NumPocStCurrAfter && rIdx<NumRpsCurrTempList0;rIdx++, i++)
16:     RefPicListTemp0[rIdx]=RefPicSetStCurrAfter[i]
17:   for( i=0; i<NumPocLtCurr && rIdx<NumRpsCurrTempList0;rIdx++, i++)
18:     RefPicListTemp0[rIdx]=RefPicSetLtCurr[i]
19:   for( i=0; i<j && rIdx<NumRpsCurrTempList0;rIdx++, i++)
20:     RefPicListTemp0[rIdx]=RefPicSetIvCurrBefore[i]
21:   for( i=0; i<k && rIdx<NumRpsCurrTempList0;rIdx++, i++)
22:     RefPicListTemp0[rIdx]=RefPicSetIvCurrAfter[i]
23: }
24: rIdx=0
25: while(rIdx<NumRpsCurrTempList1 ) {
26:   for( i=0; i<NumPocStCurrAfter && rIdx<NumRpsCurrTempList1;rIdx++, i++ )
27:     RefPicListTemp1[rIdx]=RefPicSetStCurrAfter[i]
28:   for( i=0; i<NumPocStCurrBefore && rIdx<NumRpsCurrTempList1;rIdx++, i++)
29:     RefPicListTemp1[rIdx]=RefPicSetStCurrBefore[i]
30:   for( i=0; i<NumPocLtCurr && rIdx<NumRpsCurrTempList1;rIdx++, i++)
31:     RefPicListTemp1[rIdx]=RefPicSetLtCurr[i]
32:   for( i=0; i<k && rIdx<NumRpsCurrTempList1;rIdx++, i++)
33:     RefPicListTemp0[rIdx]=RefPicSetIvCurrAfter[i]
34:   for( i=0; i<j && rIdx<NumRpsCurrTempList1;rIdx++, i++)
35:     RefPicListTemp0[rIdx]=RefPicSetIvCurrBefore[i]
36: }
```

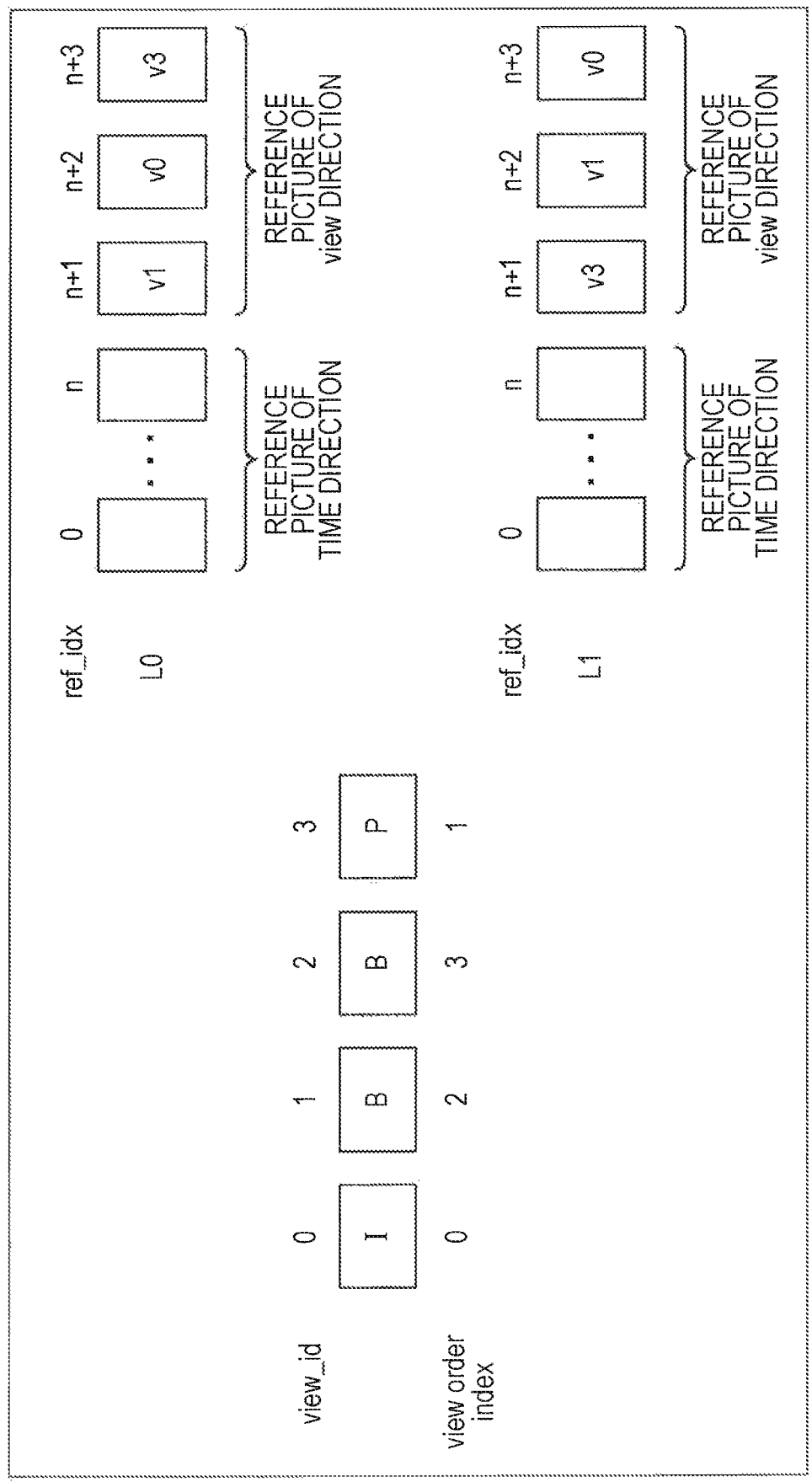

FIG. 22

| | | Descriptor |
|---|---|---|
| 1 | vps_extension() { | |
| 2 | while( !byte_aligned( ) ) | |
| 3 | vps_extension_byte_alignment_reserved_one_bit | u(1) |
| 4 | num_additional_layer_operation_points | u(8) |
| 5 | num_additional_profile_level_sets | u(8) |
| 6 | for(i=0;i<=vps_max_layers_minus1;i++) { | |
| 7 | //mapping of layer ID to scalability dimension IDs | |
| 8 | num_types_zero_4bits[i] | u(4) |
| 9 | type_zero_4bits[i] | u(4) |
| 10 | view_id[i] | u(8) |
| 11 | inter_view_default_reference_flag | u(1) |
| 12 | inter_view_scaling_flag | u(1) |
| 13 | if(i>0) { | |
| 14 | num_direct_ref_layers[i] | u(6) |
| 15 | for(j=0;j<num_direct_ref_layers[i];j++) | |
| 16 | ref_layer_id[i][j] | u(6) |
| 17 | } | |
| 18 | for(i=0;i<=num_additional_profile_level_sets;i++) | |
| 19 | profile_tier_level(1, vps_max_sub_layers_minus1) | |
| 20 | for(i=0;i<num_additional_layer_operation_points;i++) { | |
| 21 | op_point(i) | |
| 22 | if(num_additional_profile_level_sets>0) | |
| 23 | profile_level_idx[i] | u(8) |
| 24 | } | |
| 25 | } | |

FIG. 30

| | | Descriptor |
|---|---|---|
| 1 | vps_extension() { | |
| 2 | while(!byte_aligned()) | |
| 3 | vps_extension_byte_alignment_reserved_one_bit | u(1) |
| 4 | num_additional_layer_operation_points | u(8) |
| 5 | num_additional_profile_level_sets | u(8) |
| 6 | for(i=0; i<=vps_max_layers_minus1; i++) { | |
| 7 | //mapping of layer ID to scalability dimension IDs | |
| 8 | num_types_zero_4bits[i] | u(4) |
| 9 | type_zero_4bits[i] | u(4) |
| 10 | view_id[i] | u(8) |
| 11 | inter_view_default_reference_flag | u(1) |
| 12 | if(i>0) | |
| 13 | num_direct_ref_layers[i] | u(6) |
| 14 | for(j=0; j<num_direct_ref_layers[i]; j++) { | |
| 15 | ref_layer_id[i][j] | u(6) |
| 16 | inter_view_scaling_factor[i][j] | u(8) |
| 17 | } | |
| 18 | } | |
| 19 | for(i=0; i<=num_additional_profile_level_sets; i++) | |
| 20 | profile_tier_level(1, vps_max_sub_layers_minus1) | |
| 21 | for(i=0; i<num_additional_layer_operation_points; i++) { | |
| 22 | op_point(i) | |
| 23 | if(num_additional_profile_level_sets>0) | |
| 24 | profile_level_idx[i] | u(8) |
| 25 | } | |
| 26 | } | |

ENCODING DEVICE AND ENCODING METHOD, AND DECODING DEVICE AND DECODING METHOD

TECHNICAL FIELD

The present technology relates to an encoding device, an encoding method, a decoding device, and a decoding method, and particularly to an encoding device, an encoding method, a decoding device, and a decoding method capable of improving coding efficiency of an image of a plurality of viewpoints.

BACKGROUND ART

Recently, standardization of a coding system (hereinafter, referred to as a 3D coding system) of a 3D image that is based on an HEVC (High Efficiency Video Coding) system has progressed (for example, Non-patent Documents 1 and 2).

FIG. 1 is a diagram that illustrates an example of the syntax of a VPS (Video Parameter Set) of a 3D coding system.

As illustrated in the 10th row of FIG. 1, in the VPS, a view ID (view_id) that uniquely identifies each viewpoint (view) of an image corresponding to the VPS is set. In addition, as illustrated in the 11th row to 14th row, in the VPS, the number (num_direct_ref_layers) of reference images of an image of each viewpoint and reference image specifying information (ref_layer_id) specifying the reference images are set.

Each view ID, for example, is used for representing a reference relation between viewpoints and corresponds to the reference image specifying information. Here, the view IDs may be assigned regardless of the arrangement of cameras. More specifically, for example, as illustrated in FIG. 2, a 3D image is configured by images of five viewpoints, and, in a case where cameras 11 to 15 photographing the 3D image are arranged such that each camera is arranged in an oblique direction with the camera 13 being located at the center, view IDs, for example, may be assigned as illustrated in A of FIG. 2 or B of FIG. 2.

In other words, as illustrated in A of FIG. 2, a view ID "0" may be assigned to the camera 13 located at the center, and view IDs "1", "2", "3", and "4" may be assigned in order of the camera 11 located on the upper left side of the camera 13, the camera 12 located on the upper right side, the camera 14 located on the lower left side, and the camera 15 located on the lower right side. Alternatively, as illustrated in B of FIG. 2, view IDs "0" to "4" may be assigned to the cameras 11 to 15 in the raster scanning order.

In addition, as illustrated in FIG. 3, in a case where the 3D image is configured by images of five viewpoints, and the cameras 31 to 35 photographing the 3D image are sequentially aligned from the left side in the horizontal direction, the view IDs, for example, may be assigned as illustrated in A of FIG. 3 or B of FIG. 3.

In other words, as illustrated in A of FIG. 3, the view IDs "0" to "4" may be assigned sequentially from the left end of the cameras 31 to 35. Alternatively, as illustrated in B of FIG. 3, a view ID "0" may be assigned to the camera 33 located at the center, and view IDs "1" to "4" may be assigned to the remaining cameras sequentially from the left side to the right side in order of highest degree of closeness to the camera 33.

As above, since the view IDs may be assigned regardless of the arrangement of the cameras, a user can freely assign the view IDs regardless of the arrangement of the cameras. Furthermore, the arrangement of the cameras may be formed as an arrangement to which it is difficult to regularly assign the view IDs.

However, even in a case where the arrangement of the cameras is a one-dimensional arrangement, it cannot be determined that the view IDs are assigned sequentially from the end, and thus, the arrangement of the cameras cannot be recognized based on the view IDs. Accordingly, by coding an image of a plurality of viewpoints by using the view IDs as information representing the positions of the viewpoints, the coding efficiency cannot be improved.

CITATION LIST

Non-Patent Document

Non-patent Document 1: Gerhard Tech, Krzysztof Wegner, Ying Chen, Miska Hannuksela, "MV-HEVC Working Draft 1", JCT3V-A1004 (version 1), 2012. 8. 21

Non-patent Document 2: Gerhard Tech, Krzysztof Wegner, Ying Chen, Miska Hannuksela, "MV-HEVC Working Draft 2", JCT3V-B1004 (version 1), 2012. 11. 7

SUMMARY OF THE INVENTION

Problems to be Solved by the Invention

However, in the 3D coding system, it is devised to set an image of a viewpoint different from that of a current predicting image as a reference image. In such a case, reference images of viewpoints different from that of the current predicting image are registered (set) in the same order in both a list L0 that is a list of reference images of which the POCs (Picture Order Count) are before that of the current predicting image and a list L1 that is a list of reference images of which the POCs are after that of the current predicting image. As a result, the coding efficiency cannot be sufficiently improved.

The present technology is devised in consideration of such a situation and is capable of improving the coding efficiency of an image of a plurality of viewpoints.

Solutions to Problems

An encoding device of a first aspect of the present technology includes: a setting unit that sets first image specifying information specifying a first image of a viewpoint present in a first direction from a viewpoint of a current coding image and second image specifying information specifying a second image of a viewpoint present in a second direction opposite to the first direction in a first reference list in first order and sets the first image specifying information and the second image specifying information in a second reference list in second order that is different from the first order; and an encoding unit that generates coded data by coding the current coding image based on the first reference list and the second reference list set by the setting unit.

An encoding method of the first aspect of the present technology corresponds to the encoding device of the first aspect of the present technology.

According to the first aspect of the present technology, first image specifying information specifying a first image of a viewpoint present in a first direction from a viewpoint of a current coding image and second image specifying information specifying a second image of a viewpoint present in a second direction opposite to the first direction are set in a first reference list in first order, the first image specifying information and the second image specifying information are set in a second reference list in second order that is different from the first order, and coded data is generated by coding the current coding image based on the first reference list and the second reference list.

A decoding device of a second aspect of the present technology is a decoding device including: a setting unit that sets first image specifying information specifying a first image of a viewpoint present in a first direction from a viewpoint of a current decoding image and second image specifying information specifying a second image of a viewpoint present in a second direction opposite to the first direction in a first reference list in first order and sets the first image specifying information and the second image specifying information in a second reference list in second order that is different from the first order; and a decoding unit that decodes coded data of the current decoding image based on the first reference list and the second reference list set by the setting unit.

A decoding method of the second aspect of the present technology corresponds to the decoding device of the second aspect of the present technology.

According to the second aspect of the present technology, first image specifying information specifying a first image of a viewpoint present in a first direction from a viewpoint of a current decoding image and second image specifying information specifying a second image of a viewpoint present in a second direction opposite to the first direction are set in a first reference list in first order, the first image specifying information and the second image specifying information are set in a second reference list in second order that is different from the first order, and coded data of the current decoding image is decoded based on the first reference list and the second reference list.

In addition, the encoding device of the first aspect and the decoding device of the second aspect can be realized by executing a program in a computer.

Furthermore, in order to realize the encoding device of the first aspect and the decoding device of the second aspect, the program executed in the computer can be provided by being transmitted through a transmission medium or by being recorded on a recording medium.

Here, the encoding device according to the first aspect and the decoding device according to the second aspect may be an independent device or an internal block that configures one device.

Effects of the Invention

According to a first aspect of the present technology, the coding efficiency of an image of a plurality of viewpoints can be improved.

In addition, according to a second aspect of the present technology, coded data of which the coding efficiency of an image of a plurality of viewpoints is improved can be decoded.

BRIEF DESCRIPTION OF DRAWINGS

FIG. 1 is a diagram that illustrates an example of the syntax of a VPS of a 3D coding system.
FIG. 5 is a diagram that illustrates an example of the syntax of a VPS set by a setting unit illustrated in FIG. 4.
FIG. 7 is a block diagram that illustrates an example of the configuration of an encoding unit illustrated in FIG. 4.
FIG. 8 is a diagram that illustrates the calculation of a time scaling process and a parallax scaling process.
FIG. 9 is a diagram that illustrates a conventional method of registering a list.
FIG. 11 is a diagram that illustrates a method of registering a list that is performed by a motion parallax prediction/compensation unit illustrated in FIG. 7.
FIG. 12 is a diagram that illustrates a method of registering a list that is performed by the motion parallax prediction/compensation unit illustrated in FIG. 7.
FIG. 22 is a diagram that illustrates an example of the syntax of a VPS set by a setting unit illustrated in FIG. 21.
FIG. 30 is a diagram that illustrates an example of the syntax of a VPS set by a setting unit illustrated in FIG. 29.

MODE FOR CARRYING OUT THE INVENTION

First Embodiment (Configuration Example of Encoding Device According to First Embodiment)

Figure 2:
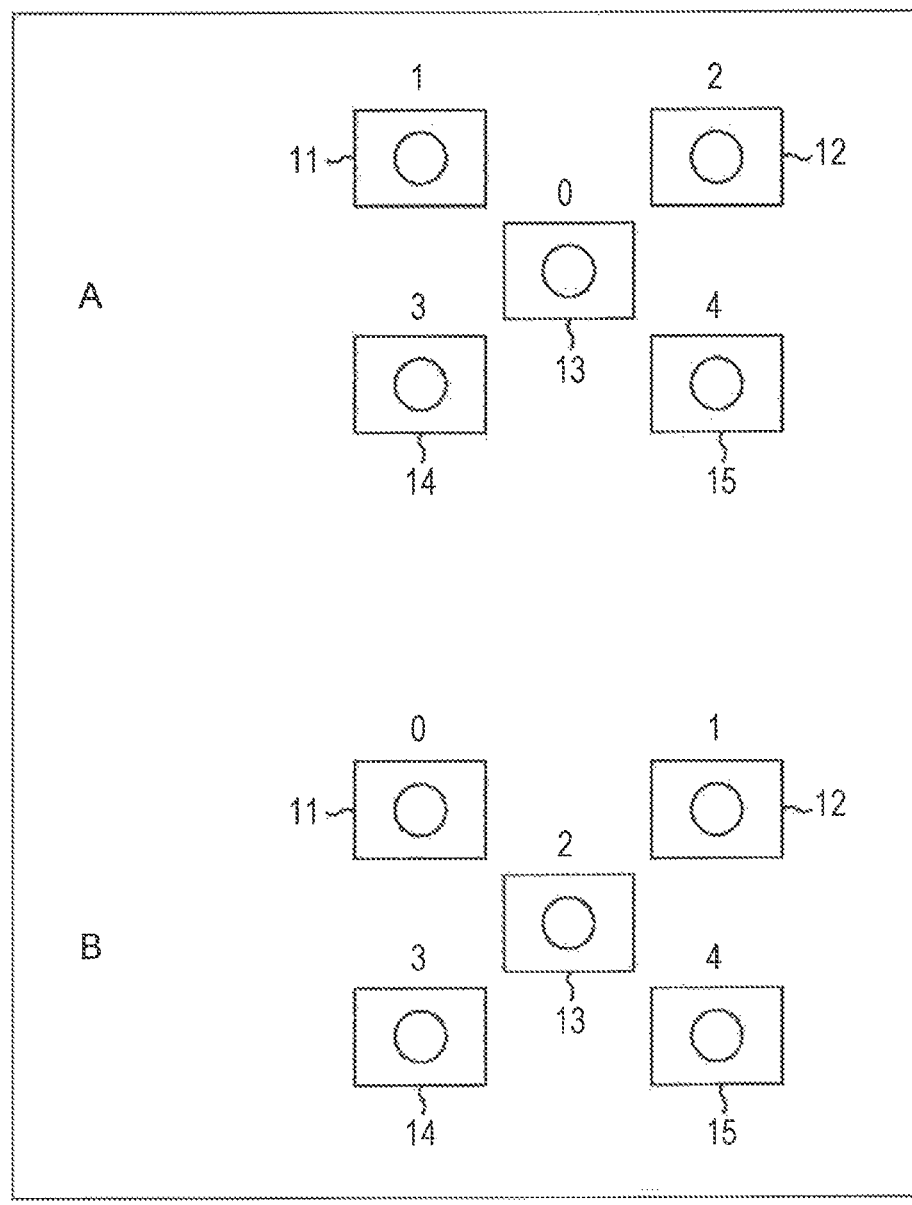
FIG. 2 is a diagram that illustrates an example of a relation between cameras and view IDs.
Figure 3:
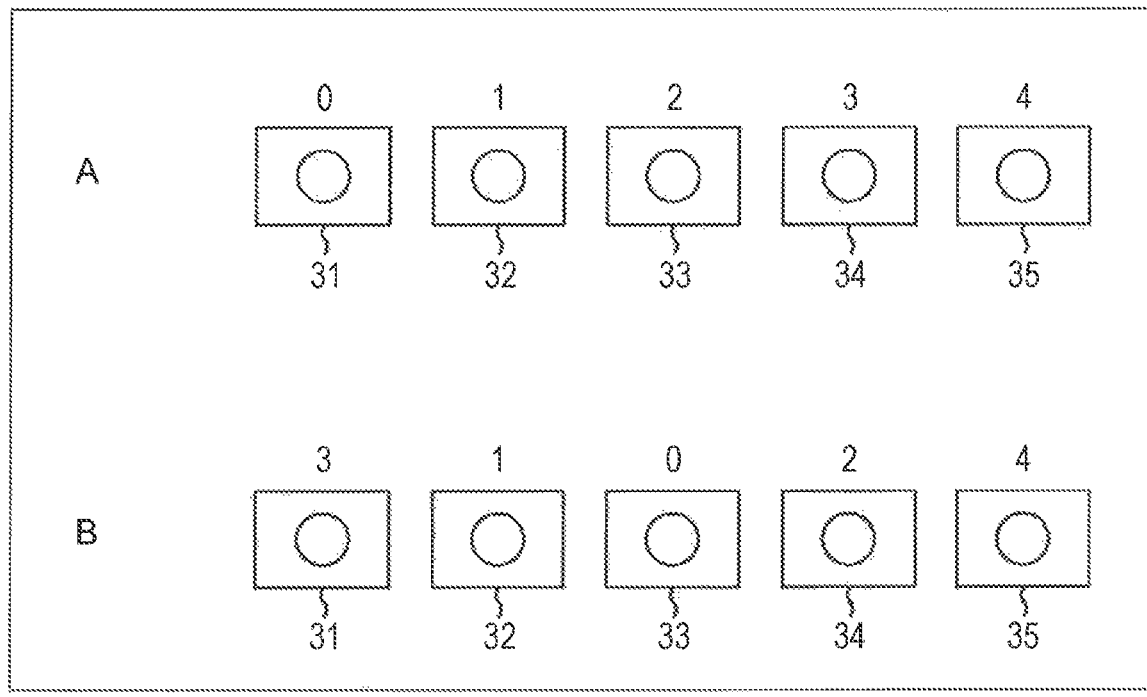
FIG. 3 is a diagram that illustrates an example of a relation between cameras and view IDs.
Figure 4:
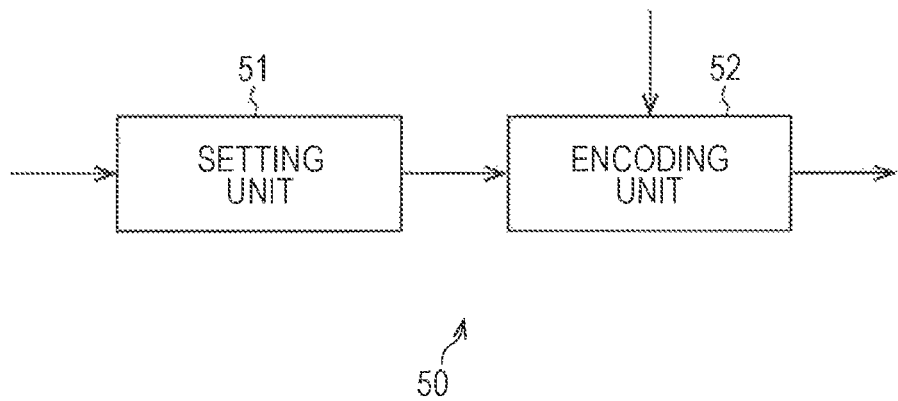
FIG. 4 is a block diagram that illustrates an example of the configuration of an encoding device of a first embodiment to which the present technology is applied.

FIG. 4 is a block diagram that illustrates an example of the configuration of an encoding device of a first embodiment to which the present technology is applied.

An encoding device 50 illustrated in FIG. 4 is configured by a setting unit 51 and an encoding unit 52. The encoding device 50 generates a coded stream by coding an image (hereinafter, referred to as a multi-viewpoint image) of a plurality of viewpoints photographed by cameras as a plurality of imaging units that are aligned in parallel in a one-dimension arrangement by using a 3D coding system and transmits the generated coded stream.

More specifically, the setting unit 51 of the encoding device 50 sets an SPS (Sequence Parameter Set), a PPS (Picture Parameter Set), and the like. In addition, the setting unit 51 sequentially assigns view IDs (viewpoint identification information) from the viewpoint of a camera disposed at the end among a plurality of cameras aligned in parallel in a one-dimensional arrangement. In addition, the setting unit 51 generates an order reliability flag (order reliability information) that is used for identifying that the view IDs are sequentially assigned from the viewpoint of the camera disposed at the end among the plurality of cameras aligned in the one-dimensional arrangement. Then, the setting unit 51 sets a VPS including the view IDs and the order reliability flag. The setting unit 51 supplies parameter sets such as the SPS, the PPS, the VPS, and the like to the encoding unit 52.

The encoding unit 52 codes a multi-viewpoint image input from the outside by using the 3D coding system based on the order reliability flag and the view IDs included in the VPS supplied from the setting unit 51, thereby generating coded data. The encoding unit 52 adds the parameter sets supplied from the setting unit 51 to the coded data, thereby generating a coded stream. The encoding unit 52 serves as a transmission unit and transmits the generated coded stream.

(Configuration Example of Syntax of VPS)

FIG. 5 is a diagram that illustrates an example of the syntax of a VPS set by the setting unit 51 illustrated in FIG. 4.

As illustrated in the 6th row of FIG. 5, an order reliability flag (view_order_idc) is included in the VPS. The order reliability flag is "0" in a case where it represents that the view IDs are assigned to sequentially increase from the viewpoint of the camera disposed at the end among a plurality of cameras aligned in parallel in the one-dimensional arrangement and is "1" in a case where it represents that the view IDs are assigned to sequentially decrease from the viewpoint of the camera disposed at the end. In addition, the order reliability flag is "0" in a case where it represents that the view IDs are assigned not sequentially from the viewpoint of the camera disposed at the end among the plurality of cameras aligned in parallel in the one-dimensional arrangement.

For example, in a case where the cameras are aligned in the horizontal direction, and the view IDs are assigned sequentially from the camera disposed at the left end such that the view ID of the viewpoint of the camera disposed at the right end is the largest, the order reliability flag is "0". In addition, in a case where the cameras are aligned in the horizontal direction, and the view IDs are assigned sequentially from the camera disposed at the left end such that the view ID of the viewpoint of the camera disposed at the right end is the smallest, the order reliability flag is "1".

In addition, as illustrated in the 11th row and 15th row, in the VPS, similar to the case represented in FIG. 1, a view ID (view_id), the number (num_direct_ref_layers) of reference images, and reference image specifying information (ref_layer_id) are included.

(Description of View ID)

Figure 6:
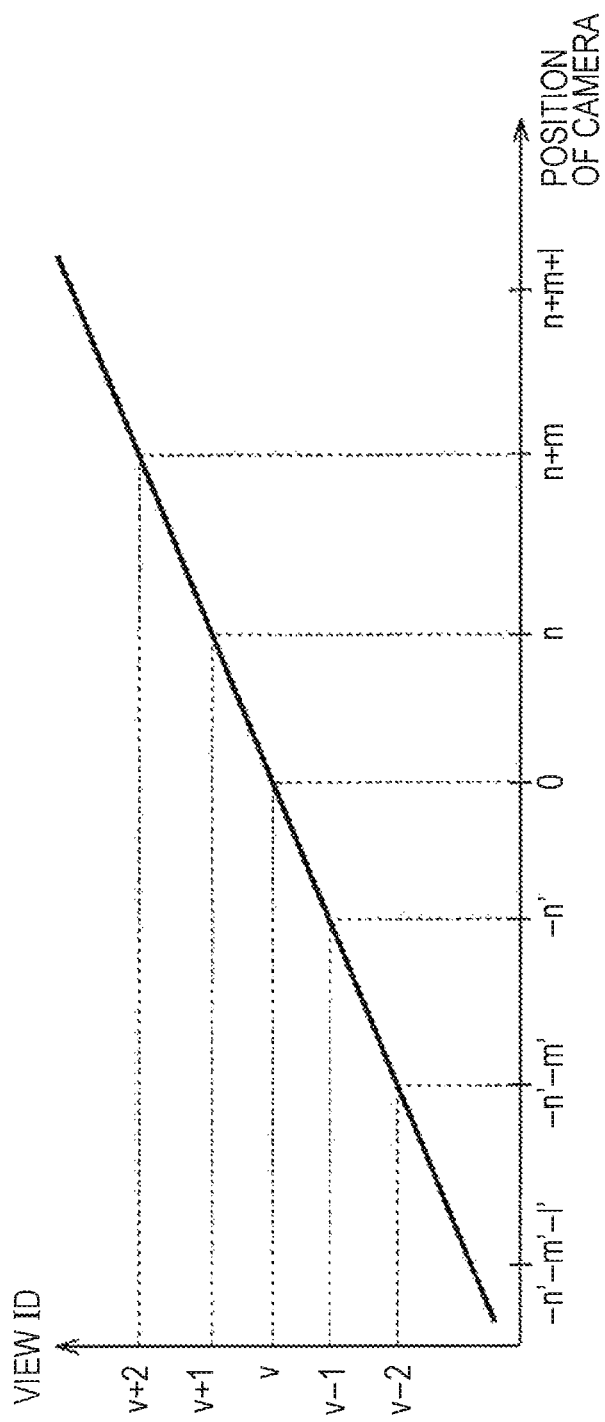
FIG. 6 is a diagram that illustrates an example of a positional relation between a view ID and a camera.

FIG. 6 is a diagram that illustrates an example of a positional relation between a view ID and a camera.

In FIG. 6, the horizontal axis represents the position of the camera, and the vertical axis represents the view ID.

As illustrated in FIG. 6, the view ID monotonously increases from the camera disposed at the end. More specifically, in the example represented in FIG. 6, five cameras are present, and, when the position of the camera disposed at the center is "0", the positions of the cameras are respectively $-n'-m'$, $-n$, 0, n, and n+m. In this case, the view ID of the camera disposed at the end-most position, in other words, the position $-n'-m'$ is $v-2$, and the view ID of the camera disposed at the position $-n'$ neighboring to the above-described camera is $v-1$. In addition, the view ID of the camera disposed at the center is v, the view ID of the camera disposed at the position n is $v+1$, and the view ID of the camera disposed at the position n+m is $v+2$.

In this way, since the view ID is monotonously increased from the camera disposed at the end, the encoding unit 52 can use the view ID as information that represents the position of each viewpoint.

(Configuration Example of Encoding Unit)

FIG. 7 is a block diagram that illustrates an example of the configuration of the encoding unit 52 illustrated in FIG. 4.

The encoding unit 52 illustrated in FIG. 7 includes: an A/D converter 101; a screen rearrangement buffer 102; a calculation unit 103; an orthogonal transform unit 104; an quantization unit 105; a lossless encoding unit 106; and an accumulation buffer 107. In addition, the encoding unit 52 includes: an inverse quantization unit 108; an inverse orthogonal transform unit 109; a calculation unit 110; a filter 111; a decoded picture buffer 112; a selection unit 113; an intra prediction unit 114; a motion parallax prediction/compensation unit 115; a predicted image selecting unit 116; and a multi-viewpoint decoded picture buffer 121. The encoding unit 52 sequentially codes a multi-viewpoint image input from the outside for each viewpoint.

More specifically, the A/D converter 101 of the encoding unit 52 performs an A/D conversion of an input image of a predetermined viewpoint and supplies an image that is digital data after the conversion to the screen rearrangement buffer 102 so as to be stored therein. The screen rearrangement buffer 102 rearranges stored images, which are in display order of frames, in order of frames for coding in accordance with a GOP (Group Of Picture). The screen rearrangement buffer 102 supplies the image of which the order of frames have been rearranged to the calculation unit 103 together with the view ID and the POC (Picture Order Count) of the image.

In addition, the screen rearrangement buffer 102 supplies the image of which the order of frames have been rearranged also to the intra prediction unit 114 and the motion parallax prediction/compensation unit 115 together with the view ID and the POC of the image.

The calculation unit 103 serves as an encoding unit and performs coding by subtracting a predicted image supplied from the intra prediction unit 114 or the motion parallax prediction/compensation unit 115 through the predicted image selecting unit 116 from an image read from the screen rearrangement buffer 102. The calculation unit 103 outputs differential information acquired as a result thereof to the orthogonal transform unit 104.

For example, in a case where intra coding is performed, the calculation unit 103 subtracts a predicted image supplied from the intra prediction unit 114 from an image read from the screen rearrangement buffer 102. On the other hand, in a case where inter coding is performed, the calculation unit 103 subtracts a predicted image supplied from the motion parallax prediction/compensation unit 115 from an image read from the screen rearrangement buffer 102.

The orthogonal transform unit 104 performs an orthogonal transform such as a discrete cosine transform or a Karhunen-Loeve transform for the differential information supplied from the calculation unit 103. Here, the method used for this orthogonal transform is arbitrary. The orthogonal transform unit 104 supplies a transform coefficient thereof to the quantization unit 105.

The quantization unit 105 performs quantization of the transform coefficient that is supplied from the orthogonal transform unit 104. The quantization unit 105 sets a quantization parameter based on information relating to a target value of a coding amount and performs the quantization. Here, the method used for this quantization is arbitrary. The quantization unit 105 supplies the quantized transform coefficient to the lossless encoding unit 106.

The lossless encoding unit 106 performs lossless coding of the transform coefficient quantized by the quantization unit 105 using an arbitrary coding system, thereby generating coded data. In addition, the lossless encoding unit 106 acquires intra prediction information including information representing the mode of the intra prediction and the like from the intra prediction unit 114 and acquires inter prediction information including information representing the mode of the inter prediction, motion parallax vector information, and the like from the motion parallax prediction/compensation unit 115. In addition, the lossless encoding unit 106 acquires a filter coefficient and the like used in the filter 111.

The lossless encoding unit 106 performs lossless coding of such various kinds of information using an arbitrary coding system and sets the coded information as a part of header information of the coded data (multiplexing). The lossless encoding unit 106 supplies the coded data in which the header information is multiplexed to the accumulation buffer 107 so as to be accumulated therein.

As the coding system of the lossless encoding unit 106, for example, there is variable-length coding, arithmetic coding, or the like. As the variable-length coding, for example, there is a CAVLC (Context-Adaptive Variable Length Coding) defined in the H.264/AVC system or the like. As the arithmetic coding, for example, there is CABAC (Context-Adaptive Binary Arithmetic Coding) or the like.

The accumulation buffer 107 temporarily stores the coded data supplied from the lossless encoding unit 106. The accumulation buffer 107 outputs the stored coded data at predetermined timing, for example, to a recording apparatus (recording medium), a transmission line, or the like of a later stage, which is not illustrated in the figure, together with the parameter set supplied from the setting unit 51 illustrated in FIG. 4 as a coded stream. In other words, the coded stream is supplied to the decoding side.

In addition, the transform coefficient quantized by the quantization unit 105 is supplied also to the inverse quantization unit 108. The inverse quantization unit 108 performs inverse quantization of the quantized transform coefficient by using a method corresponding to the quantization process performed by the quantization unit 105. The method used for this inverse quantization process may be any method as long as the method corresponds to the quantization process performed by the quantization unit 105. The inverse quantization unit 108 supplies the acquired transform coefficient to the inverse orthogonal transform unit 109.

The inverse orthogonal transform unit 109 performs an inverse orthogonal transform of the transform coefficient supplied from the inverse quantization unit 108 by using a method corresponding to the orthogonal transform process performed by the orthogonal transform unit 104. The method used for the inverse orthogonal transform process may be any method as long as the method corresponds to the orthogonal transform process performed by the orthogonal transform unit 104. An output (the differential information that is locally restored) for which the inverse orthogonal transform has been performed is supplied to the calculation unit 110.

The calculation unit 110 adds the predicted image supplied from the intra prediction unit 114 or the motion parallax prediction/compensation unit 115 through the predicted image selecting unit 116 to a result of the inverse orthogonal transform that is supplied from the inverse orthogonal transform unit 109, in other words, the differential information that is locally restored, thereby acquiring a locally-decoded image (hereinafter, referred to as a reconfigured image). The reconfigured image is supplied to the filter 111 or the decoded picture buffer 112.

The filter 111 includes a deblocking filter, an adaptive loop filter, or the like and appropriately performs a filter process for the reconfigured image supplied from the calculation unit 110. For example, the filter 111 eliminates a block distortion of the reconfigured image by performing a deblocking filter process for the reconfigured image. In addition, the filter 111 improves the image quality by performing a loop filter process for a result (a reconfigured image from which the block distortion has been eliminated) of the deblocking filter process by using a Wiener filter.

The filter 111 may be configured to perform an arbitrary filter process for the reconfigured image. In addition, the filter 111, as is necessary, may be configured to supply information of a filter coefficient used for the filter process and the like to the lossless encoding unit 106 so as to be losslessly coded.

The filter 111 supplies a result (hereinafter, referred to as a decoded image) of the filter process to the decoded picture buffer 112.

The decoded picture buffer 112 stores the reconfigured image supplied from the calculation unit 110 and the decoded image supplied from the filter 111. In addition, the decoded picture buffer 112 stores view IDs and POCs of the reconfigured image and the decoded image.

The decoded picture buffer 112 supplies the reconfigured image and the view ID and the POC of the reconfigured image, which are store, to the intra prediction unit 114 through the selection unit 113 at predetermined timing or based on a request from the outside such as the intra prediction unit 114. In addition, the decoded picture buffer 112 supplies the decoded image and the view ID and the POC of the decoded image, which are stored, to the motion parallax prediction/compensation unit 115 through the selection unit 113 at predetermined timing or based on a request from the outside such as the motion parallax prediction/compensation unit 115.

The selection unit 113 represents a supply destination of the reconfigured image or the decoded image that is output from the decoded picture buffer 112. More specifically, in a case where intra coding is performed, the selection unit 113 reads the reconfigured image for which the filter process has not been performed from the decoded picture buffer 112 and supplies the read reconfigured image to the intra prediction unit 114 as an image (peripheral image) of a peripheral area located on the periphery of the current prediction area.

In addition, in a case where inter coding is performed, the selection unit 113 reads the decoded image for which the filter process has been performed from the decoded picture buffer 112 and supplies the read decoded image to the motion parallax prediction/compensation unit 115 as a reference image.

When the peripheral image is acquired from the decoded picture buffer 112, the intra prediction unit 114 performs an intra prediction process in which a predicted image is generated basically using a prediction unit (PU) as a processing unit by using a pixel value of the peripheral image. The intra prediction unit 114 performs an intra prediction in each of all the intra prediction modes that are candidates.

The intra prediction unit 114 evaluates cost function values of predicted images by using the predicted images generated by the intra predictions of all the intra prediction modes that are candidates and the input image supplied from the screen rearrangement buffer 102 and selects an optimal intra prediction mode. Then, the intra prediction unit 114 supplies the predicted image generated in the optimal intra prediction mode and the cost function value to the predicted image selecting unit 116.

In addition, in a case where the selection is notified from the predicted image selecting unit 116, the intra prediction unit 114 appropriately supplies intra prediction information including information relating to the intra predictions of the optimal intra prediction mode and the like to the lossless encoding unit 106 so as to be coded.

The motion parallax prediction/compensation unit 115 registers the reference image specifying information included in the VPS in a list based on the order reliability flag included in the VPS supplied from the setting unit 51 illustrated in FIG. 4, thereby generating the list.

More specifically, the motion parallax prediction/compensation unit 115 registers the reference image specifying information each having an image of the same viewpoint of which the POC is before that of the current predicting image as a reference image in a list L0 in order of setting in the VPS. In addition, the motion parallax prediction/compensation unit 115 registers the reference image specifying information each having an image of the same viewpoint of which the POC is after that of the current predicting image as a reference image in a list L1 in order of the setting in the VPS. Furthermore, the motion parallax prediction/compensation unit 115 serves as a setting unit and registers (sets) the reference image specifying information each having an image of a viewpoint different from that of the current predicting image as a reference image in the lists L0 and L1 based on the order reliability flag.

The motion parallax prediction/compensation unit 115 reads decoded images specified by the reference image specifying information registered in the list in order of registration in the list from the decoded picture buffer 112 as reference images. The motion parallax prediction/compensation unit 115 performs a motion prediction or a parallax prediction as an inter prediction basically having the PU as a processing unit by using the input image supplied from the screen rearrangement buffer 102 and the reference images.

The motion prediction is a prediction using a correlation of the time direction, and the parallax prediction is a prediction using a correlation of the parallax direction. The motion parallax prediction/compensation unit 115 detects a motion vector as a result of the motion prediction and detects a parallax vector as a result of the parallax prediction. Hereinafter, in a case where the motion vector and the parallax vector do not need to be particularly discriminated from each other, the vectors will be collectively referred to as a motion parallax vector.

The motion parallax prediction/compensation unit 115 performs a compensation process according to the motion parallax vector detected as a result of the inter prediction, thereby generating a predicted image. The motion parallax prediction/compensation unit 115 performs the inter prediction and the compensation process in each of all the inter prediction modes that are candidates.

The motion parallax prediction/compensation unit 115 evaluates cost function values of predicted images by using the predicted images of all the inter prediction modes that are candidates and the input image supplied from the screen rearrangement buffer 102 and selects an optimal inter prediction mode. Then, the motion parallax prediction/compensation unit 115 supplies the predicted image generated in the optimal inter prediction mode and the cost function value to the predicted image selecting unit 116.

In addition, in a case where a selection is notified from the predicted image selecting unit 116, the motion parallax prediction/compensation unit 115 generates a prediction vector of a motion parallax vector corresponding to the predicted image generated in the optimal inter prediction mode based on the order reliability flag.

More specifically, in a case where the motion parallax vector is a motion vector, the motion parallax prediction/compensation unit 115 performs a time scaling process in which the motion vector of an image of a peripheral area in time (hereinafter, referred to as a time peripheral area image) is corrected based on a difference between the POCs of the current predicting image and the reference image of the image and a difference between the POCs of the time peripheral area image of the current predicting image and the reference image of the image, and the corrected motion vector is set as a prediction vector.

On the other hand, in a case where the motion parallax vector is a parallax vector, the motion parallax prediction/compensation unit 115 performs a parallax scaling process based on the order reliability flag. The parallax scaling process is a process in which, by using the view ID as information representing the position of each viewpoint, a parallax vector of an image of a parallax peripheral area (hereinafter, referred to as a parallax peripheral area image) of the current predicting image is corrected based on a distance (a distance between cameras) between viewpoints, and the corrected parallax vector is set as a prediction vector. More specifically, in the parallax scaling process, the parallax vector of the parallax peripheral area image is corrected based on a difference between the view IDs of the current predicting image and the reference image of the image and a difference between the view IDs of the parallax peripheral area image and the reference image of the parallax peripheral area image, and the corrected parallax vector is set as a prediction vector.

The motion parallax prediction/compensation unit 115 calculates a difference between the generated prediction vector and the motion parallax vector corresponding to the predicted image generated in the optimal inter prediction mode and sets the calculated difference as motion parallax vector information. In addition, the motion parallax prediction/compensation unit 115 supplies the inter prediction information including information relating to the inter prediction such as the motion parallax vector information and the optimal inter prediction mode to the lossless encoding unit 106 so as to be losslessly coded.

The predicted image selecting unit 116 selects a supply source of the predicted image to be supplied to the calculation unit 103 and the calculation unit 110 based on the cost function values supplied from the intra prediction unit 114 and the motion parallax prediction/compensation unit 115.

More specifically, in a case where the cost function value supplied from the intra prediction unit 114 is smaller than the cost function value supplied from the motion parallax prediction/compensation unit 115, the predicted image selecting unit 116 selects the intra prediction unit 114 as the supply source of the predicted image. Accordingly, the predicted image supplied from the intra prediction unit 114 is supplied to the calculation unit 103 and the calculation unit 110, and intra coding is performed.

On the other hand, in a case where the cost function value supplied from the motion parallax prediction/compensation unit 115 is smaller than the cost function value supplied from the intra prediction unit 114, the predicted image selecting unit 116 selects the motion parallax prediction/compensation unit 115 as the supply source of the predicted image. Accordingly, the predicted image supplied from the motion parallax prediction/compensation unit 115 is supplied to the calculation unit 103 and the calculation unit 110, and inter coding is performed. The motion parallax prediction/compensation unit 115 notifies the selected supply source of the selection.

While the decoded picture buffer 112 stores the decoded image and the reconfigured image of the current processing viewpoint and the view IDs and POCs of the decoded image and the reconfigured image, the multi-viewpoint decoded picture buffer 121 stores a decoded image of each viewpoint and the view ID and the POC of the decoded image. In other words, the multi-viewpoint decoded picture buffer 121 acquires the decoded images supplied to the decoded picture buffer 112 and the view IDs and the POCs of the decoded images and stores them together with the decoded picture buffer 112.

When the current processing viewpoint is changed, the decoded picture buffer 112 eliminates the decoded image of the previous processing viewpoint, the multi-viewpoint decoded picture buffer 121 maintains the decoded image of previous processing viewpoint as it is. Then, according to a request from the decoded picture buffer 112 or the like, the decoded image and the view ID and the POC of the decoded image, which are stored, are supplied to the decoded picture buffer 112 as "a decoded image of a non-current processing viewpoint and the view ID and the POC of the decoded image". The decoded picture buffer 112 supplies "the decoded image of a non-current processing viewpoint and the view ID and the POC of the decoded image" read from the multi-viewpoint decoded picture buffer 121 to the motion parallax prediction/compensation unit 115 through the selection unit 113.

(Description of Time Scaling Process and Parallax Scaling Process)

FIG. 8 is a diagram that illustrates the calculation of the time scaling process and the parallax scaling process.

In the time scaling process, by multiplying the prediction vector of the time peripheral area image by a coefficient distScaleFactor, the prediction vector of the time peripheral area image is corrected. This coefficient distScaleFactor, as illustrated in the 1st and 2nd rows of FIG. 8, is acquired based on a coefficient tb and a coefficient td.

The coefficient tb, as illustrated in the 7th row, is acquired based on a difference between the POC (PicOrderCntVal) of the current predicting image and the POC PicOrderCnt (refpicListA[refIdxA])) of the reference image of the image. In addition, the coefficient td, as illustrated in the 8th row, is acquired based on a difference between the POC (PicOrderCntVal) of the time peripheral area image and the POC (PicOrderCnt(RefpicListX[refIdxLX])) of the reference image of the time peripheral area image.

On the other hand, in the parallax scaling process, by multiplying the prediction vector of the parallax peripheral area image by a coefficient distScaleFactor, the prediction vector of the parallax peripheral area image is corrected. This coefficient distScaleFactor, similar to the case of the time scaling process, as illustrated in the 1st and 2nd rows of FIG. 8, is acquired based on the coefficient tb and the coefficient td.

However, the coefficient tb at this time, as illustrated in the 10th row, is acquired based on a difference between the view ID (ViewOrderIdx Val) of the current predicting image and the view ID (ViewOrderIdx(refpicListA[refIdxA])) of the reference image of the image. In addition, the coefficient td, as illustrated in the 11th row, is acquired based on a difference between the view ID (ViewOrderIdx Val) of the parallax peripheral area image and the view ID (ViewOrderIdx (RefpicListX[refIdxLX])) of the predicted image of the parallax peripheral area image.

(Description of Method of Registering List)

Figure 10:
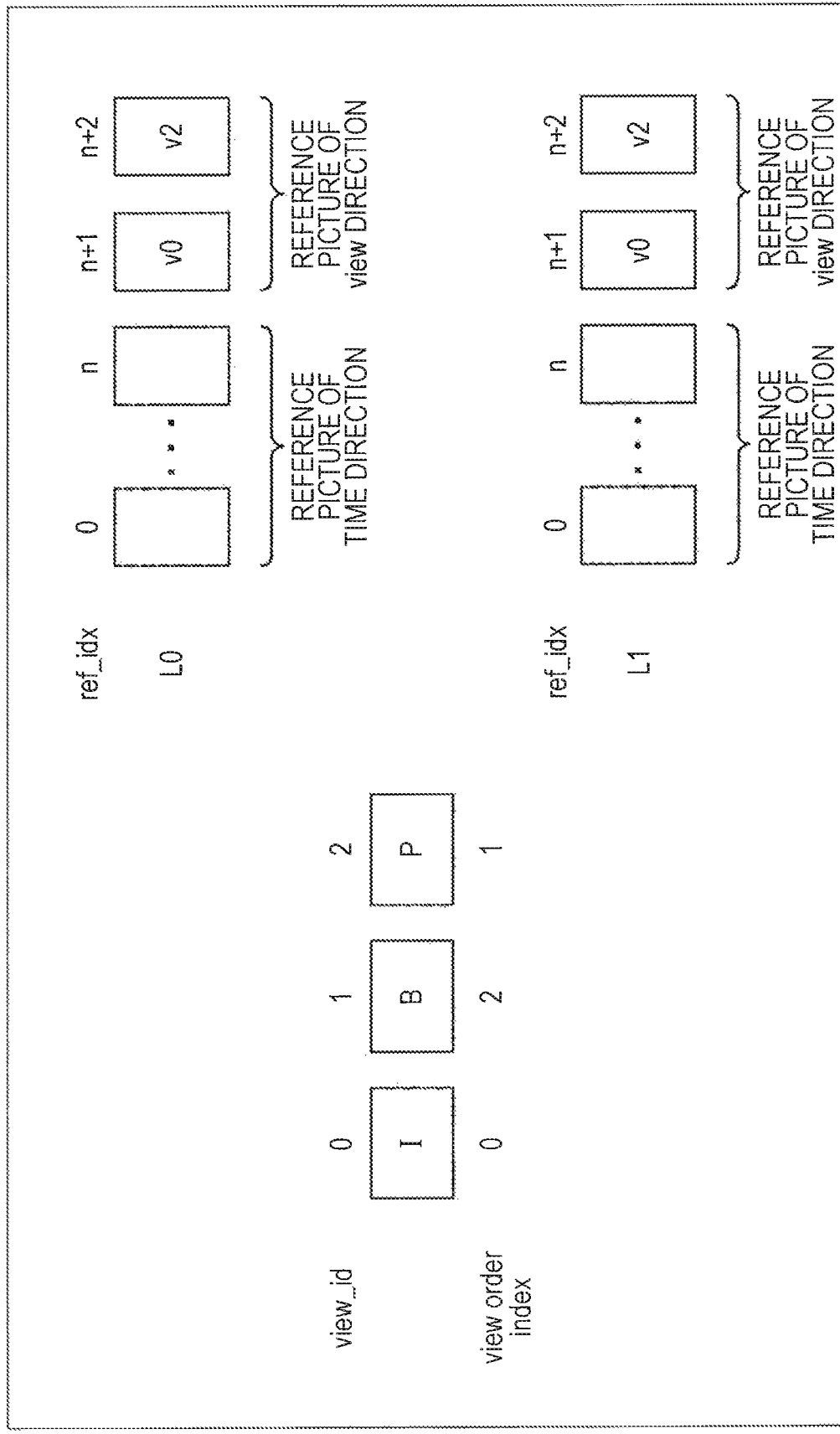
FIG. 10 is a diagram that illustrates a conventional method of registering a list.

FIGS. 9 and 10 are diagrams that illustrate a conventional method of registering lists, and FIGS. 11 and 12 are diagrams that illustrate a method of registering lists that is performed by the motion parallax prediction/compensation unit 115 illustrated in FIG. 7.

As illustrated in FIG. 9, in the conventional method of registering lists, lists L0 (RefPicListTemp0[rIdx]) and L1 (RefPicListTemp0[rIdx]) are reference image specifying information (RefPicSetIvCurr) in order set in the VPS.

Accordingly, for example, as illustrated in FIG. 10, in a case where view IDs "0", "1", and "2" are assigned to viewpoints of an I picture, a B picture, and a P picture, and the coding order (view order index) is in order of the I picture, the P picture, and the B picture, for example, when reference image specifying information having the I picture and the P picture as reference images is sequentially set in the VPS as the reference image specifying information of the B picture, the reference image specifying information having the I picture and the P picture as reference images are sequentially registered in both of the L0 list and the L1 list.

On the other hand, in the method of registering lists that is performed by the motion parallax prediction/compensation unit 115, as illustrated in the 5th row and 6th row illustrated in FIG. 11, reference image specifying information having an image of a view ID smaller than the view ID of the current predicting image as a reference image is set in RefPicSetIvCurrBefore in order of highest degree of closeness of the view ID to the view ID of the current predicting image. In addition, as illustrated in the 7th row and the 8th row, reference image specifying information having an image of a view ID larger than the view ID of the current predicting image as a reference image is set in RefPicSetIvCurrAfter in order of highest degree of closeness of the view ID to the view ID of the current predicting image.

In this way, the motion parallax prediction/compensation unit 115 sets reference image specifying information having an image of a viewpoint that is present in a predetermined direction from the viewpoint of the current predicting image as a reference image as RefPicSetIvCurrBefore in order of highest degree of closeness to the viewpoint of the current predicting image by using each view ID as information representing the position of each viewpoint. In addition, the motion parallax prediction/compensation unit 115 sets reference image specifying information having an image of a viewpoint that is present in a direction opposite to the predetermined direction from the viewpoint of the current predicting image as a reference image as RefPicSetIvCurrAfter in order of highest degree of closeness to the viewpoint of the current predicting image by using each view ID as information representing the position of each viewpoint.

Then, as illustrated in the 19th row to the 22nd rows, as the L0 list (RefPicListTemp0[rIdx]), after RefPicSetIvCurrBefore is set, RefPicSetIvCurrAfter is set. In addition, as illustrated in the 33th row to the 36th row, as the L1 list (RefPicListTemp0[rIdx]), after RefPicSetIvCurrAfter is set, RefPicSetIvCurrBefore is set.

Accordingly, for example, as illustrated in FIG. 12, view IDs "0" to "3" are sequentially assigned to the viewpoints of an I picture, two B pictures, and a P picture, and the coding order is the order of the I picture, the P picture, the B picture, and the B picture, for example, when the B picture arranged on the front side in the coding order, the I picture, and the P picture are set in the VPS as the reference image specifying information of the B picture arranged on the rear side in the coding order, according to the method of registering lists that is performed by the motion parallax prediction/compensation unit 115, as illustrated in FIG. 11, first, reference image specifying information each having a picture of a view ID smaller than the view ID "2" of the B picture arranged on the rear side in the coding order as reference images is registered in the L0 list in order of highest degree of closeness to the view ID "2".

In other words, reference image specifying information having the I picture and the B picture of which the view IDs are respectively "0" and "1", which are smaller than "2", as reference images are registered in the list L0 in order of the view IDs "1" and "0". Thereafter, reference image specifying information having the P picture of which the view ID is "3", which is larger than "2", as a reference image is registered in the list L0.

In addition, as illustrated in FIG. 11, in the list L1, first, reference image specifying information having the P picture of which the view ID is "3", which is larger than the view ID "2" of the B picture arranged on the rear side in the coding order, as a reference image is registered. Thereafter, in the list L1, reference image specifying information having the I picture and the B picture of which the view IDs are respectively "0" and "1", which are smaller than "2", as reference images is registered in order of the view IDs "1" and "0" that is order of highest degree of closeness of the view ID to the view ID "2".

As above, according to the method of registering lists that is performed by the motion parallax prediction/compensation unit 115, the registration order of reference images (reference pictures of the viewpoint direction) of viewpoints different from that of the current predicting image is different between the lists L0 and L1. Accordingly, even in a case where the number of pieces of reference image specifying information that can be registered in the list is limited, more pieces of different reference image specifying information can be registered in the list L0 or L1, and thus, the coding efficiency can be improved.

<Description of Process Performed by Encoding Device>

Figure 13:
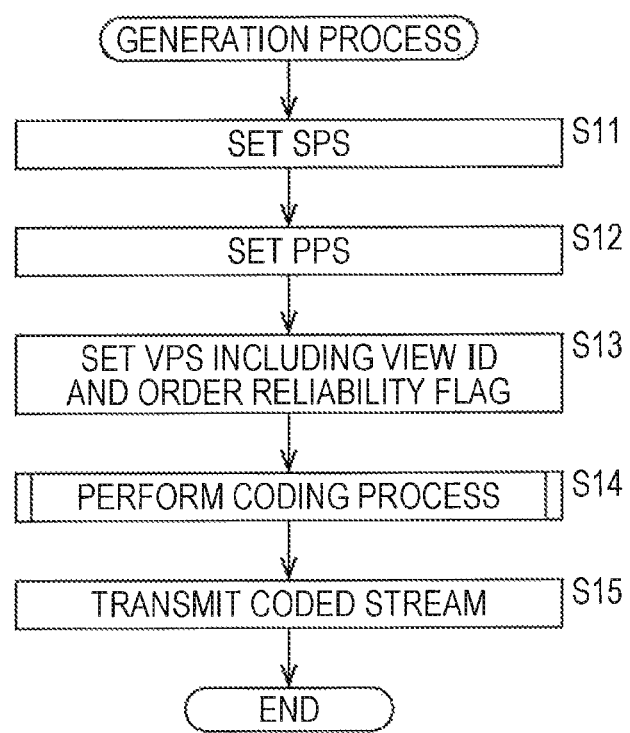
FIG. 13 is a flowchart that illustrates a generation process performed by an encoding device.

FIG. 13 is a flowchart that illustrates a generation process performed by the encoding device.

In Step S11 represented in FIG. 13, the setting unit 51 of the encoding device 50 sets an SPS. In Step S12, the setting unit 51 sets a PPS. In Step S13, the setting unit 51 sets a VPS that includes a view ID and an order reliability flag. The setting unit 51 supplies parameter sets such as the SPS, the PPS, and the VPS to the encoding unit 52.

In Step S14, the encoding unit 52 performs a coding process in which a multi-viewpoint image input from the outside is coded using a 3D coding system based on the order reliability flag and the view ID included in the VPS that is supplied from the setting unit 51. This coding process will be described in detail later with reference to FIG. 14 to be described later.

In Step S15, the encoding unit 52 generates a coded stream by adding the parameter set supplied from the setting unit 51 to the coded data accumulated in the accumulation buffer 107 and transmits the generated coded stream. Then, the process ends.

Figure 14:
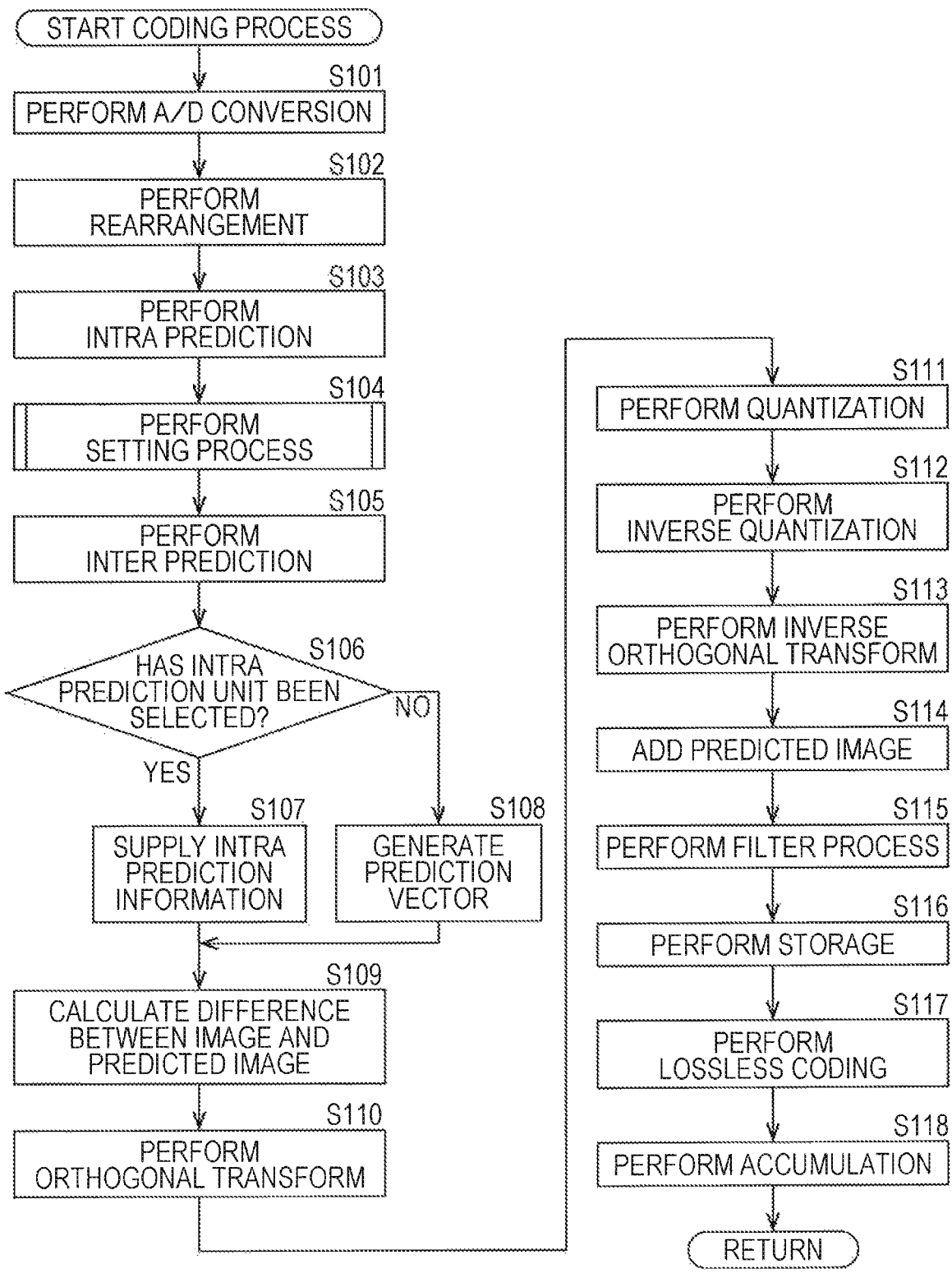
FIG. 14 is a flowchart that illustrates a coding process illustrated in FIG. 13 in detail.

FIG. 14 is a flowchart that illustrates the coding process of Step S14 represented in FIG. 13 in detail.

In Step S101 represented in FIG. 14, the A/D converter 101 of the encoding unit 52 performs an A/D conversion of an input image of a predetermined viewpoint and supplies an image after the conversion, which is digital data, to the screen rearrangement buffer 102 so as to be stored.

In Step S102, the screen rearrangement buffer 102 rearranges the stored image of frames, which are configured in the display order, in the order of frames for coding in accordance with the GOP. The screen rearrangement buffer 102 supplies the image of which the order of frames has been rearranged also to the calculation unit 103, the intra prediction unit 114, and the motion parallax prediction/compensation unit 115 together with the view ID and the POC of the image.

In Step S103, the intra prediction unit 114 performs an intra prediction for generating a predicted image basically using the PU as a processing unit by using the peripheral image supplied from the decoded picture buffer 112 through the selection unit 113. The intra prediction unit 114 performs this intra prediction in each of all the intra prediction modes that are candidates.

In addition, the intra prediction unit 114 evaluates cost function values of predicted images by using the predicted images generated by the intra predictions of all the intra prediction modes that are candidates and the input image supplied from the screen rearrangement buffer 102 and selects an optimal intra prediction mode. Then, the intra prediction unit 114 supplies the predicted image generated in the optimal intra prediction mode and the cost function value to the predicted image selecting unit 116.

In Step S104, the motion parallax prediction/compensation unit 115 performs a setting process for setting presence/no-presence of the parallax scaling process by registering the lists L0 and L1 based on the order reliability flag included in the VPS that is supplied from the setting unit 51 illustrated in FIG. 4. This setting process will be described with reference to FIG. 15 to be described later.

In Step S105, the motion parallax prediction/compensation unit 115 performs an inter prediction basically using the PU as the processing unit by using the reference images based on the lists L0 and L1 and the input image supplied from the screen rearrangement buffer 102. Then, the motion parallax prediction/compensation unit 115 performs a compensation process according to the motion parallax vector detected as a result of the inter prediction, thereby generating a predicted image. The motion parallax prediction/compensation unit 115 performs such an inter prediction and the compensation process in each of all the inter prediction modes that are candidates.

In addition, the motion parallax prediction/compensation unit 115 evaluates cost function values of predicted images by using the predicted images of all the inter prediction modes that are candidates and the input image supplied from the screen rearrangement buffer 102 and selects an optimal inter prediction mode. Then, the motion parallax prediction/compensation unit 115 supplies the predicted image generated in the optimal inter prediction mode and the cost function value to the predicted image selecting unit 116.

In Step S106, the predicted image selecting unit 116 determines whether to select the intra prediction unit 114 as a supply source of the predicted image to be supplied to the calculation unit 103 and the calculation unit 110 based on the cost function values supplied from the intra prediction unit 114 and the motion parallax prediction/compensation unit 115.

In a case where the intra prediction unit 114 is determined to be selected in Step S106, the predicted image selecting unit 116 supplies the predicted image supplied from the intra prediction unit 114 to the calculation unit 103 and the calculation unit 110 and notifies the intra prediction unit 114 of the selection. Then, in Step S107, the intra prediction unit 114 supplies intra prediction information to the lossless encoding unit 106, and the process proceeds to Step S109.

On the other hand, in a case where the intra prediction unit is determined not to be selected in Step S106, the predicted image selecting unit 116 supplies the predicted image supplied from the motion parallax prediction/compensation unit 115 to the calculation unit 103 and the calculation unit 110 and notifies the motion parallax prediction/compensation unit 115 of the selection. Then, in Step S108, the motion parallax prediction/compensation unit 115 generates a prediction vector of a motion parallax vector corresponding to the predicted image generated in the optimal inter prediction mode.

More specifically, in a case where the parallax scaling process is valid, the motion parallax prediction/compensation unit 115 generates a prediction vector by performing the time scaling process or the parallax scaling process. On the other hand, in a case where the parallax scaling process is invalid, the motion parallax prediction/compensation unit 115 generates a prediction vector by performing the time scaling process or sets a parallax vector of the parallax peripheral area image as a prediction vector as it is.

Then, the motion parallax prediction/compensation unit 115 acquires a difference between the prediction vector and the motion parallax vector corresponding to the predicted image generated in the optimal inter prediction mode as motion parallax vector information. Then, the motion parallax prediction/compensation unit 115 supplies the inter prediction information including the motion parallax vector information, the optimal inter prediction mode, and the like to the lossless encoding unit 106, and the process proceeds to Step S109.

In Step S109, the calculation unit 103 calculates a difference between the image read from the screen rearrangement buffer 102 and the predicted image supplied from the intra prediction unit 114 or the motion parallax prediction/compensation unit 115 through the predicted image selecting unit 116. The calculation unit 103 outputs differential information acquired as a result thereof to the orthogonal transform unit 104.

In Step S110, the orthogonal transform unit 104 performs an orthogonal transform of the differential information supplied from the calculation unit 103 and supplies a transform coefficient acquired as a result thereof to the quantization unit 105.

In Step S111, the quantization unit 105 quantizes the transform coefficient supplied from the orthogonal transform unit 104 and supplies the quantized transform coefficient to the lossless encoding unit 106 and the inverse quantization unit 108.

In Step S112, the inverse quantization unit 108 performs inverse quantization of the quantized transform coefficient supplied from the quantization unit 105 using a method corresponding to the quantization process performed by the quantization unit 105 and supplies the acquired transform coefficient to the inverse orthogonal transform unit 109.

In Step S113, the inverse orthogonal transform unit 109 performs an inverse orthogonal transform of the transform coefficient supplied from the inverse quantization unit 108 by using a method corresponding to the orthogonal transform process performed by the orthogonal transform unit 104 and supplies differential information, which is locally restored, acquired as a result thereof to the calculation unit 110.

In Step S114, the calculation unit 110 adds the differential information, which is locally restored, supplied from the inverse orthogonal transform unit 109 to the predicted image supplied from the intra prediction unit 114 or the motion parallax prediction/compensation unit 115 through the predicted image selecting unit 116, thereby acquiring a reconfigured image. The reconfigured image is supplied to the filter 111 or the decoded picture buffer 112.

In Step S115, the filter 111 appropriately performs a filter process for the reconfigured image supplied from the calculation unit 110 and supplies a decoded image acquired as a result thereof to the decoded picture buffer 112.

In Step S116, the decoded picture buffer 112 stores the reconfigured image supplied from the calculation unit 110 and the view ID and the POC of the reconfigured image. In addition, the decoded picture buffer 112 and the multi-viewpoint decoded picture buffer 121 store the reconfigured image supplied from the filter 111 and the view ID and the POC of the reconfigured image.

In a case where intra coding is performed, the reconfigured image and the view ID and the POC of the reconfigured image stored in the decoded picture buffer 112 are read through the selection unit 113 and are supplied to the intra prediction unit 114 as a peripheral image and the view ID and the POC of the peripheral image. On the other hand, in a case where inter coding is performed, the reconfigured image and the view ID and the POC of the reconfigured image stored in the decoded picture buffer 112 are read through the selection unit 113 and are supplied to the motion parallax prediction/compensation unit 115 as a reference image and the view ID and the POC of the reference image.

In addition, the decoded image and the view ID and the POC of the decoded image stored in the multi-viewpoint decoded picture buffer 121 are supplied to the decoded picture buffer 112 so as to be stored therein as is necessary.

In Step S117, the lossless encoding unit 106 performs lossless coding of the quantized transform coefficient supplied from the quantization unit 105, thereby acquiring coded data. In addition, the lossless encoding unit 106 performs lossless coding of the intra prediction information supplied from the intra prediction unit 114, the inter prediction information supplied from the motion parallax prediction/compensation unit 115, the filter coefficient used for the filter 111, and the like and sets the coded information as a part of the header information of the coded data. The lossless encoding unit 106 supplies the coded data to the accumulation buffer 107.

In Step S118, the accumulation buffer 107 temporarily stores the coded data supplied from the lossless encoding unit 106. Then, the process is returned to Step S14 illustrated in FIG. 13, and the process proceeds to Step S15.

Figure 15:
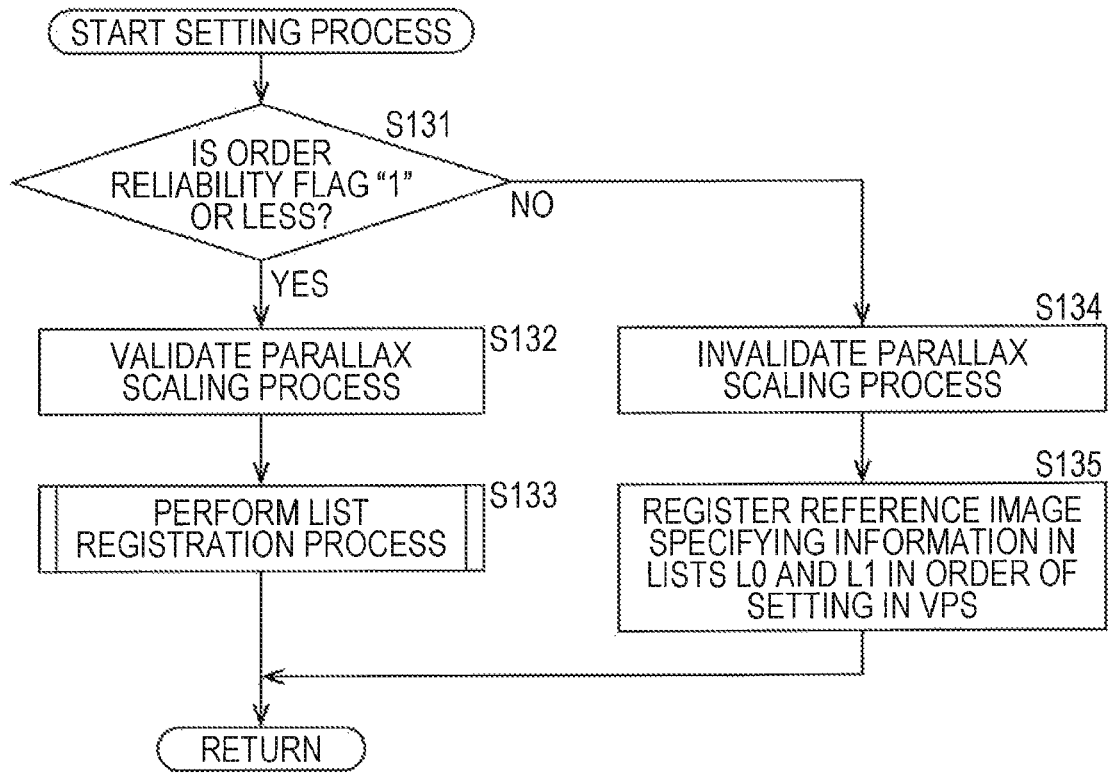
FIG. 15 is a flowchart that illustrates a setting process illustrated in FIG. 14 in detail.

FIG. 15 is a flowchart that illustrates the setting process of Step S104 illustrated in FIG. 14 in detail.

In Step S131 represented in FIG. 15, the motion parallax prediction/compensation unit 115 determines whether or not the order reliability flag included in the VPS supplied from the setting unit 51 is "1" or less. In a case where the order reliability flag is determined to be "1" or less in Step S131, in other words, in a case where the view IDs are assigned sequentially from the viewpoint of the camera disposed at the end, the process proceeds to Step S132.

In Step S132, the motion parallax prediction/compensation unit 115 validates the parallax scaling process. In Step S133, the motion parallax prediction/compensation unit 115 performs a list registration process in which the reference image specifying information is registered in the lists by using the view ID as information representing the position of each viewpoint. This list registration process will be described in detail with reference to FIG. 16 to be described later. After the process of Step S132, the process is returned to Step S104 represented in FIG. 14, and the process proceeds to Step S105.

On the other hand, in a case where the order reliability flag is determined not to be "1" or less in Step S131, in other words, in a case where the view IDs are not assigned sequentially from the viewpoint of the camera arranged at the end, the process proceeds to Step S134.

In Step S134, the motion parallax prediction/compensation unit 115 invalidates the parallax scaling process. In Step S135, the motion parallax prediction/compensation unit 115 registers the reference image specifying information in the lists L0 and L1 in order set in the VPS. Then, the process is returned to Step S104 represented in FIG. 14, and the process proceeds to Step S105.

Figure 16:
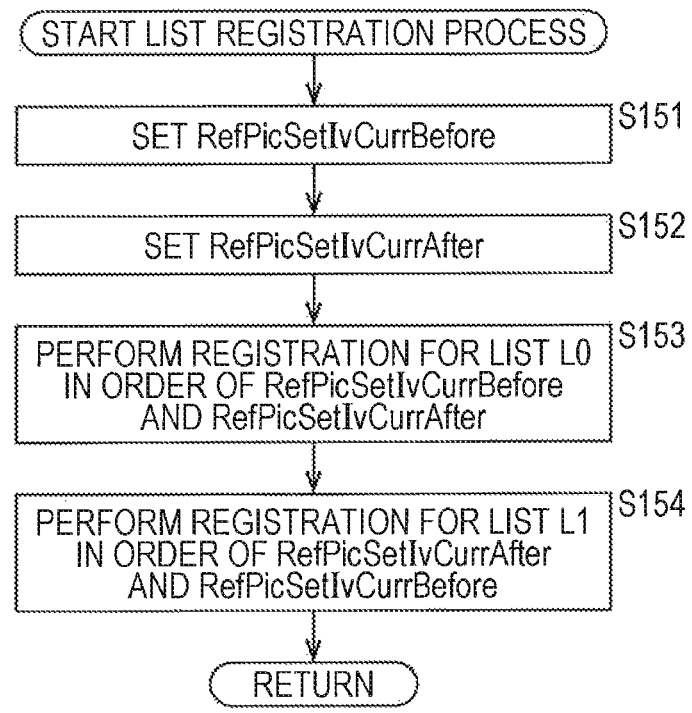
FIG. 16 is a flowchart that illustrates a list registration process illustrated in FIG. 15 in detail.

FIG. 16 is a flowchart that illustrates the list registration process of Step S133 illustrated in FIG. 15 in detail.

In Step S151 represented in FIG. 16, the motion parallax prediction/compensation unit 115 sets the reference image specifying information each having an image of a view ID smaller than the view ID of the current predicting image as a reference image among the reference specifying information included in the VPS in RefPicSetivCurrBefore in order of highest degree of closeness to the view ID of the current predicting image (in order of largest to smallest view ID).

In Step S152, the motion parallax prediction/compensation unit 115 sets the reference image specifying information each having an image of a view ID larger than the view ID of the current predicting image as a reference image among the reference specifying information included in the VPS in RefPicSetivCurrAfter in order of highest degree of closeness to the view ID of the current predicting image (in order or smallest to largest view ID).

In Step S153, the motion parallax prediction/compensation unit 115 performs registration for the list L0 in order of RefPicSetivCurrBefore and RefPicSetivCurrAfter. In Step S154, the motion parallax prediction/compensation unit 115 performs registration for the list L1 in order of RefPicSetivCurrAfter and RefPicSetivCurrBefore. Then, the process is returned to Step S133 represented in FIG. 15, the process is returned to Step S104 represented in FIG. 14, and the process proceeds to Step S105.

As above, since a multi-viewpoint image is coded based on the order reliability flag, the encoding device 50 can perform the list registration process and the parallax scaling process only in a case where the view IDs are assigned sequentially from the viewpoint of the camera disposed at the end. As a result, the registration order of reference images (reference pictures of the viewpoint direction) of viewpoints different from the viewpoint of the current predicting image can be configured to be different between the list L0 and the list L1. In addition, the parallax scaling process can be correctly performed. Accordingly, the coding efficiency can be improved.

In addition, in a case where the view IDs are not assigned sequentially from the viewpoint of the camera arranged at the end, by performing the list registration process and the parallax scaling process, it can be prevented to degrade the coding efficiency.

(Configuration Example of Decoding Device According to First Embodiment)

Figure 17:
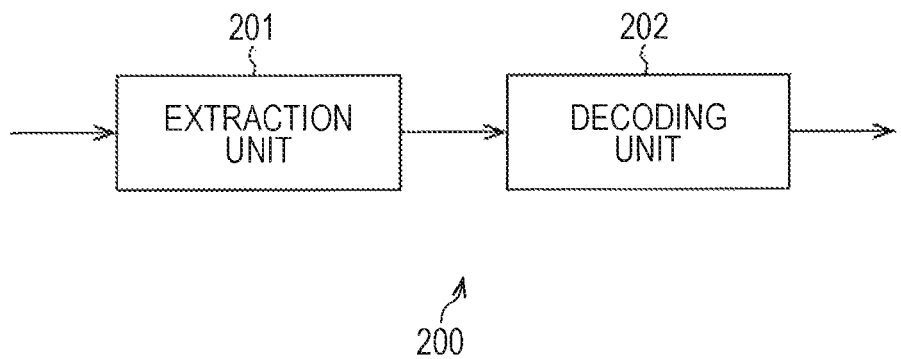
FIG. 17 is a block diagram that illustrates an example of the configuration of a decoding device of a first embodiment to which the present technology is applied.

FIG. 17 is a block diagram that illustrates an example of the configuration of a decoding device of a first embodiment, to which the present technology is applied, decoding a coded stream transmitted from the encoding device 50 illustrated in FIG. 4.

A decoding device 200 illustrated in FIG. 17 is configured by an extraction unit 201 and a decoding unit 202. The decoding device 200 decodes the coded stream transmitted from the encoding device 50 by using a decoding method corresponding to the encoding method used by the encoding device 50, thereby generating a multi-viewpoint image.

More specifically, the extraction unit 201 of the decoding device 200 serves as a reception unit and receives a coded stream transmitted from the encoding device 50. The extraction unit 201 extracts parameter sets such as the SPS, the PPS, and VPS and coded data from the coded stream and supplies the parameter sets and the coded data to the decoding unit 202.

The decoding unit 202 decodes the coded data supplied from the extraction unit 201 based on the order reliability flag and the view ID included in the VPS supplied from the extraction unit 201, thereby generating a multi-viewpoint image. At this time, the decoding unit 202 refers to the SPS, the PPS, and the like as is necessary. The decoding unit 202 outputs the multi-viewpoint image.

(Configuration Example of Decoding Unit)

Figure 18:
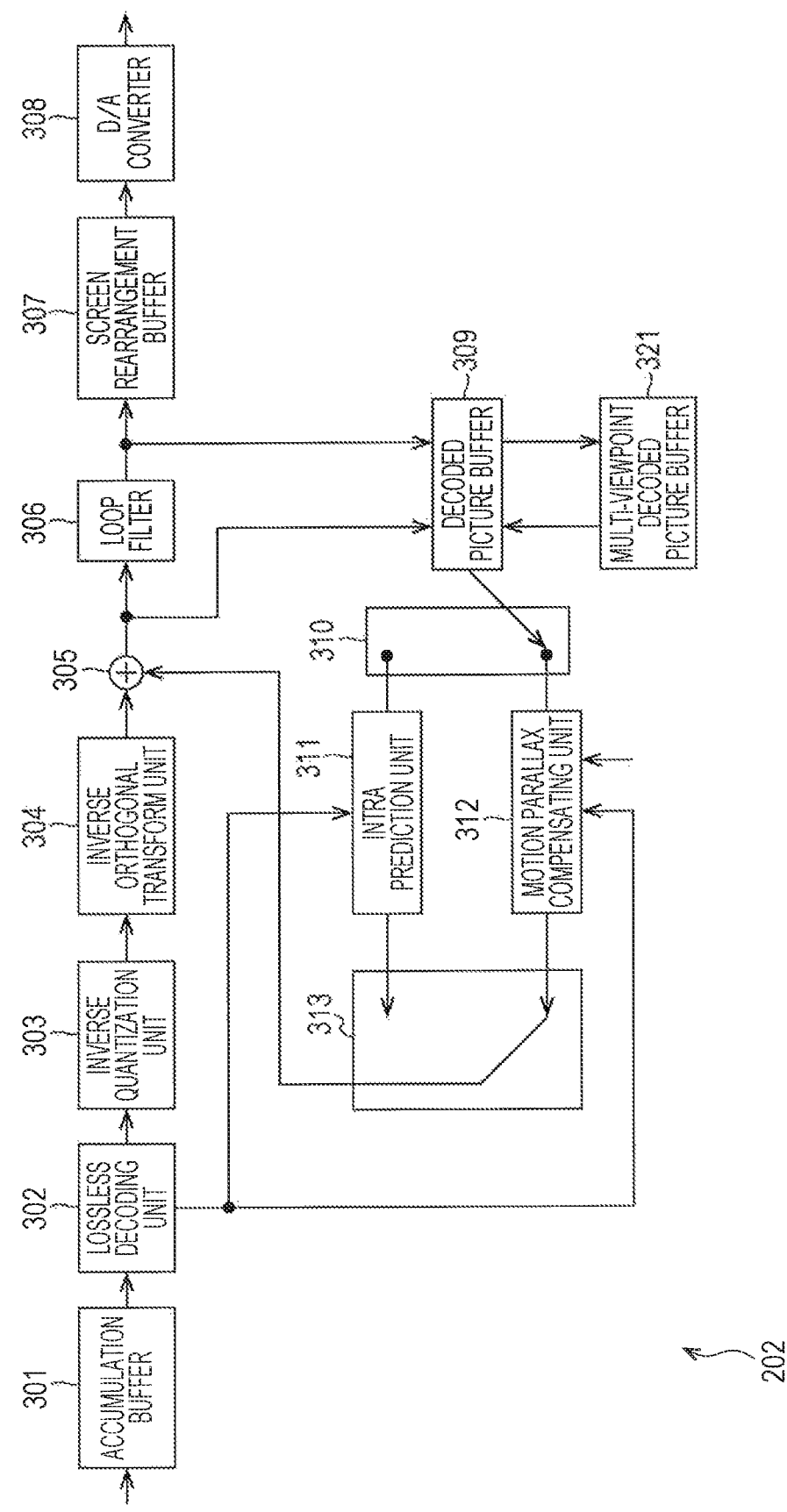
FIG. 18 is a block diagram that illustrates an example of the configuration of a decoding unit illustrated in FIG. 17.

FIG. 18 is a block diagram that illustrates an example of the configuration of the decoding unit 202 illustrated in FIG. 17.

The decoding unit 202 illustrated in FIG. 18 includes: an accumulation buffer 301; a lossless decoding unit 302; an inverse quantization unit 303; an inverse orthogonal transform unit 304; a calculation unit 305; a loop filter 306; a screen rearrangement buffer 307; and a D/A converter 308. In addition, the decoding unit 202 includes: a decoded picture buffer 309; a selection unit 310; an intra prediction unit 311; a motion parallax compensating unit 312; and a selection unit 313.

In addition, the decoding unit 202 includes a multi-viewpoint decoded picture buffer 321. The decoding unit 202 sequentially decodes the coded data of a multi-viewpoint image supplied from the extraction unit 201 illustrated in FIG. 17 for each viewpoint.

The accumulation buffer 301 accumulates the coded data of predetermined viewpoints supplied from the extraction unit 201 and supplies the coded data to the lossless decoding unit 302 at predetermined timing. The lossless decoding unit 302 performs lossless decoding of the coded data supplied from the accumulation buffer 301 by using a system corresponding to the coding system of the lossless encoding unit 106 illustrated in FIG. 7. The lossless decoding unit 302 supplies a quantized transform coefficient acquired by performing the lossless decoding process to the inverse quantization unit 303 together with the view ID and the POC of an image corresponding to the transform coefficient.

In addition, in a case where intra prediction information is acquired by decoding the coded data, the lossless decoding unit 302 supplies the intra prediction information to the intra prediction unit 311. On the other hand, in a case where inter prediction information is acquired, the lossless decoding unit 302 supplies the inter prediction information to the motion parallax compensating unit 312.

The inverse quantization unit 303 performs inverse quantization of the quantized transform coefficient supplied from the lossless decoding unit 302 using a system corresponding to the quantization system of the quantization unit 105 illustrated in FIG. 7 and supplies an acquired transform coefficient to the inverse orthogonal transform unit 304. The inverse orthogonal transform unit 304 performs an inverse orthogonal transform of the transform coefficient supplied from the inverse quantization unit 303 by using a system corresponding to the orthogonal transform system of the orthogonal transform unit 104 illustrated in FIG. 7, thereby acquiring differential information.

The differential information that is acquired by the inverse orthogonal transform process is supplied to the calculation unit 305. In addition, a predicted image is supplied to the calculation unit 305 from the intra prediction unit 311 or the motion parallax compensating unit 312 through the selection unit 313.

The calculation unit 305 serves as a decoding unit and performs decoding by adding the differential information and the predicted image together, thereby acquiring a reconfigured image. The calculation unit 305 supplies the reconfigured image to the loop filter 306 or the decoded picture buffer 309.

The loop filter 306, similar to the filter 111 illustrated in FIG. 7, appropriately performs a filter process for the reconfigured image supplied from the calculation unit 305, thereby generating a decoded image. In addition, in a case where a filter coefficient is acquired by the lossless decoding process performed by the lossless decoding unit 302, the loop filter 306 performs a filter process using the filter coefficient.

The loop filter 306 supplies a decoded image that is a result of the filter process to the screen rearrangement buffer 307 and the decoded picture buffer 309.

The screen rearrangement buffer 307 rearranges the decoded image supplied from the loop filter 306. In other words, the order of frames rearranged for the coding order by the screen rearrangement buffer 102 illustrated in FIG. 7 is rearranged in the original display order. The D/A converter 308 performs a D/A conversion of the multi-viewpoint decoded image supplied from the screen rearrangement buffer 307. The D/A converter 308 outputs a multi-viewpoint image acquired as a result thereof to a display not illustrated in the figure so as to be displayed thereon.

The decoded picture buffer 309 stores the reconfigured image supplied from the calculation unit 305 and the view ID and the POC of the reconfigured image. In addition, the decoded picture buffer 309 stores the decoded image supplied from the loop filter 306 and the view ID and the POC of the decoded image.

In addition, the decoded picture buffer 309 supplies the reconfigured image and the view ID and the POC of the reconfigured image, which are stored, to the intra prediction unit 311 through the selection unit 310 at predetermined timing or based on a request from the outside such as the intra prediction unit 311 or the motion parallax compensating unit 312. In addition, the decoded picture buffer 309 supplies the decoded image and the view ID and the POC of the decoded image, which are stored, to the motion parallax compensating unit 312 through the selection unit 310 at predetermined timing or based on a request from the outside such as the motion parallax prediction/compensation unit 115.

The intra prediction unit 311 basically performs the same process as that of the intra prediction unit 114 illustrated in FIG. 7. However, the intra prediction unit 311 performs an intra prediction of the optimal intra prediction mode of the intra prediction information supplied from the lossless decoding unit 302 only for an area in which the predicted image is generated by the intra prediction at the time of the coding process. The intra prediction unit 311 supplies the predicted image acquired as a result of the intra prediction to the selection unit 313.

The motion parallax compensating unit 312 serves as a setting unit and, similar to the motion parallax prediction/compensation unit 115 illustrated in FIG. 7, registers the reference image specifying information included in the VPS in the list (reference list) based on the order reliability flag included in the VPS supplied from the extraction unit 201 illustrated in FIG. 17. Then, the motion parallax compensating unit 312 reads images specified by the reference image specifying information registered in the list from the decoded picture buffer 309 in order of registration in the list as reference images.

In addition, the motion parallax compensating unit 312, similar to the motion parallax prediction/compensation unit 115, generates a prediction vector of a motion parallax vector corresponding to the predicted image generated in the optimal inter prediction mode of the inter prediction information supplied from the lossless decoding unit 302 based on the order reliability flag. In addition, the motion parallax compensating unit 312 generates a motion parallax vector by adding the generated prediction vector and the motion parallax vector information of the inter prediction information supplied from the lossless decoding unit 302 together.

The motion parallax compensating unit 312 performs a compensation process of the optimal inter prediction mode basically using the PU as a processing unit based on the generated motion parallax vector and the reference image, thereby generating a predicted image. In addition, the motion parallax compensating unit 312 performs a compensation process only for an area for which the inter prediction is performed at the time of the coding process based on the inter prediction information supplied from the lossless decoding unit 302. The motion parallax compensating unit 312 supplies the generated predicted image to the calculation unit 305 through the selection unit 313.

The selection unit 313 supplies the predicted image supplied from the intra prediction unit 311 or the predicted image supplied from the motion parallax compensating unit 312 to the calculation unit 305.

While the decoded picture buffer 309 stores the decoded image and the reconfigured image of the current processing viewpoint and the view IDs and the POCs of the decoded image and the reconfigured image, the multi-viewpoint decoded picture buffer 321 stores the decoded image of each viewpoint and the view IDs and the POCs of the decoded images. In other words, the multi-viewpoint decoded picture buffer 321 acquires the decoded images supplied from the decoded picture buffer 309 and the view IDs and the POCs of the decoded images and stores the decoded images and the view IDs and the POCs of the decoded images together with the decoded picture buffer 309.

When the current processing viewpoint is changed, the decoded picture buffer 309 eliminates the decoded image of the previous processing viewpoint, the multi-viewpoint decoded picture buffer 321 maintains the decoded image of the previous processing viewpoint as it is. Then, according to a request from the decoded picture buffer 309 or the like, the decoded image and the view ID and the POC of the decoded image, which are stored, are supplied to the decoded picture buffer 309 as "a decoded image of a non-current processing viewpoint and the view ID and the POC of the decoded image". The decoded picture buffer 309 supplies "the decoded image of a non-current processing viewpoint and the view ID and the POC of the decoded image" read from the multi-viewpoint decoded picture buffer 321 to the motion parallax compensating unit 312 through the selection unit 310.

(Description of Process Performed by Decoding Device)

Figure 19:
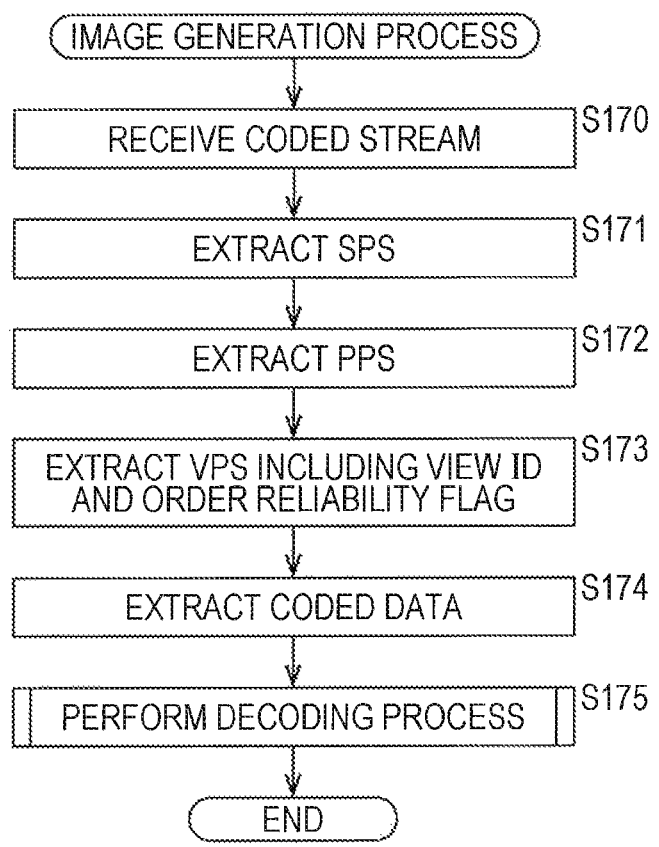
FIG. 19 is a flowchart that illustrates an image generation process performed by the decoding device illustrated in FIG. 17.

FIG. 19 is a flowchart that illustrates an image generation process performed by the decoding device 200 illustrated in FIG. 17.

In Step S170 represented in FIG. 19, the extraction unit 201 of the decoding device 200 receives a coded stream that is transmitted from the encoding device 50. In Step S171, the extraction unit 201 extracts an SPS from the coded stream and supplies the extracted SPS to the decoding unit 202. In Step S172, the extraction unit 201 extracts a PPS from the coded stream and supplies the extracted PPS to the decoding unit 202. In Step S173, the extraction unit 201 extracts a VPS including the view ID and the order reliability flag from the coded stream and supplies the extracted VPS to the decoding unit 202.

In Step S174, the extraction unit 201 extracts coded data from the coded stream and supplies the extracted coded data to the decoding unit 202. In Step S175, the decoding unit 202 performs a decoding process for decoding the coded data supplied from the extraction unit 201 based on the order reliability flag and the view ID included in the VPS that is supplied from the extraction unit 201, and the process ends.

Figure 20:
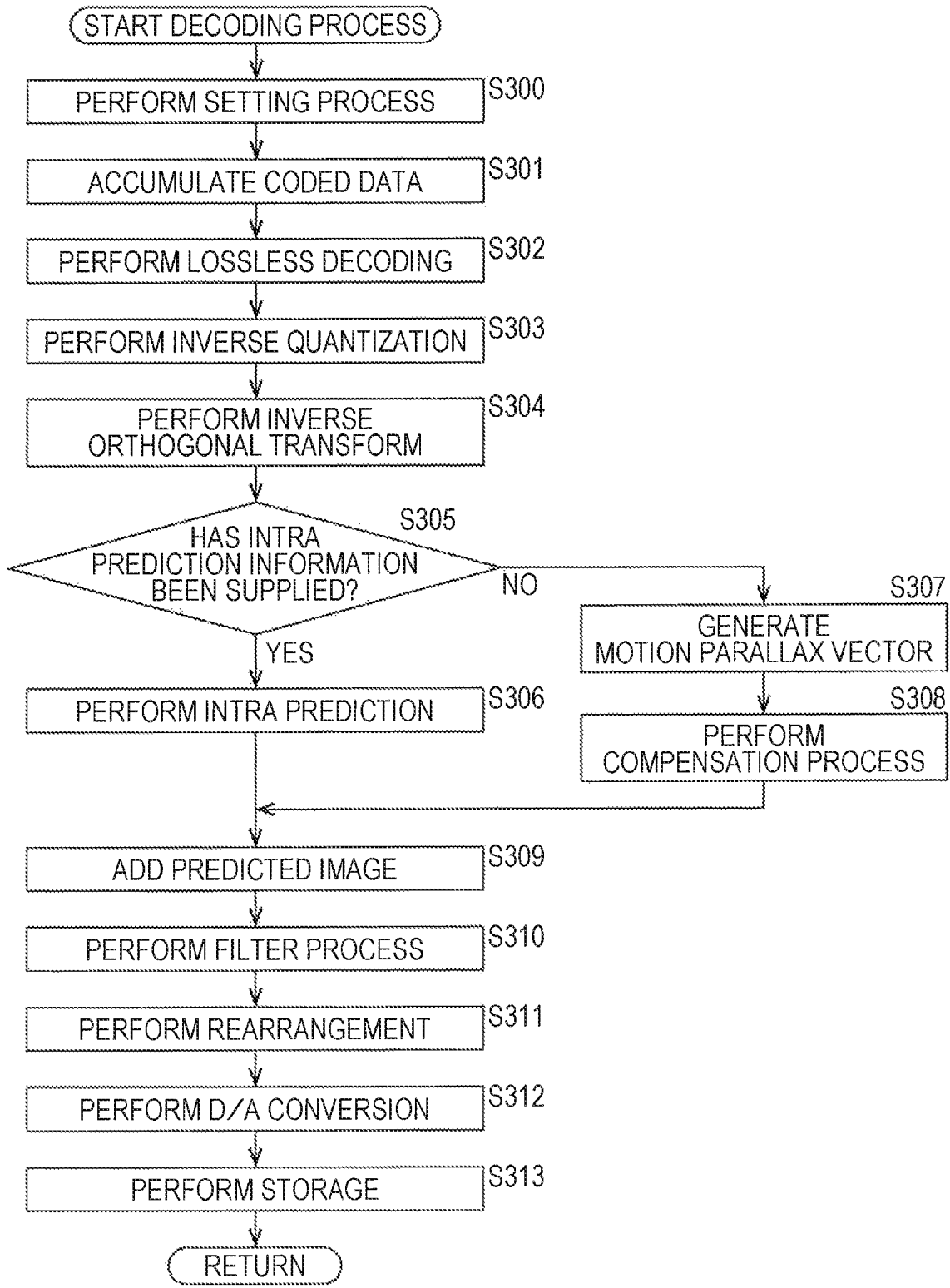
FIG. 20 is a flowchart that illustrates a decoding process illustrated in FIG. 19 in detail.

FIG. 20 is a flowchart that illustrates the decoding process of Step S175 illustrated in FIG. 19 in detail.

In Step S300 represented in FIG. 20, the motion parallax compensating unit 312 performs a setting process similar to the setting process illustrated in FIG. 15. In Step S301, the accumulation buffer 301 accumulates the coded data of a predetermined viewpoint that is supplied from the extraction unit 201 illustrated in FIG. 17 and supplies the coded data to the lossless decoding unit 302 at predetermined timing.

In Step S302, the lossless decoding unit 302 performs lossless decoding of the coded data supplied from the accumulation buffer 301 using a system corresponding to the coding system of the lossless encoding unit 106 illustrated in FIG. 7. The lossless decoding unit 302 supplies a quantized transform coefficient acquired by the lossless decoding process to the inverse quantization unit 303 together with the view ID and the POC of the image corresponding to the transform coefficient.

In addition, in a case where intra prediction information is acquired by decoding the coded data, the lossless decoding unit 302 supplies the intra prediction information to the intra prediction unit 311. On the other hand, in a case where inter prediction information is acquired, the lossless decoding unit 302 supplies the inter prediction information to the motion parallax compensating unit 312.

In Step S303, the inverse quantization unit 303 performs inverse quantization of the quantized transform coefficient supplied from the lossless decoding unit 302 using a system corresponding to the quantization system of the quantization unit 105 illustrated in FIG. 7 and supplies an acquired transform coefficient to the inverse orthogonal trans form unit 304. In Step S304, the inverse orthogonal transform unit 304 performs an inverse orthogonal transform of the transform coefficient supplied from the inverse quantization unit 303 by using a system corresponding to the orthogonal transform system of the orthogonal transform unit 104 illustrated in FIG. 7, thereby acquiring differential information. The differential information acquired by the inverse orthogonal transform is supplied to the calculation unit 305.

In Step S305, the intra prediction unit 311 determines whether or not the intra prediction information is supplied from the lossless decoding unit 302. Ina case where the intra prediction information is determined to be supplied in Step S305, in Step S306, the intra prediction unit 311 performs an intra prediction that is basically the same as that of the intra prediction unit 114 illustrated in FIG. 7. The intra prediction unit 311 supplies a predicted image acquired as a result of the intra prediction to the selection unit 313, and the process proceeds to Step S309.

On the other hand, in a case where the intra prediction information is determined not to be supplied in Step S305, in other words, in a case where the motion parallax compensating unit 312 acquires the inter prediction information, the process proceeds to Step S307. In Step S307, the motion parallax compensating unit 312 generates a motion parallax vector corresponding to the predicted image generated in the optimal inter prediction mode of the inter prediction mode information that is supplied from the lossless decoding unit 302.

In Step S308, the motion parallax compensating unit 312 performs a compensation process of the optimal inter prediction mode basically using the PU as a processing unit based on the generated motion parallax vector and the reference image, thereby generating a predicted image. The motion parallax compensating unit 312 supplies the generated predicted image to the calculation unit 305 through the selection unit 313.

In Step S309, the calculation unit 305 adds the differential information supplied from the inverse orthogonal transform unit 304 and the predicted image supplied from the selection unit 313 together, thereby acquiring a reconfigured image. The calculation unit 305 supplies the reconfigured image to the loop filter 306 or the decoded picture buffer 309.

In Step S310, the loop filter 306, similar to the filter 111 illustrated in FIG. 7, appropriately performs a filter process for the reconfigured image supplied from the calculation unit 305, thereby generating a decoded image. In addition, in a case where a filter coefficient is acquired by the lossless decoding process performed by the lossless decoding unit 302, the loop filter 306 performs a filter process by using the filter coefficient. The loop filter 306 supplies the decoded image that is a result of the filter process to the screen rearrangement buffer 307 and the decoded picture buffer 309.

In Step S311, the screen rearrangement buffer 307 rearranges the decoded image supplied from the loop filter 306. In Step S312, the D/A converter 308 performs a D/A conversion of the decoded image of a multi-viewpoint that is supplied from the screen rearrangement buffer 307 and outputs a multi-viewpoint image acquired as a result thereof to a display not illustrated in the figure so as to be displayed thereon.

In Step S313, the decoded picture buffer 309 stores the reconfigured image supplied from the calculation unit 305 and the view ID and the POC of the reconfigured image. In addition, the decoded picture buffer 309 and the multi-viewpoint decoded picture buffer 321 store the decoded image and the view ID and the POC of the decoded image that are supplied from the loop filter 306. Furthermore, the decoded picture buffer 309 reads and stores the decoded image and the view ID and the POC of the decoded image, which are stored in the multi-viewpoint decoded picture buffer 321, as "the decoded image of a non-current processing viewpoint and the view ID and the POC of the decoded image".

The reconfigured image and the view ID and the POC of the reconfigured image, which are stored in the decoded picture buffer 309, are supplied to the intra prediction unit 311 through the selection unit 310. In addition, the decoded image and the view ID and the POC of the decoded image, which are stored in the decoded picture buffer 309, are supplied to the motion parallax compensating unit 312 through the selection unit 310. Then, the process is returned to Step S175 represented in FIG. 19, and the process ends.

As above, since the decoding device 200 receives the order reliability flag and decodes a multi-viewpoint image based on the order reliability flag, a coded stream transmitted from the encoding device 50 can be decoded.

Second Embodiment (Configuration Example of Encoding Device According to Second Embodiment)

Figure 21:
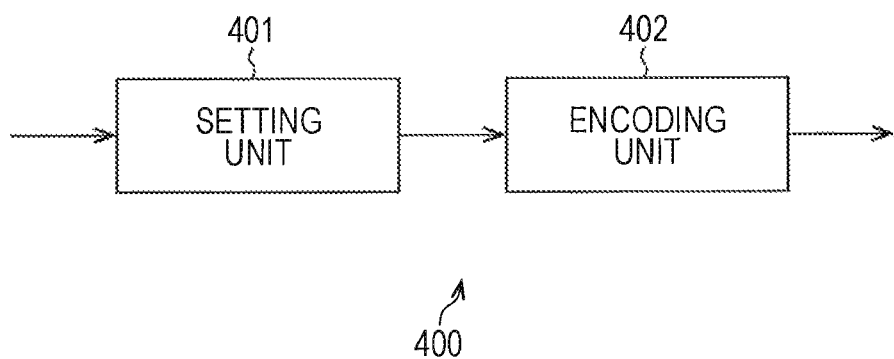
FIG. 21 is a block diagram that illustrates an example of the configuration of an encoding device of a second embodiment to which the present technology is applied.

FIG. 21 is a block diagram that illustrates an example of the configuration of an encoding device of a second embodiment to which the present technology is applied.

An encoding device 400 illustrated in FIG. 21 is configured by a setting unit 401 and an encoding unit 402. The encoding device 400 transmits a VPS with a list flag used for identifying that the list registration process of FIG. 16 is performed and a scaling flag used for identifying that the parallax scaling process is performed being included therein instead of the order reliability flag.

More specifically, the setting unit 401 of the encoding device 400, similar to the setting unit 51 illustrated in FIG. 4, sets an SPS, a PPS, and the like. In addition, the setting unit 401, similar to the setting unit 51, sequentially assigns view IDs from a viewpoint of a camera arranged at the end among a plurality of cameras aligned in a one-dimensional arrangement. Furthermore, the setting unit 401 generates list flags (order reliability information) that are sequentially assigned from the viewpoint of a camera arranged at the end among a plurality of cameras of which the view IDs are aligned in a one-dimensional arrangement and are used for identifying that a list registration process is performed.

In addition, the setting unit 401 generates scaling flags (order reliability information) that are sequentially assigned from the viewpoint of a camera arranged at the end among a plurality of cameras of which the view IDs are aligned in a one-dimensional arrangement and are used for identifying that the parallax scaling process is performed. Then, the setting unit 401 sets a VPS including the view ID, the list flag, and the scaling flag. The setting unit 401 supplies parameter sets such as the SPS, the PPS, and the VPS to the encoding unit 402.

The encoding unit 402 codes a multi-viewpoint image input from the outside by using the 3D coding system based on the list flag, the scaling flag, and the view ID included in the VPS supplied from the setting unit 401, thereby generating coded data. The encoding unit 402 adds the parameter sets supplied from the setting unit 401 to the coded data, thereby generating a coded stream. The encoding unit 402 transmits the generated coded stream.

(Configuration Example of Syntax of VPS)

FIG. 22 is a diagram that illustrates an example of the syntax of a VPS set by the setting unit 401 illustrated in FIG. 21.

As illustrated in the 10th row of FIG. 22, similar to the case represented in FIG. 1, a view ID (view_id) is included in the VPS. In addition, as illustrated in the 11th row, a list flag (inter_view_default_reference_flag) is included in the VPS. The list flag is "1" in a case where it represents that the list registration process is performed and is "0" in a case where it represents that the list registration process is not performed.

In addition, as illustrated in the 12th row, a scaling flag (inter_view_scaling_flag) is included in the VPS. The scaling flag is "1" in a case where it represents that the parallax scaling process is performed and is "0" in a case where it represents that the parallax scaling process is not performed.

Furthermore, as illustrated in the 13th row to the 16th row, in the VPS, similar to the case represented in FIG. 1, the number (num_direct_ref_layers) of reference images, and reference image specifying information (ref_layer_id) are included.

(Configuration Example of Encoding Unit)

Figure 23:
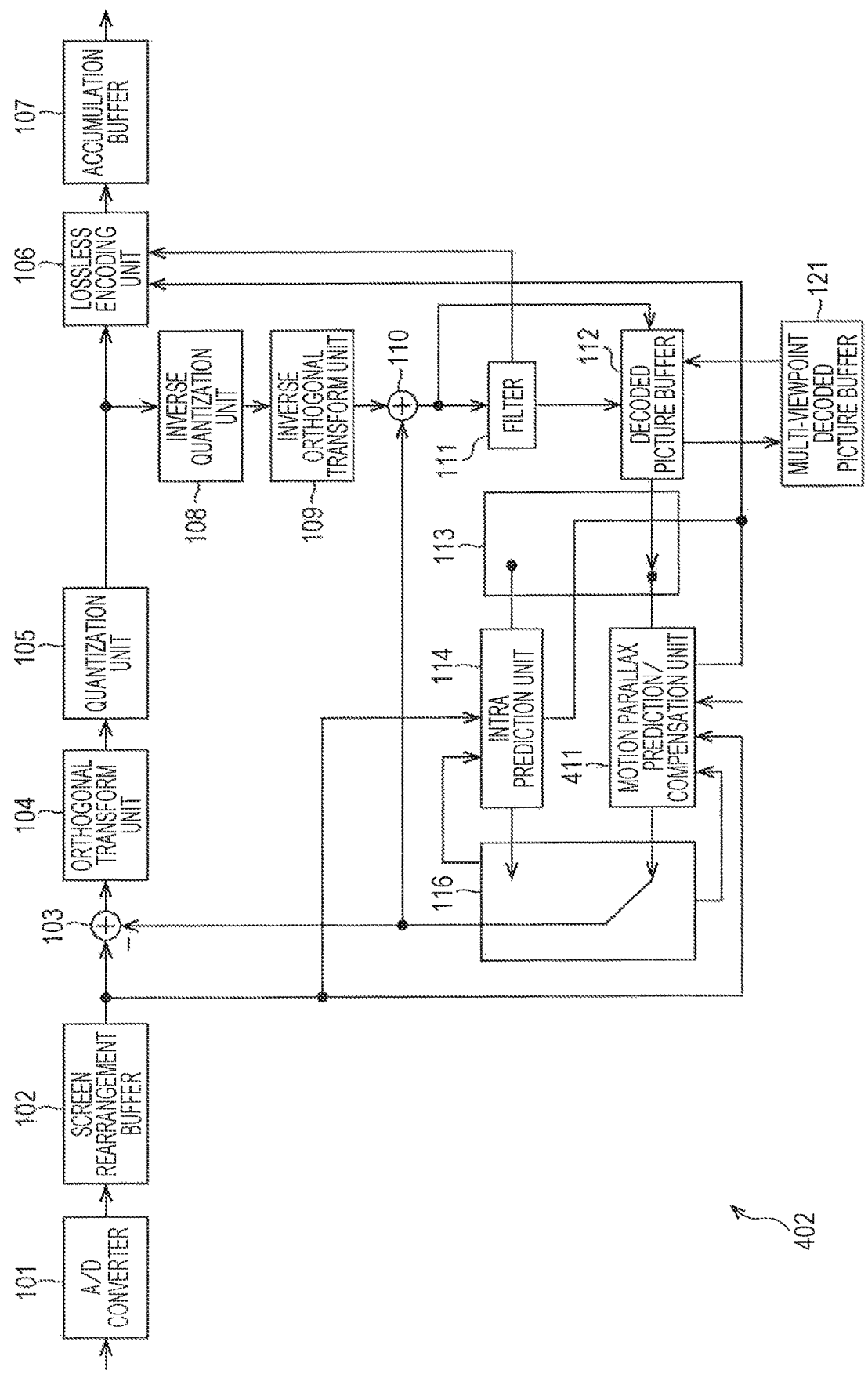
FIG. 23 is a block diagram that illustrates an example of the configuration of an encoding unit illustrated in FIG. 21.

FIG. 23 is a block diagram that illustrates an example of the configuration of the encoding unit 402 illustrated in FIG. 21.

Among the configurations illustrated in FIG. 23, the same reference numeral is assigned to the same configuration as that illustrated in FIG. 7. Duplicate description will not be presented as is appropriate.

The configuration of the encoding unit 402 illustrated in FIG. 23 is different from the configuration of the encoding unit 52 illustrated in FIG. 4 in that a motion parallax prediction/compensation unit 411 is arranged instead of the motion parallax prediction/compensation unit 115.

The motion parallax prediction/compensation unit 411 of the encoding unit 402 registers reference image specifying information included in the VPS in the list based on the list flag included in the VPS that is supplied from the setting unit 401 illustrated in FIG. 21.

The motion parallax prediction/compensation unit 411, similar to the motion parallax prediction/compensation unit 115 illustrated in FIG. 7, reads images specified by the reference image specifying information registered in the list in order of registration for the list from the decoded picture buffer 112 as reference images. The motion parallax prediction/compensation unit 411, similar to the motion parallax prediction/compensation unit 115, performs an inter prediction by using an input image supplied from the screen rearrangement buffer 102 and the reference images and performs a compensation process according to a motion parallax vector detected as a result thereof, thereby generating a predicted image. The motion parallax prediction/compensation unit 411 performs the inter prediction and the compensation process in each of all the inter prediction modes that are candidates.

The motion parallax prediction/compensation unit 411, similar to the motion parallax prediction/compensation unit 115, evaluates cost function values of predicted images and selects an optimal inter prediction mode. Then, the motion parallax prediction/compensation unit 411, similar to the motion parallax prediction/compensation unit 115, supplies the predicted image generated in the optimal inter prediction mode and the cost function value to the predicted image selecting unit 116.

In addition, in a case where a selection is notified from the predicted image selecting unit 116, the motion parallax prediction/compensation unit 411 generates a prediction vector of a motion parallax vector corresponding to the predicted image generated in the optimal inter prediction mode based on the scaling flag. Then, the motion parallax prediction/compensation unit 411 calculates a difference between the generated prediction vector and the motion parallax vector corresponding to the predicted image generated in the optimal inter prediction mode and sets the calculated difference as motion parallax vector information. In addition, the motion parallax prediction/compensation unit 411 supplies the inter prediction information including the motion parallax vector information, the optimal inter prediction mode, and the like to the lossless encoding unit 106 so as to be losslessly coded.

(Description of Process Performed by Encoding Device)

Figure 24:
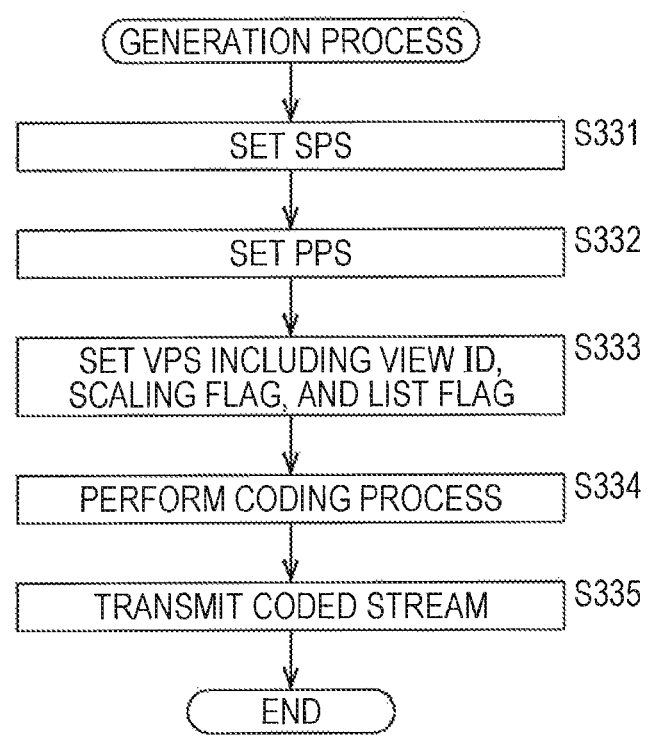
FIG. 24 is a flowchart that illustrates a generation process performed by an encoding device illustrated in FIG. 21.

FIG. 24 is a flowchart that illustrates a generation process performed by the encoding device 400 illustrated in FIG. 21.

The process of Steps S331 and S332 illustrated in FIG. 24 is similar to that of Steps S11 and S12 illustrated in FIG. 13, and the description thereof will not be presented.

After the process of Step S332, in Step S333, the setting unit 401 sets a VPS that includes a view ID, a scaling flag, and a list flag. The setting unit 401 supplies parameter sets such as the SPS, the PPS, and the VPS to the encoding unit 402.

In Step S334, the encoding unit 402 performs a coding process in which a multi-viewpoint image input from the outside is coded using a 3D coding system based on the view ID, the scaling flag, and the list flag included in the VPS that is supplied from the setting unit 401. Details of this coding process are the same as those of the coding process illustrated in FIG. 14 except for a setting process of Step S104 illustrated in FIG. 14. Thus, only the details of the setting process will be described with reference to FIG. 25 to be described later.

In Step S335, the encoding unit 402 generates a coded stream by adding the parameter sets supplied from the setting unit 401 to the coded data accumulated in the accumulation buffer 107 and transmits the generated coded stream. Then, the process ends.

Figure 25:
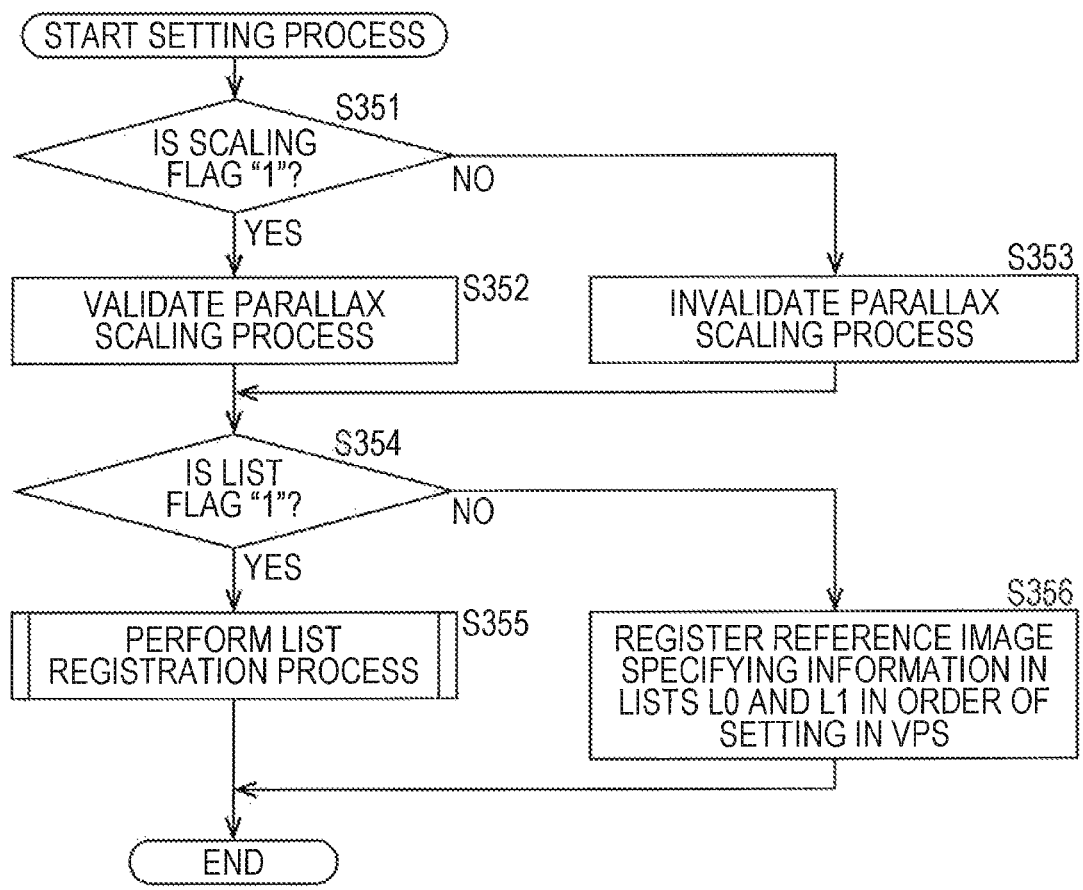
FIG. 25 is a flowchart that illustrates a setting process in a coding process illustrated in FIG. 24 in detail.

FIG. 25 is a flowchart that illustrates a setting process in a coding process of Step S334 illustrated in FIG. 24 in detail.

In Step S351 represented in FIG. 25, the motion parallax prediction/compensation unit 411 determines whether or not the scaling flag included in the VPS supplied from the setting unit 401 is "1". Ina case where the scaling flag is determined to be "1" in Step S351, in Step S352, the motion parallax prediction/compensation unit 411 validates the parallax scaling process, and the process proceeds to Step S354.

On the other hand, in a case where the scaling flag is determined not to be "1" in Step S351, in Step S353, the motion parallax prediction/compensation unit 411 invalidates the parallax scaling process, and the process proceeds to Step S354.

In Step S354, the motion parallax prediction/compensation unit 411 determines whether or not the list flag included in the VPS that is supplied from the setting unit 401 is "1". In a case where the list flag is determined to be "1" in Step S354, in Step S355, the motion parallax prediction/compensation unit 411 performs the list registration process illustrated in FIG. 16. Then, the setting process ends.

On the other hand, in a case where the list flag is determined not to be "1" in Step S354, in Step S356, the motion parallax prediction/compensation unit 411 registers the reference image specifying information in the lists L0 and L1 in order of setting for the VPS. Then, the setting process ends.

As above, since the encoding device 400 codes a multi-viewpoint image based on the list flag and the scaling flag, only in a case where the view IDs are assigned sequentially from the viewpoint of the camera arranged at the end, the list registration process or the parallax scaling process can be performed. As a result thereof, the registration order of reference images (reference pictures of the viewpoint direction) of viewpoints different from that of the current predicting image can be configured to be different between the lists L0 and L1. In addition, the parallax scaling process can be correctly performed. Accordingly, the coding efficiency can be improved.

In addition, in a case where the view IDs are not assigned sequentially from the viewpoint of the camera arranged at the end, by performing the list registration process and the parallax scaling process, it can be prevented to degrade the coding efficiency.

(Configuration Example of Decoding Device According to Second Embodiment)

Figure 26:
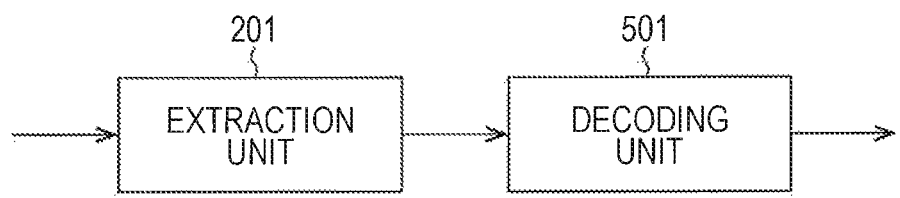
FIG. 26 is a block diagram that illustrates an example of the configuration of a decoding device of the second embodiment to which the present technology is applied.

FIG. 26 is a block diagram that illustrates an example of the configuration of a decoding device of a second embodiment, to which the present technology is applied, decoding a coded stream transmitted from the encoding device 400 illustrated in FIG. 21.

Among the configurations illustrated in FIG. 26, the same reference numeral is assigned to the same configuration as that illustrated in FIG. 17. Duplicate description will not be presented as is appropriate.

The configuration of a decoding device 500 illustrated in FIG. 26 is different from that of the decoding device 200 illustrated in FIG. 17 in that a decoding unit 501 is arranged instead of the decoding unit 202. The decoding device 500 decodes the coded stream transmitted from the encoding device 400 by using a decoding method corresponding to the encoding method used by the encoding device 400, thereby generating a multi-viewpoint image.

More specifically, the decoding unit 501 of the decoding device 500 generates a multi-viewpoint image by decoding the coded data supplied from the extraction unit 201 based on the list flag, the scaling flag, and the view ID included in the VPS supplied from the extraction unit 201. At this time, the decoding unit 501 refers to the SPS, the PPS, and the like as is necessary. Then, the decoding unit 501 outputs the multi-viewpoint image.

(Configuration Example of Decoding Unit)

Figure 27:
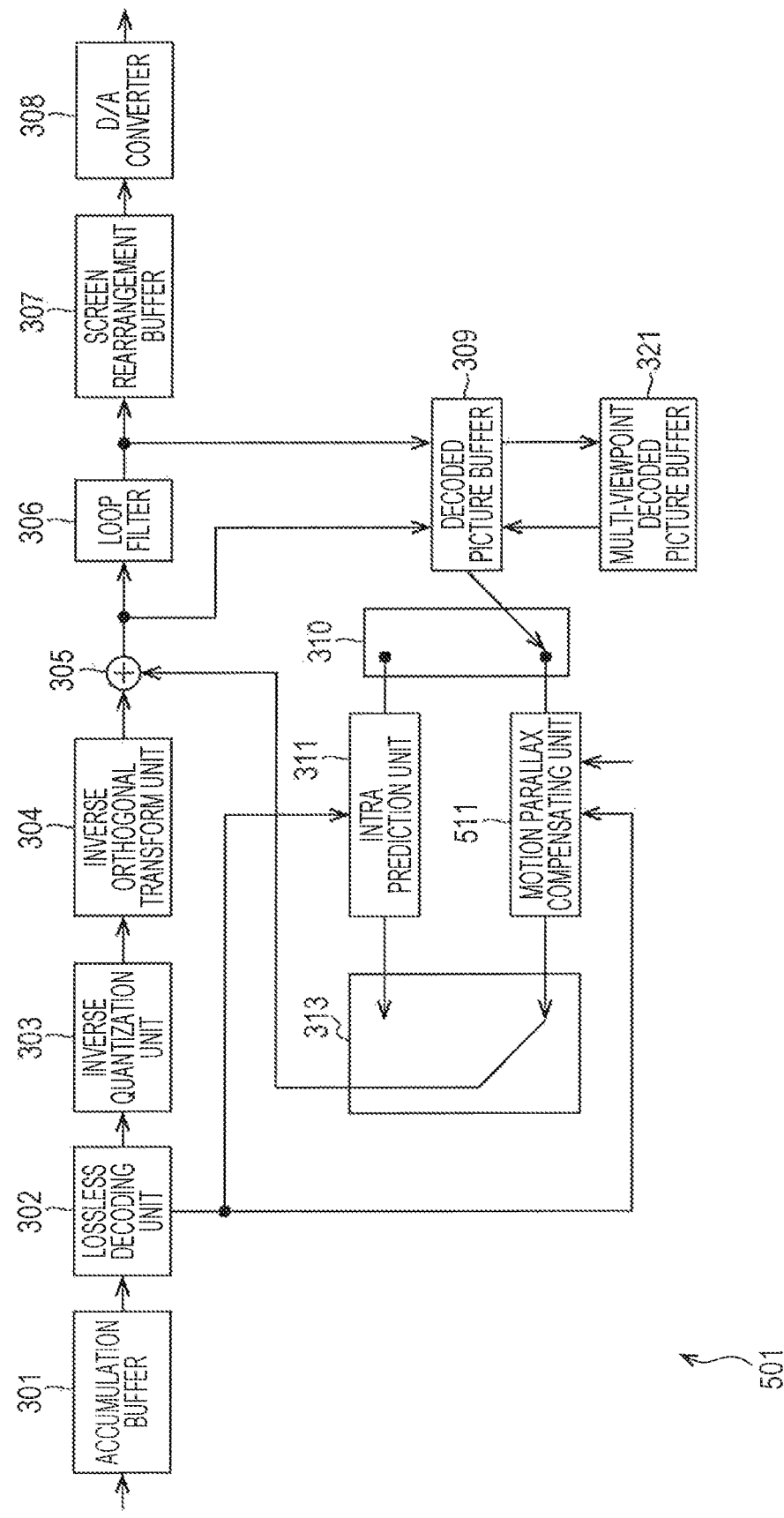
FIG. 27 is a block diagram that illustrates an example of the configuration of a decoding unit illustrated in FIG. 26.

FIG. 27 is a block diagram that illustrates an example of the configuration of the decoding unit 501 illustrated in FIG. 26.

Among the configurations illustrated in FIG. 27, the same reference numeral is assigned to the same configuration as that illustrated in FIG. 18. Duplicate description will not be presented as is appropriate.

The configuration of the decoding unit 501 illustrated in FIG. 27 is different from that of the decoding unit 202 illustrated in FIG. 18 in that a motion parallax compensating unit 511 is arranged instead of the motion parallax compensating unit 312.

The motion parallax compensating unit 511, similar to the motion parallax prediction/compensation unit 411 illustrated in FIG. 23, registers the reference image specifying information included in the VPS in the list based on the list flag included in the VPS that is supplied from the extraction unit 201 illustrated in FIG. 26. Then, the motion parallax compensating unit 511 reads images specified by the reference image specifying information registered in the list in order of registration for the list from the decoded picture buffer 309 as reference images.

In addition, the motion parallax compensating unit 511, similar to the motion parallax prediction/compensation unit 411, generates a prediction vector of a motion parallax vector corresponding to the predicted image generated in the optimal inter prediction mode of the inter prediction information supplied from the lossless decoding unit 302 based on the scaling flag. Then, the motion parallax compensating unit 511 adds the generated prediction vector and the motion parallax vector information of the inter prediction information that is supplied from the lossless decoding unit 302 together, thereby generating a motion parallax vector.

The motion parallax compensating unit 511 performs a compensation process of the optimal inter prediction mode basically using the PU as a processing unit based on the generated motion parallax vector and the reference images, thereby generating a predicted image. In addition, the motion parallax compensating unit 511 performs the motion parallax compensation only for an area for which the inter prediction has been performed at the time of coding based on the inter prediction information supplied from the lossless decoding unit 302. The motion parallax compensating unit 511 supplies the generated predicted image to the calculation unit 305 through the selection unit 313.

(Description of Process Performed by Decoding Device)

Figure 28:
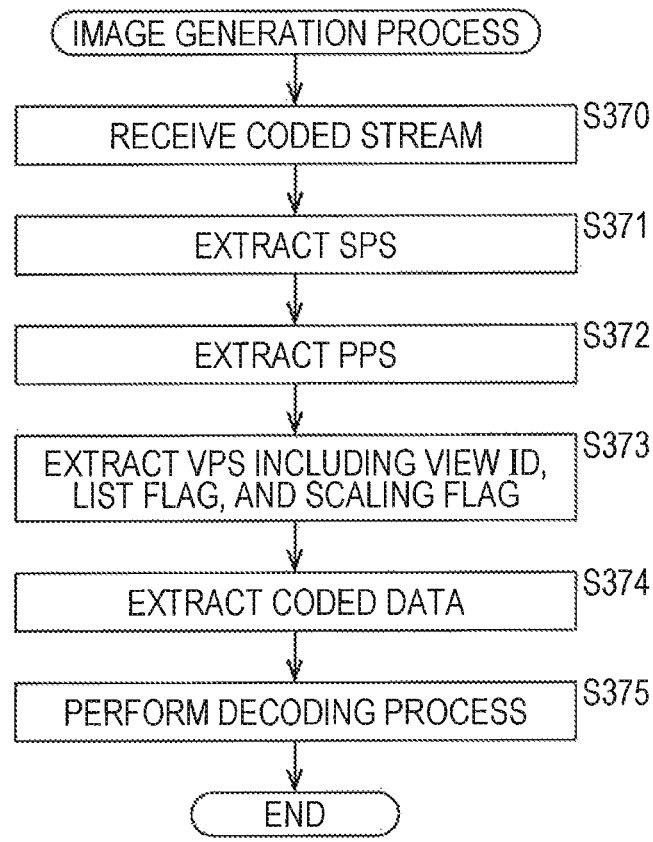
FIG. 28 is a flowchart that illustrates an image generation process performed by the decoding device illustrated in FIG. 26.

FIG. 28 is a flowchart that illustrates an image generation process performed by the decoding device 500 illustrated in FIG. 26.

The process of Steps S370 to S372 illustrated in FIG. 28 is similar to that of Steps S170 to S172 illustrated in FIG. 19, and the description thereof will not be presented. In Step S373, the extraction unit 201 extracts a VPS that includes the view ID, the list flag, and the scaling flag from the coded stream and supplies the extracted VPS to the decoding unit 501.

In Step S374, the extraction unit 201 extracts coded data from the coded stream and supplies the extracted coded data to the decoding unit 501. In Step S375, the decoding unit 501 performs a decoding process for decoding the coded data supplied from the extraction unit 201 based on the view ID, the list flag, and the scaling flag included in the VPS that is supplied from the extraction unit 201. Details of this decoding process are the same as those of the decoding process illustrated in FIG. 20 except that a setting process of Step S300 represented in FIG. 20 replaces the setting process similar to the setting process represented in FIG. 25. After the process of Step S375, the process ends.

As above, since the decoding device 500 receives the list flag and the scaling flag and decodes a multi-viewpoint image based on the list flag and the scaling flag, the coded stream transmitted from the encoding device 400 can be decoded.

Third Embodiment (Configuration Example of Encoding Device According to Third Embodiment)

Figure 29:
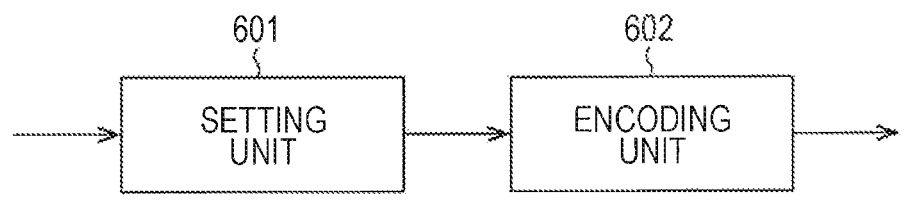
FIG. 29 is a block diagram that illustrates an example of the configuration of an encoding device of a third embodiment to which the present technology is applied.

FIG. 29 is a block diagram that illustrates an example of the configuration of an encoding device of a third embodiment to which the present technology is applied.

An encoding device 600 illustrated in FIG. 29 is configured by a setting unit 601 and an encoding unit 602. The encoding device 600 transmits a VPS with coefficient information representing the coefficient tb and the coefficient td in the parallax scaling process being included therein instead of the scaling flag.

More specifically, the setting unit 601 of the encoding device 600, similar to the setting unit 51 illustrated in FIG. 4, sets an SPS, a PPS, and the like. In addition, the setting unit 601, similar to the setting unit 51, sequentially assigns view IDs from a viewpoint of a camera arranged at the end among a plurality of cameras aligned in a one-dimensional arrangement. Furthermore, the setting unit 601 generates the list flag and the coefficient information.

In addition, while the coefficient information is generated as described with reference to FIG. 8 in a case where the view IDs are assigned sequentially from the viewpoint of a camera arranged at the end among a plurality of cameras aligned in a one-dimensional arrangement, a predetermined value is generated as the coefficient information in a case where the view IDs are not assigned sequentially from the above-described viewpoint.

The setting unit 601 sets a VPS including the view ID, the list flag, and the coefficient information. The setting unit 601 supplies parameter sets such as the SPS, the PPS, and the VPS to the encoding unit 602.

The encoding unit 602 codes a multi-viewpoint image input from the outside by using the 3D coding system based on the list flag, the coefficient information, and the view ID included in the VPS supplied from the setting unit 601, thereby generating coded data. The encoding unit 602 adds the parameter sets supplied from the setting unit 601 to the coded data, thereby generating a coded stream. The encoding unit 602 transmits the generated coded stream.

(Configuration Example of Syntax of VPS)

FIG. 30 is a diagram that illustrates an example of the syntax of the VPS set by the setting unit 601 illustrated in FIG. 29.

As illustrated in the 10th row of FIG. 30, similar to the case illustrated in FIG. 1, a view ID (view_id) is included in the VPS. In addition, as illustrated in the 11th row, similar to the case illustrated in FIG. 22, the list flag (inter_view_default_reference_flag) is included in the VPS.

In addition, as illustrated in the 12th row to 16th row, in the VPS, the number (num_direct_ref_layers) of reference images, the reference image specifying information (ref_layer_id), and the coefficient information (inter_view_scaling_factor) are included.

(Configuration Example of Encoding Unit)

Figure 31:
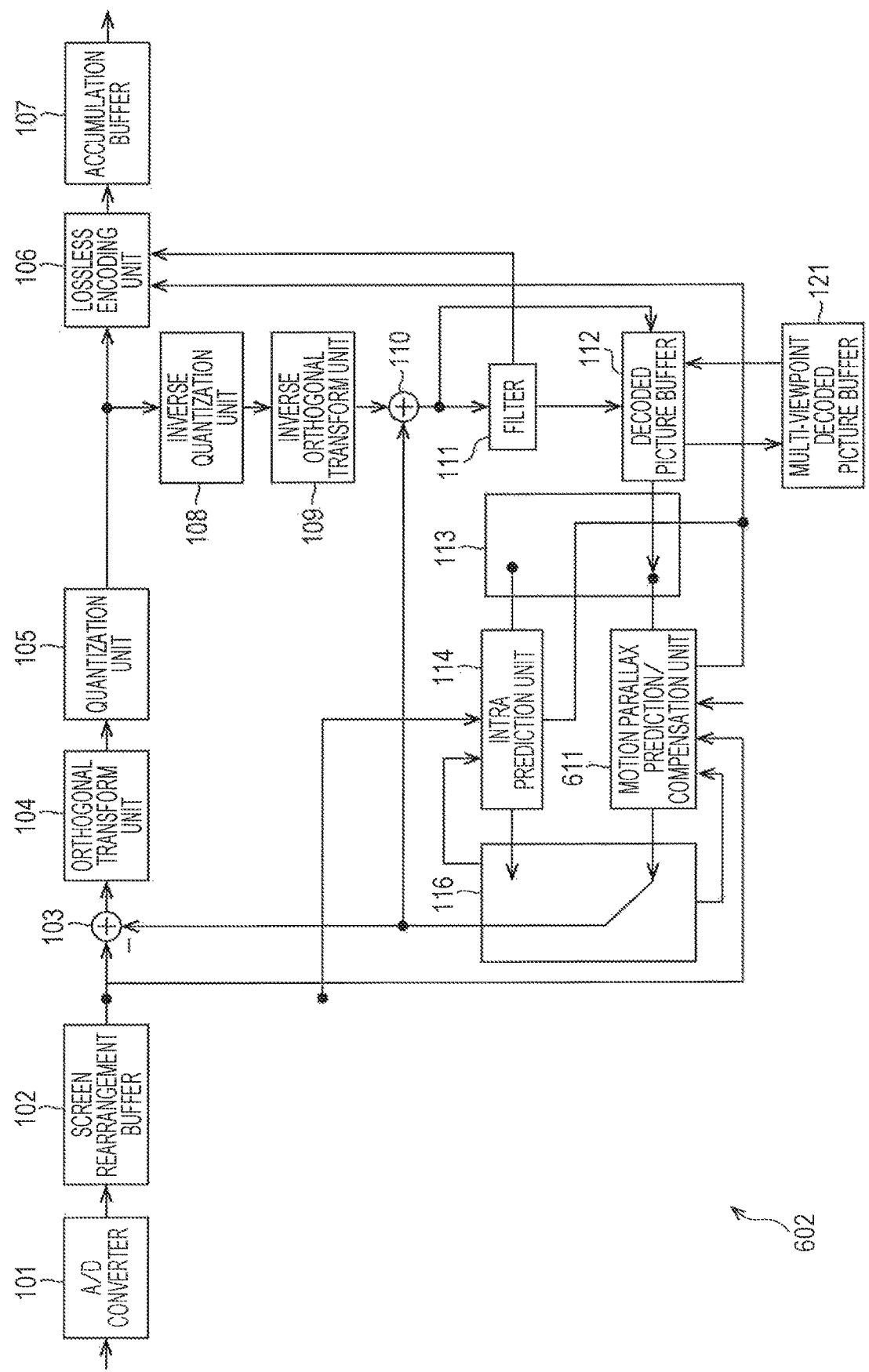
FIG. 31 is a block diagram that illustrates an example of the configuration of an encoding unit illustrated in FIG. 29.

FIG. 31 is a block diagram that illustrates an example of the configuration of the encoding unit 602 illustrated in FIG. 29.

Among the configurations illustrated in FIG. 31, the same reference numeral is assigned to the same configuration as that illustrated in FIG. 23. Duplicate description will not be presented as is appropriate.

The configuration of the encoding unit 602 illustrated in FIG. 31 is different from the configuration of the encoding unit 402 illustrated in FIG. 23 in that a motion parallax prediction/compensation unit 611 is arranged instead of the motion parallax prediction/compensation unit 411.

The motion parallax prediction/compensation unit 611 of the encoding unit 602, similar to the motion parallax prediction/compensation unit 411, registers the reference image specifying information in the list based on the list flag included in the VPS that is supplied from the setting unit 601 illustrated in FIG. 29.

The motion parallax prediction/compensation unit 611, similar to the motion parallax prediction/compensation unit 411, reads images specified by the reference image specifying information registered in the list in order of registration for the list from the decoded picture buffer 112 as reference images. The motion parallax prediction/compensation unit 611, similar to the motion parallax prediction/compensation unit 411, performs an inter prediction by using an input image supplied from the screen rearrangement buffer 102 and the reference images and performs a compensation process according to a motion parallax vector detected as a result thereof, thereby generating a predicted image. The motion parallax prediction/compensation unit 611 performs such an inter prediction and the compensation process in each of all the inter prediction modes that are candidates.

The motion parallax prediction/compensation unit 611, similar to the motion parallax prediction/compensation unit 411, evaluates cost function values of predicted images and selects an optimal inter prediction mode. Then, the motion parallax prediction/compensation unit 611, similar to the motion parallax prediction/compensation unit 411, supplies the predicted image generated in the optimal inter prediction mode and the cost function value to the predicted image selecting unit 116.

In addition, in a case where a selection is notified from the predicted image selecting unit 116, the motion parallax prediction/compensation unit 611 generates a prediction vector of a motion parallax vector corresponding to the predicted image generated in the optimal inter prediction mode by using the coefficient information. More specifically, in a case where the motion parallax vector corresponding to the predicted image generated in the optimal inter prediction mode is the motion vector, the motion parallax prediction/compensation unit 611 performs a time scaling process. On the other hand, in a case where the motion parallax vector corresponding to the predicted image generated in the optimal inter prediction mode is the motion vector, the motion parallax prediction/compensation unit 611 performs a parallax scaling process by using the coefficient information.

Then, the motion parallax prediction/compensation unit 611 calculates a difference between the generated prediction vector and the motion parallax vector corresponding to the predicted image generated in the optimal inter prediction mode and sets the calculated difference as motion parallax vector information. The motion parallax prediction/compensation unit 611 supplies the inter prediction information including the motion parallax vector information, the optimal inter prediction mode, and the like to the lossless encoding unit 106 so as to be coded.

(Description of Process Performed by Encoding Device)

Figure 32:
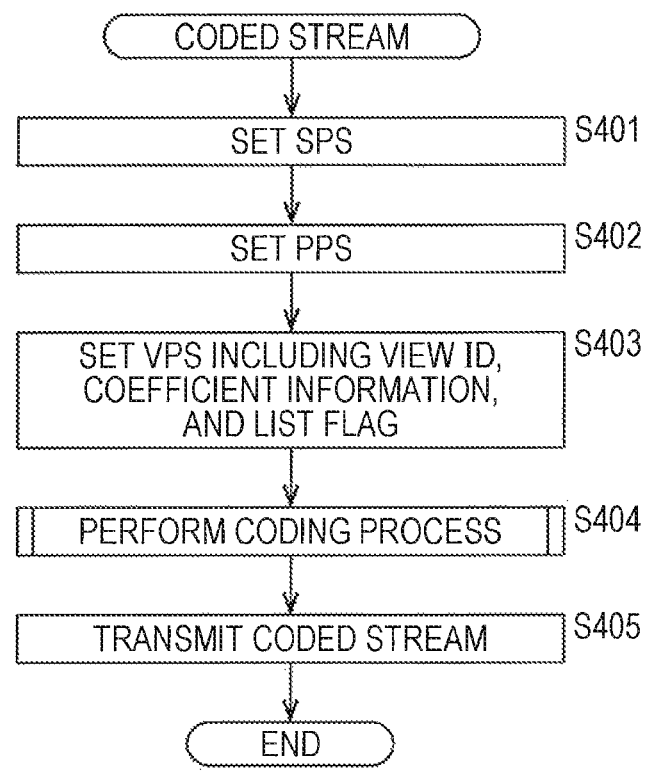
FIG. 32 is a flowchart that illustrates a generation process performed by an encoding device illustrated in FIG. 29.

FIG. 32 is a flowchart that illustrates a generation process performed by the encoding device 600 illustrated in FIG. 29.

The process of Steps S401 and S402 illustrated in FIG. 32 is similar to that of Steps S331 and S332 illustrated in FIG. 24, and the description thereof will not be presented.

After the process of Step S402, in Step S403, the setting unit 601 sets a VPS that includes a view ID, coefficient information, and a list flag. The setting unit 601 supplies parameter sets such as the SPS, the PPS, and the VPS to the encoding unit 602.

In Step S404, the encoding unit 602 performs a coding process in which a multi-viewpoint image input from the outside is coded using a 3D coding system based on the view ID, the coefficient information, and the list flag included in the VPS that is supplied from the setting unit 601. This coding process will be described in detail with reference to FIG. 33 to be described later.

In Step S405, the encoding unit 602 generates a coded stream by adding the parameter sets supplied from the setting unit 601 to the coded data accumulated in the accumulation buffer 107 and transmits the generated coded stream. Then, the process ends.

Figure 33:
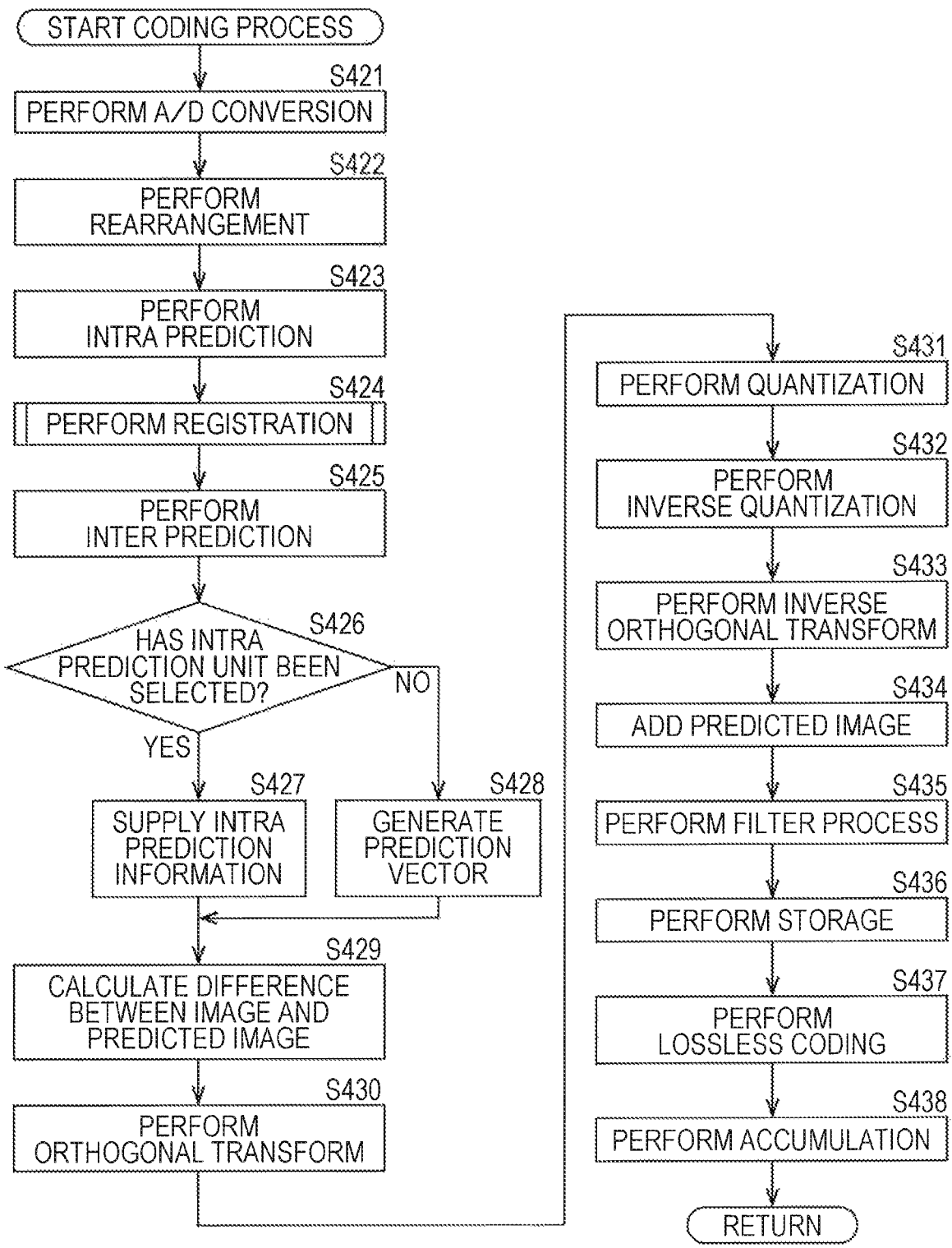
FIG. 33 is a flowchart that illustrates a coding process illustrated in FIG. 32 in detail.

FIG. 33 is a flowchart that illustrates the coding process of Step S404 represented in FIG. 32 in detail.

The process of Steps S421 to S423 illustrated in FIG. 33 is similar to that of Steps S101 to S103 illustrated in FIG. 14, and the description thereof will not be presented.

In Step S424, the motion parallax prediction/compensation unit 611 performs a registration process for registering the lists L0 and L1 based on the list flag included in the VPS that is supplied from the setting unit 601 illustrated in FIG. 29. This registration process will be described in detail with reference to FIG. 34 to be described later.

The process of Steps S425 to S427 is similar to that of Steps S105 to S107 illustrated in FIG. 14, and the description thereof will not be presented.

In a case where the intra prediction unit is determined not to be selected in Step S426, the predicted image selecting unit 116 supplies the predicted image supplied from the motion parallax prediction/compensation unit 611 to the calculation unit 103 and the calculation unit 110 and notifies the motion parallax prediction/compensation unit 611 of the selection. Then, in Step S428, the motion parallax prediction/compensation unit 611 generates a prediction vector of a motion parallax vector corresponding to the predicted image generated in the optimal inter prediction mode by using the coefficient information included in the VPS supplied from the setting unit 601.

Then, the motion parallax prediction/compensation unit 611 acquires a difference between the prediction vector and the motion parallax vector corresponding to the predicted image generated in the optimal inter prediction mode as motion parallax vector information. Then, the motion parallax prediction/compensation unit 611 supplies the inter prediction information including the motion parallax vector information, the optimal inter prediction mode, and the like to the lossless encoding unit 106, and the process proceeds to Step S429.

The process of Steps S429 to S438 is similar to that of Steps S109 to S118 illustrated in FIG. 14.

Figure 34:
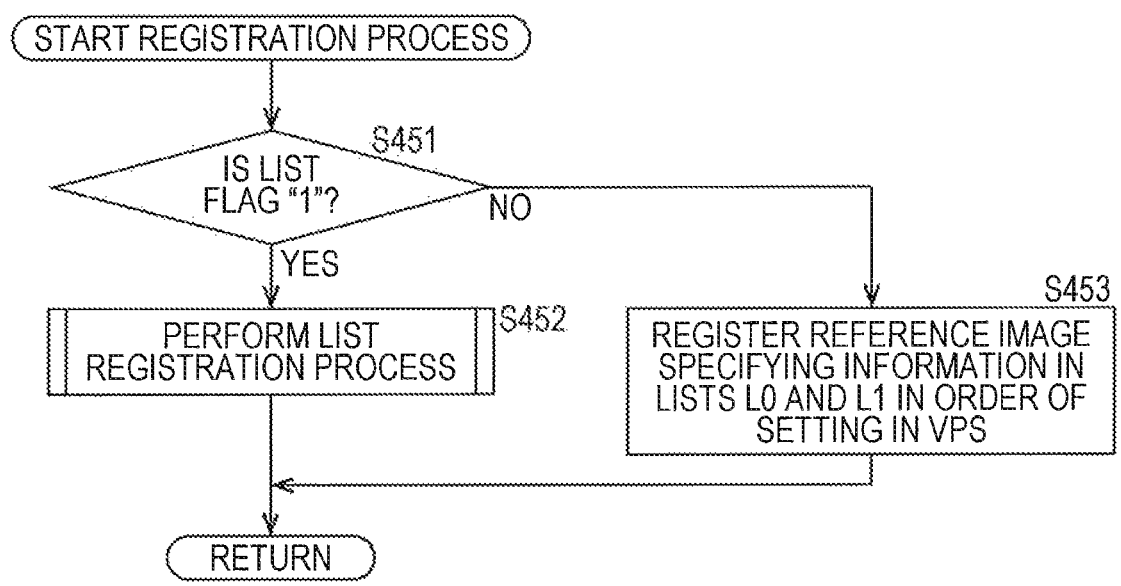
FIG. 34 is a flowchart that illustrates a registration process illustrated in FIG. 33 in detail.

FIG. 34 is a flowchart that illustrates the registration process of Step S424 illustrated in FIG. 33 in detail.

The process of Steps S451 to S453 illustrated in FIG. 34 is similar to that of Steps S354 to S356 illustrated in FIG. 25, and the description thereof will not be presented.

As above, since the encoding device 600 codes a multi-viewpoint image by using the coefficient information, the parallax scaling process can be correctly performed regardless whether or not view IDs are assigned sequentially from a viewpoint of a camera arranged at the end. Accordingly, the coding efficiency can be improved.

(Configuration Example of Decoding Device According to Third Embodiment)

Figure 35:
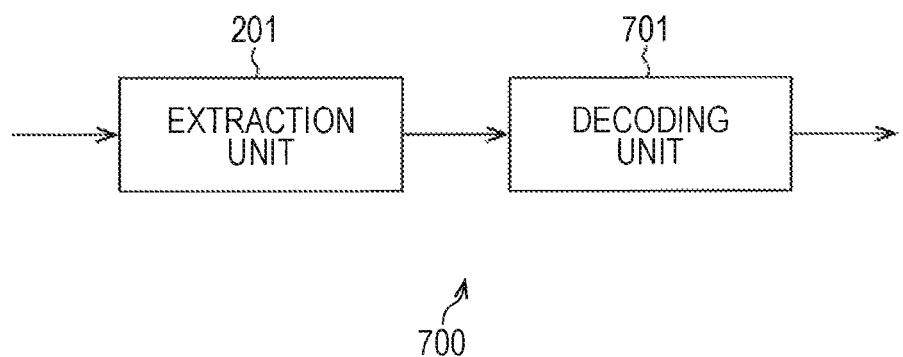
FIG. 35 is a block diagram that illustrates an example of the configuration of a decoding device of a third embodiment to which the present technology is applied.

FIG. 35 is a block diagram that illustrates an example of the configuration of a decoding device of a third embodiment, to which the present technology is applied, decoding a coded stream transmitted from the encoding device 600 illustrated in FIG. 29.

Among the configurations illustrated in FIG. 35, the same reference numeral is assigned to the same configuration as that illustrated in FIG. 26. Duplicate description will not be presented as is appropriate.

The configuration of a decoding device 700 illustrated in FIG. 35 is different from that of the decoding device 500 illustrated in FIG. 26 in that a decoding unit 701 is arranged instead of the decoding unit 501. The decoding device 700 decodes the coded stream transmitted from the encoding device 600 by using a decoding method corresponding to the encoding method used by the encoding device 600, thereby generating a multi-viewpoint image.

More specifically, the decoding unit 701 of the decoding device 700 generates a multi-viewpoint image by decoding the coded data supplied from the extraction unit 201 based on the list flag, the coefficient information, and the view ID included in the VPS supplied from the extraction unit 201. At this time, the decoding unit 701 refers to the SPS, the PPS, and the like as is necessary. Then, the decoding unit 701 outputs the multi-viewpoint image.

(Configuration Example of Decoding Unit)

Figure 36:
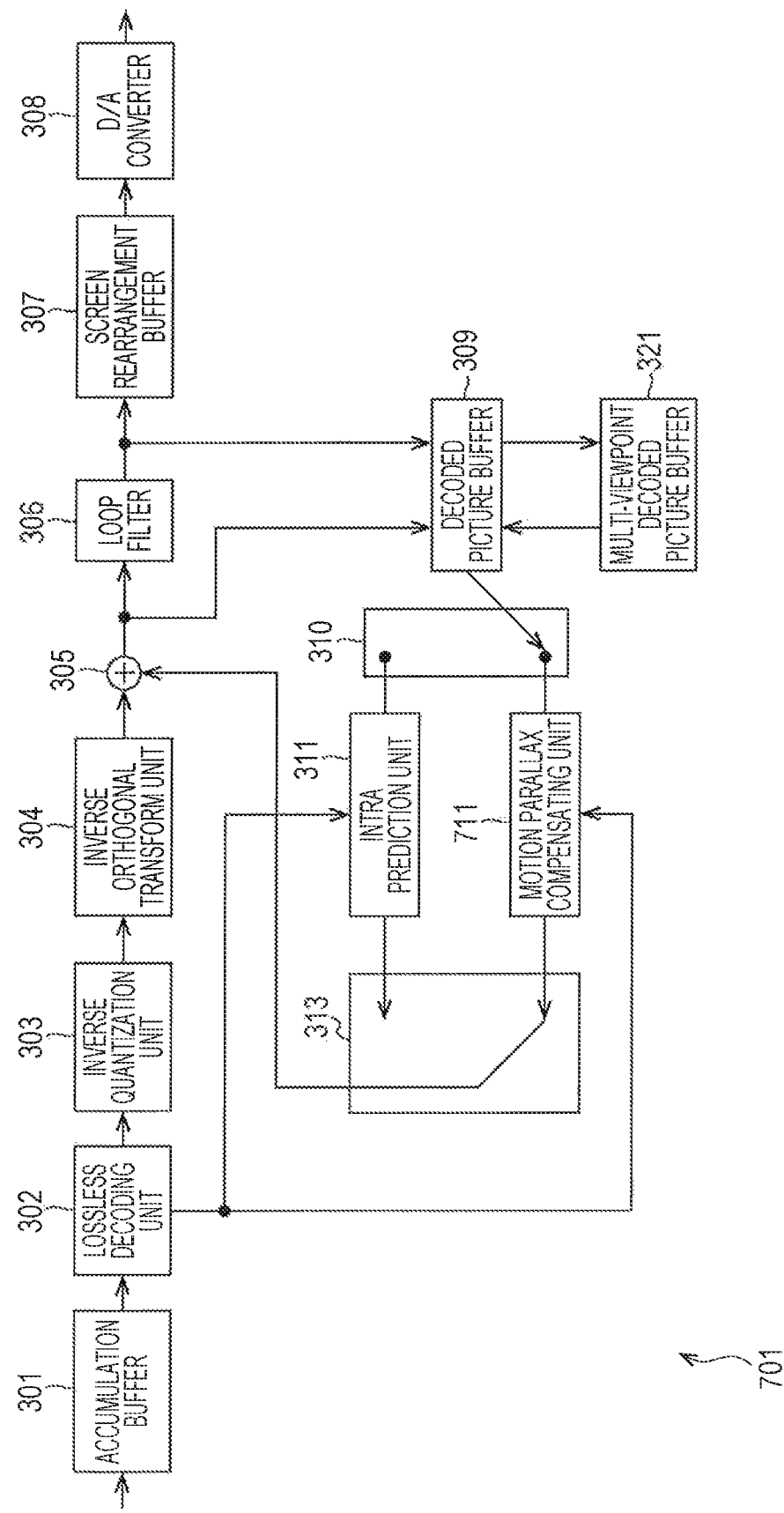
FIG. 36 is a block diagram that illustrates an example of the configuration of a decoding device illustrated in FIG. 35.

FIG. 36 is a block diagram that illustrates an example of the configuration of the decoding unit 701 illustrated in FIG. 35.

Among the configurations illustrated in FIG. 36, the same reference numeral is assigned to the same configuration as that illustrated in FIG. 27. Duplicate description will not be presented as is appropriate.

The configuration of the decoding unit 701 illustrated in FIG. 36 is different from that of the decoding unit 501 illustrated in FIG. 27 in that a motion parallax compensating unit 711 is arranged instead of the motion parallax compensating unit 511.

The motion parallax compensating unit 711, similar to the motion parallax prediction/compensation unit 611 illustrated in FIG. 31, registers the reference image specifying information included in the VPS in the list based on the list flag included in the VPS that is supplied from the extraction unit 201 illustrated in FIG. 35. Then, the motion parallax compensating unit 711 read images specified by the reference image specifying information registered in the list in order of registration for the list from the decoded picture buffer 309 as reference images.

In addition, the motion parallax compensating unit 711, similar to the motion parallax prediction/compensation unit 611, generates a prediction vector of a motion parallax vector corresponding to the predicted image generated in the optimal inter prediction mode of the inter prediction information supplied from the lossless decoding unit 302 by using the coefficient information. Then, the motion parallax compensating unit 711 adds the generated prediction vector and the motion parallax vector information of the inter prediction information that is supplied from the lossless decoding unit 302 together, thereby generating a motion parallax vector.

The motion parallax compensating unit 711 performs a compensation process of the optimal inter prediction mode basically using the PU as a processing unit based on the generated motion parallax vector and the reference images, thereby generating a predicted image. In addition, the motion parallax compensating unit 711 performs the motion parallax compensation only for an area for which the inter prediction has been performed at the time of coding based on the inter prediction information supplied from the lossless decoding unit 302. The motion parallax compensating unit 711 supplies the generated predicted image to the calculation unit 305 through the selection unit 313.

(Description of Process Performed by Decoding Device)

Figure 37:
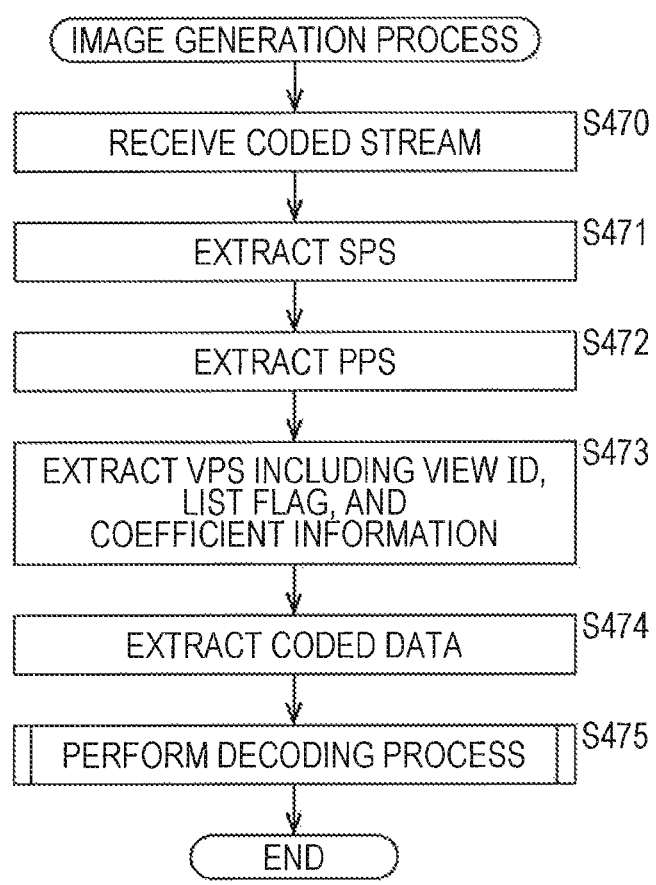
FIG. 37 is a flowchart that illustrates an image generation process performed by the decoding device illustrated in FIG. 35.

FIG. 37 is a flowchart that illustrates an image generation process performed by the decoding device 700 illustrated in FIG. 35.

The process of Steps S470 to S472 illustrated in FIG. 37 is similar to that of Steps S370 to S372 illustrated in FIG. 28, and the description thereof will not be presented. In Step S473, the extraction unit 201 extracts a VPS that includes the view ID, the list flag, and the coefficient information from the coded stream and supplies the extracted VPS to the decoding unit 701.

In Step S474, the extraction unit 201 extracts coded data from the coded stream and supplies the extracted coded data to the decoding unit 701. In Step S475, the decoding unit 701 performs a decoding process for decoding the coded data supplied from the extraction unit 201 based on the list flag, the coefficient information and the view ID included in the VPS that is supplied from the extraction unit 201. Details of this decoding process will be described with reference to FIG. 38 to be described later. After the process of Step S475, the process ends.

Figure 38:
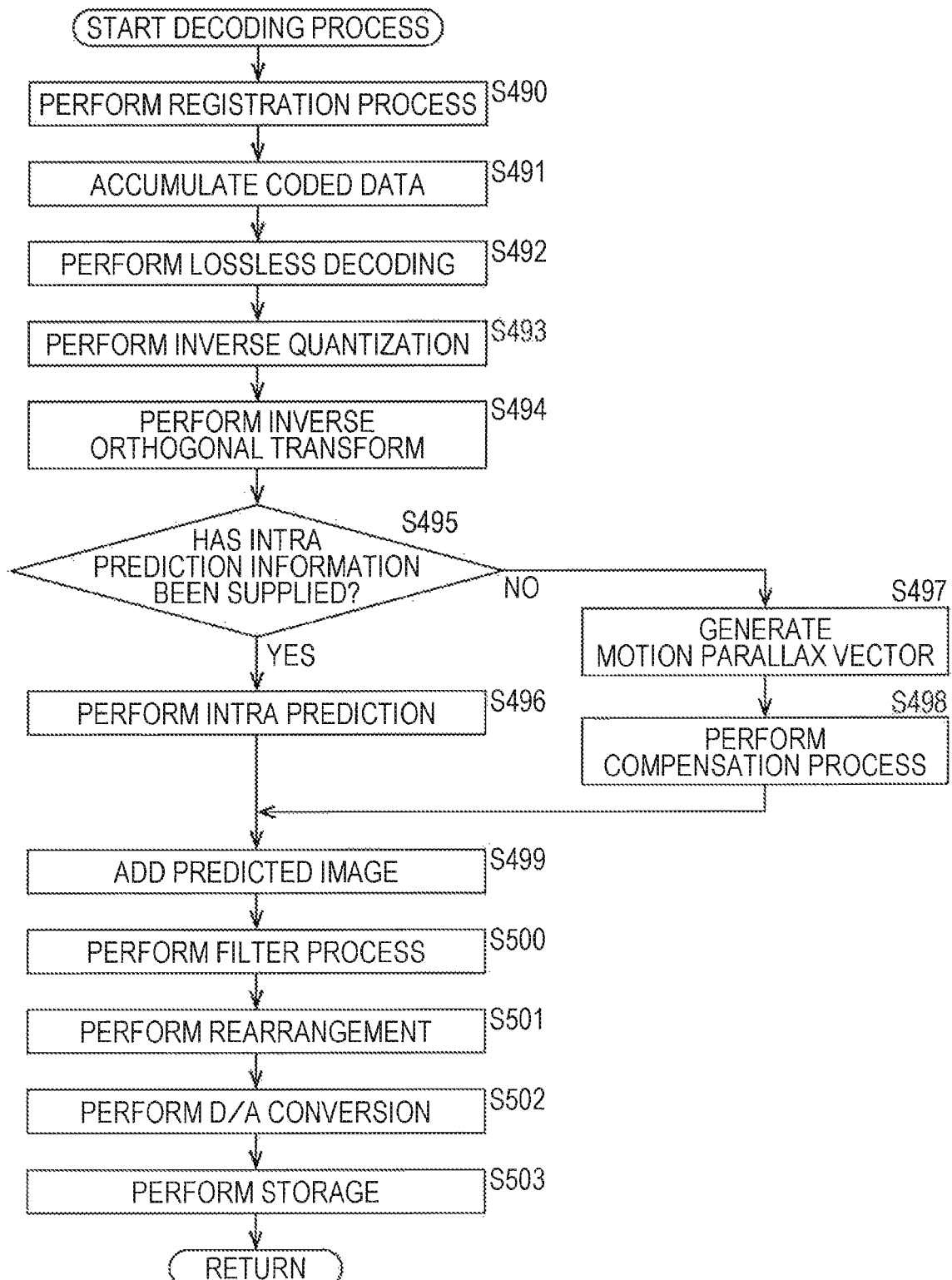
FIG. 38 is a flowchart that illustrates a decoding process illustrated in FIG. 37 in detail.

FIG. 38 is a flowchart that illustrates the decoding process of Step S475 illustrated in FIG. 37 in detail.

In Step S490 represented in FIG. 38, the motion parallax compensating unit 711 performs a registration process that is similar to the registration process illustrated in FIG. 34. The process of Steps S491 to S496 is similar to that of Steps S301 to S306 represented in FIG. 20, and the description thereof will not be presented.

In a case where the intra prediction information is determined not to be supplied in Step S495, the process proceeds to Step S497. In Step S497, the motion parallax compensating unit 711 generates a motion parallax vector corresponding to the predicted image generated in the optimal inter prediction mode supplied from the lossless decoding unit 302 by using the coefficient information included in the VPS supplied from the extraction unit 201 illustrated in FIG. 35. Then, the process proceeds to Step S498.

The process of Steps S498 to S503 is similar to that of Steps S308 to S313 illustrated in FIG. 20, and the description thereof will not be presented.

As above, since the decoding device 700 receives the list flag and the coefficient information and decodes a multi-viewpoint image based on the list flag and the coefficient information, the coded stream transmitted from the encoding device 600 can be decoded.

In the third embodiment, while the coefficient information is generated also in a case where the view IDs are not assigned sequentially from the viewpoint of the camera arranged at the end, it may be configured such that the coefficient information is not generated, and the parallax scaling process is not performed.

In addition, in the third embodiment, while the list flag is included in the coded stream, the order reliability flag may be configured to be included in the coded stream instead of the list flag. In such a case, the list registration process is performed based on the order reliability flag.

Fourth Embodiment

<Description of Computer to which Present Technology is Applied>

The series of processes described above may be performed by hardware or software. In a case where the series of processes is performed by software, a program that configures the software is installed to a computer. Here, the computer includes a computer that is built into dedicated hardware, a computer that can execute various functions by having various programs installed thereto such as a general-purpose computer, and the like.

Figure 39:
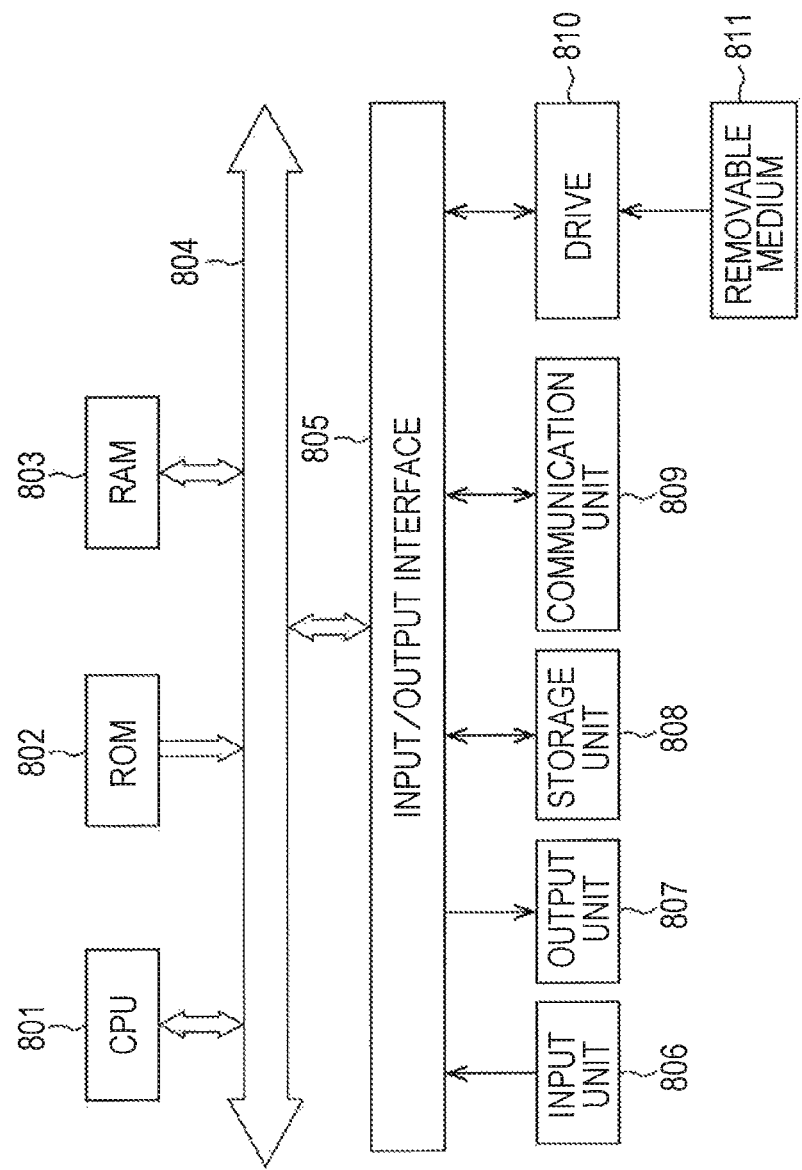
FIG. 39 is a block diagram that illustrates an example of the hardware configuration of a computer.

FIG. 39 is a block diagram that illustrates an example of the hardware configuration of the computer that executes the series of processes described above in accordance with a program.

In the computer, a CPU (Central Processing Unit) 801, a ROM (Read Only Memory) 802, and a RAM (Random Access Memory) 803 are interconnected through a bus 804.

In addition, an input/output interface 805 is connected to the bus 804. To the input/output interface 805, an input unit 806, an output unit 807, a storage unit 808, a communication unit 809, and a drive 810 are connected.

The input unit 806 is configured by a keyboard, a mouse, a microphone, and the like. The output unit 807 is configured by a display, a speaker, and the like. The storage unit 808 is configured by a hard disk, a non-volatile memory, or the like. The communication unit 809 is configured by a network interface or the like. The drive 810 drives a removable medium 811 such as a magnetic disk, an optical disc, a magneto-optical disk, or a semiconductor memory.

In the computer configured as described above, the CPU 801 performs the series of processes described above, for example, by loading a program stored in the storage unit 808 into the RAM 803 through the input/output interface 805 and the bus 804 and executing the program.

The program executed by the computer (CPU 801), for example, may be provided by being recorded on the removable medium 811 as a package medium or the like. In addition, the program may be provided through a wired or wireless transmission medium such as a local area network, the Internet, or digital satellite broadcasting.

In the computer, the program can be installed to the storage unit 808 through the input/output interface 805 by loading the removable medium 811 into the drive 810. In addition, the program may be received by the communication unit 809 through a wired or wireless transmission medium and be installed to the storage unit 808. Furthermore, the program may be installed in advance to the ROM 802 or the storage unit 808.

In addition, the program executed by the computer may be a program that performs the process in a time series in the sequence described here or may be a program that performs the process in a parallel manner or at necessary timing such as timing when the program is called.

Fifth Embodiment

<Configuration Example of Television Apparatus>

Figure 40:
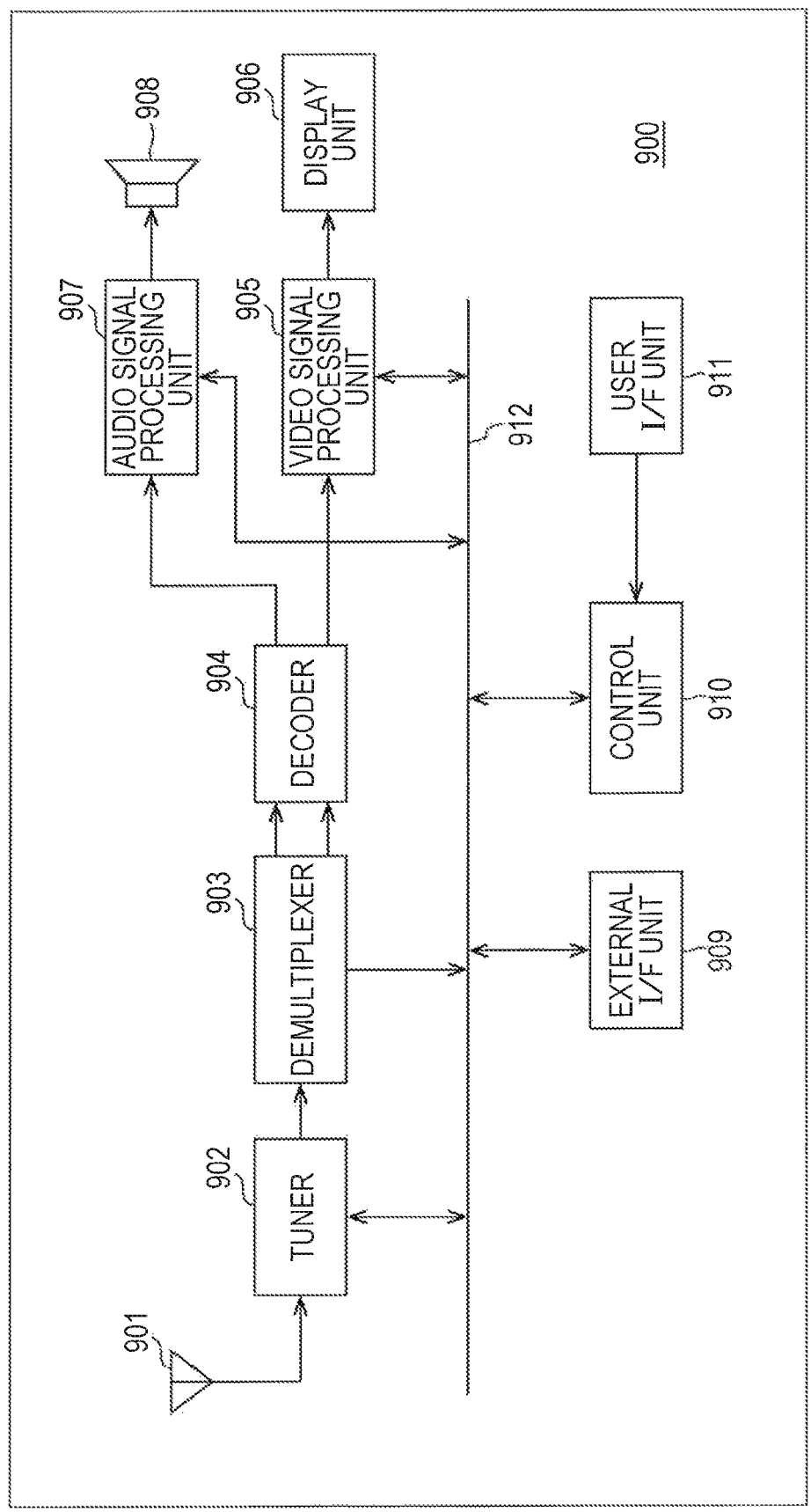
FIG. 40 illustrates an example of the schematic configuration of a television apparatus to which the present technology is applied.

FIG. 40 illustrates the schematic configuration of a television apparatus to which the present technology is applied. A television apparatus 900 includes: an antenna 901; a tuner 902; a demultiplexer 903; a decoder 904; a video signal processing unit 905; a display unit 906; an audio signal processing unit 907; a speaker 908; and an external interface unit 909. In addition, the television apparatus 900 includes a control unit 910, a user interface unit 911, and the like.

The tuner 902 selects a desired channel from broadcast wave signals received by the antenna 901, performs demodulation, and outputs an acquired coded bitstream to the demultiplexer 903.

The demultiplexer 903 extracts a packet of a video or an audio of a current viewing program from the coded bitstream and outputs data of the extracted packet to the decoder 904. In addition, the demultiplexer 903 supplies a packet of data such as an EPG (Electronic Program Guide) or the like to the control unit 910. Furthermore, in a case where scrambling is performed, the scrambling is released using a demultiplexer or the like.

The decoder 904 performs a decoding process of a packet and outputs video data generated by the decoding process to the video signal processing unit 905 and outputs audio data to the audio signal processing unit 907.

The video signal processing unit 905 performs noise removal, video processing according to a user setting, and the like for the video data. The video signal processing unit 905 generates video data of a program that is to be displayed on the display unit 906, image data according to a process that is based on an application supplied through a network, and the like. In addition, the video signal processing unit 905 generates video data for displaying a menu screen such as an item selection screen and the like and overlaps the generated video data on the video data of the program. The video signal processing unit 905 generates a drive signal based on the video data generated as above and drives the display unit 906.

The display unit 906 drives a display device (for example, a liquid crystal display device or the like) based on the drive signal supplied from the video signal processing unit 905, thereby displaying a video of a program and the like.

The audio signal processing unit 907 performs a predetermined process such as noise removal for the audio data, performs a D/A conversion process of audio data after the process or an amplification process thereof, and supplies resultant data to the speaker 908, thereby performing audio output.

The external interface unit 909 is an interface used for a connection to an external device or a network and transmits/receives data such as video data or audio data.

The user interface unit 911 is connected to the control unit 910. The user interface unit 911 is configured by an operation switch, a remote control signal reception unit, and the like and supplies an operation signal according to a user operation to the control unit 910.

The control unit 910 is configured by a CPU (Central Processing Unit), a memory, and the like. The memory stores a program executed by the CPU, various kinds of data that is necessary for the process performed by the CPU, EPG data, data acquired through a network, and the like. The program that is stored in the memory is read and executed by the CPU at predetermined timing such as start-up of the television apparatus 900. By executing the program, the CPU performs control of each unit such that the television apparatus 900 operates in accordance with a user operation.

In addition, in the television apparatus 900, in order to connect the tuner 902, the demultiplexer 903, the video signal processing unit 905, the audio signal processing unit 907, the external interface unit 909, and the like to the control unit 910, a bus 912 is disposed.

In the television apparatus configured in this way, the function of the decoding device (decoding method) according to the present application is implemented in the decoder 904. Accordingly, a coded stream having improved coding efficiency of an image of a plurality of viewpoints can be decoded.

Sixth Embodiment (Configuration Example of Mobile Phone)

Figure 41:
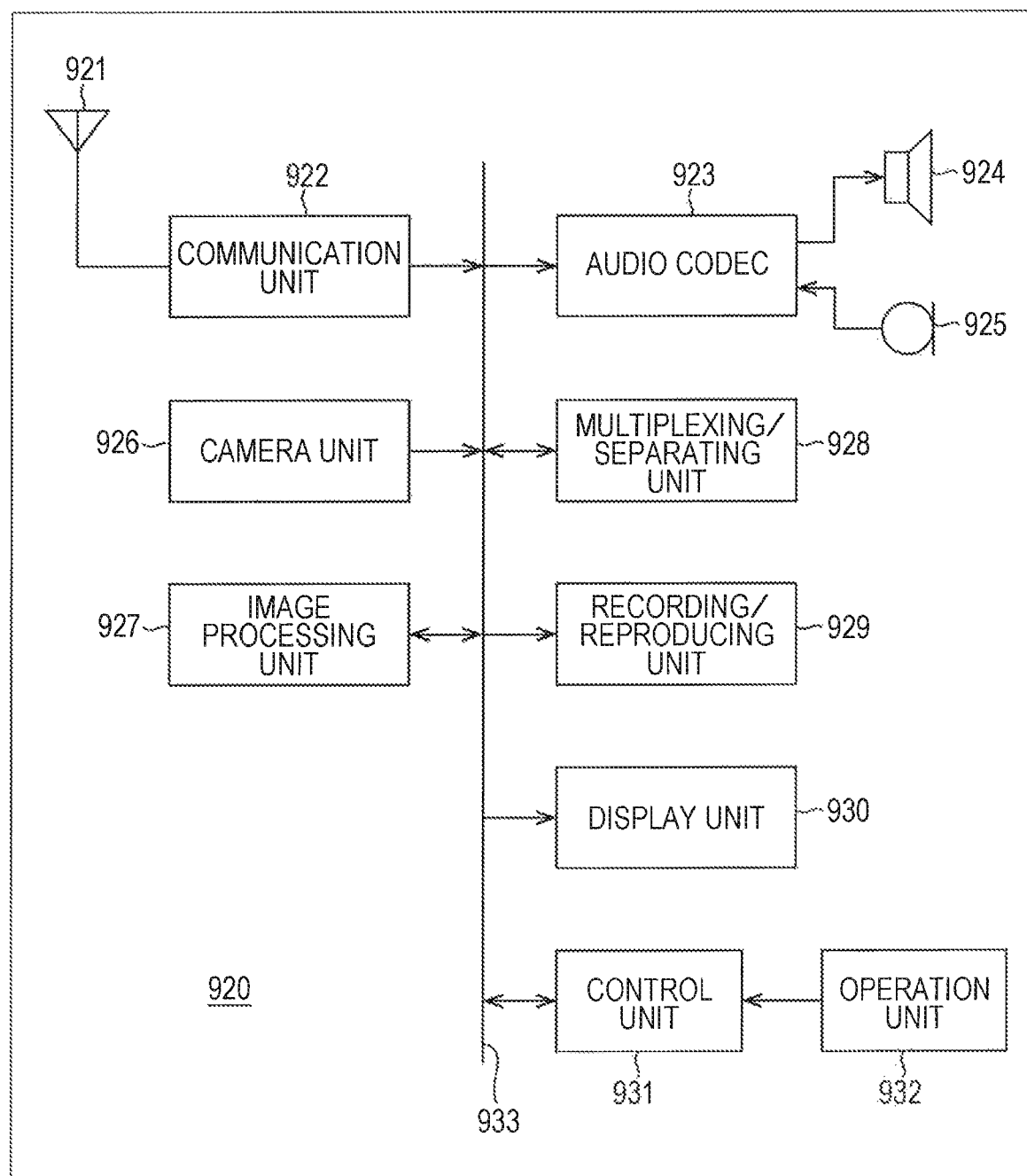
FIG. 41 illustrates an example of the schematic configuration of a mobile phone to which the present technology is applied.

FIG. 41 illustrates the schematic configuration of a mobile phone to which the present technology is applied. A mobile phone 920 includes: a communication unit 922; an audio codec 923; a camera unit 926; an image processing unit 927; a multiplexing/separating unit 928; a recording/reproducing unit 929; a display unit 930; and a control unit 931. These are interconnected through a bus 933.

In addition, an antenna 921 is connected to the communication unit 922, and a speaker 924 and a microphone 925 are connected to the audio codec 923. Furthermore, an operation unit 932 is connected to the control unit 931.

The mobile phone 920 performs various operations such as transmission and reception of an audio signal, transmission and reception of an electronic mail and image data, image capturing, and data recording in various modes such as a voice call mode and a data communication mode.

In the voice call mode, an audio signal generated by the microphone 925 is converted into audio data or compressed by the audio codec 923, and a resultant signal is supplied to the communication unit 922. The communication unit 922 performs a modulation process, a frequency conversion process, and the like for the audio data, thereby generating a transmission signal. In addition, the communication unit 922 supplies a transmission signal to the antenna 921 so as to be transmitted to abase station not illustrated in the figure. Furthermore, the communication unit 922 performs an amplification process, a frequency conversion process, a demodulation process, and the like for a reception signal received by the antenna 921 and supplies acquired audio data to the audio codec 923. The audio codec 923 performs data decompression of the audio data and converts the audio data into an analog audio signal and outputs a resultant signal to the speaker 924.

In addition, in the data communication mode, in a case where a mail is transmitted, the control unit 931 receives character data input by an operation for the operation unit 932 and displays the input characters on the display unit 930. Furthermore, the control unit 931 generates mail data based on a user's instruction or the like from the operation unit 932 and supplies the generated mail data to the communication unit 922. The communication unit 922 performs a modulation process, a frequency conversion process, and the like for the mail data and transmits an acquired transmission signal from the antenna 921. In addition, the communication unit 922 performs an amplification process, a frequency conversion process, a demodulation process, and the like for the reception signal received by the antenna 921, thereby restoring the mail data. This mail data is supplied to the display unit 930, whereby the content of the mail is displayed.

In addition, the mobile phone 920 can store the received mail data in a storage medium using the recording/reproducing unit 929. The storage medium may be an arbitrary rewritable storage medium. For example, the storage medium is a semiconductor memory such as a RAM or a built-in type flash memory, a hard disk, a magnetic disk, a magneto-optical disk, an optical disc, or a removable medium such as a USB (Universal Serial Bus) memory or a memory card.

In the data communication mode, in a case where image data is transmitted, the image data generated by the camera unit 926 is supplied to the image processing unit 927. The image processing unit 927 performs a coding process of the image data, thereby generating coded data.

The multiplexing/separating unit 928 multiplexes coded data generated by the image processing unit 927 and audio data supplied from the audio codec 923 in accordance with a predetermined system and supplies multiplexed data to the communication unit 922. The communication unit 922 performs a modulation process, a frequency conversion process, and the like of the multiplexed data and transmits an acquired transmission signal from the antenna 921. In addition, the communication unit 922 performs an amplification process, a frequency conversion process, a demodulation process, and the like for the reception signal received by the antenna 921, thereby restoring the multiplexed data. This multiplexed data is supplied to the multiplexing/separating unit 928. The multiplexing/separating unit 928 separates the multiplexed data and supplies coded data to the image processing unit 927 and supplies audio data to the audio codec 923. The image processing unit 927 performs a decoding process of the coded data, thereby generating image data. This image data is supplied to the display unit 930, whereby the received image is displayed. The audio codec 923 converts audio data into an analog audio signal and supplies the converted analog audio signal to the speaker 924, thereby outputting the received audio.

In the mobile phone device configured in this way, the functions of the encoding device and the decoding device (an encoding method and a decoding method) according to the present application are implemented in the image processing unit 927. Accordingly, the coding efficiency of an image of a plurality of viewpoints can be improved. In addition, a coded stream having improved coding efficiency of an image of a plurality of viewpoints can be decoded.

Seventh Embodiment (Configuration Example of Recording and Reproducing Device)

Figure 42:
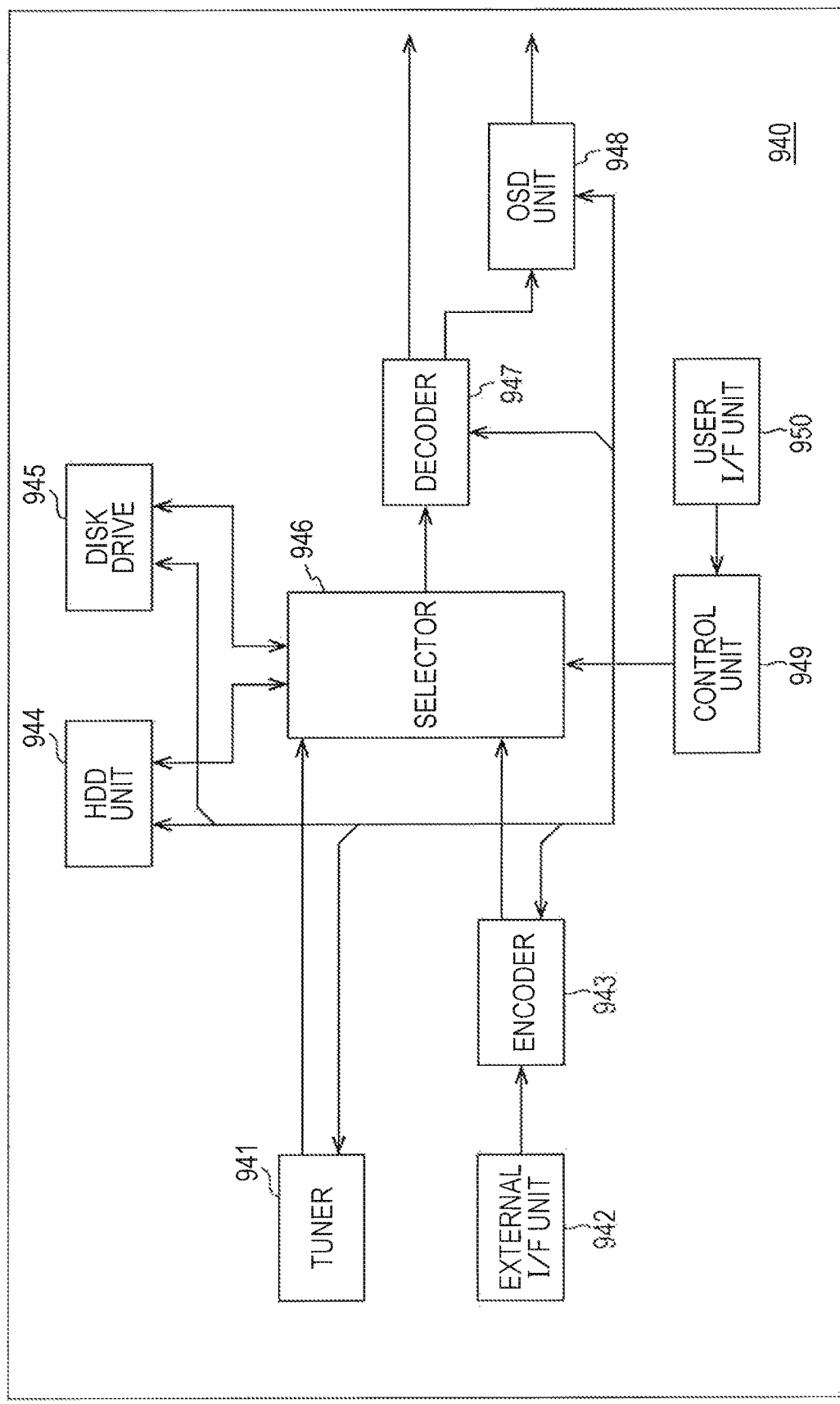
FIG. 42 illustrates an example of the schematic configuration of a recording and reproducing apparatus to which the present technology is applied.

FIG. 42 illustrates the schematic configuration of a recording and reproducing device to which the present technology is applied. A recording and reproducing device 940, for example, records audio data and video data of a received broadcast program on a recording medium and provides the recorded data for a user at timing according to a user's instruction. In addition, the recording and reproducing device 940, for example, may acquire audio data and video data from another device and record the audio data and the video data on a recording medium. Furthermore, the recording and reproducing device 940 decodes and outputs the audio data and the video data, which are recorded on the recording medium, whereby the display of an image or the output of an audio can be performed in a monitor device or the like.

The recording and reproducing device 940 includes: a tuner 941; an external interface unit 942; an encoder 943; an HDD (Hard Disk Drive) unit 944; a disk driver 945; a selector 946; a decoder 947; an OSD (On-Screen Display) unit 948; a control unit 949; and a user interface unit 950.

The tuner 941 selects a desired channel from among broadcast signals received by an antenna not illustrated in the figure. The tuner 941 outputs a coded bitstream acquired by demodulating a reception signal of the desired channel to the selector 946.

The external interface unit 942 is configured by at least one of an IEEE1394 interface, a network interface unit, a USB interface, a flash memory interface, and the like. The external interface unit 942 is an interface for a connection to an external device, a network, a memory card, or the like and performs data reception of video data, audio data, and the like to be recorded.

When the video data and the audio data supplied from the external interface unit 942 are not coded, the encoder 943 codes the video data and the audio data in accordance with a predetermined system and outputs a coded bitstream to the selector 946.

The HDD unit 944 records content data such as videos and audios, various programs, other data, and the like on a built-in hard disk and reads the recorded data from the hard disk at the time of reproduction or the like.

The disk driver 945 performs signal recording and signal reproducing for a loaded optical disc. The optical disc, for example, is a DVD disc (a DVD-Video, a DVD-RAM, a DVD-R, a DVD-RW, a DVD+R, a DVD+RW, or the like), a Blu-ray (registered trademark) disc, or the like.

When a video or an audio is recorded, the selector 946 selects any one of coded bitstream supplied from the tuner 941 or the encoder 943 and supplies the selected code bitstream to one of the HDD unit 944 and the disk driver 945. In addition, when a video or an audio is reproduced, the selector 946 supplies a coded bitstream output from the HDD unit 944 or the disk driver 945 to the decoder 947.

The decoder 947 performs a decoding process of the coded bit stream. The decoder 947 supplies video data that is generated by performing the decoding process to the OSD unit 948. In addition, the decoder 947 outputs audio data that is generated by performing the decoding process.

The OSD unit 948 generates video data used for displaying a menu screen such as an item selection menu or the like and outputs the generated video data so as to overlap the video data output from the decoder 947.

The user interface unit 950 is connected to the control unit 949. The user interface unit 950 is configured by an operation switch, a remote control signal reception unit, and the like and supplies an operation signal according to a user operation to the control unit 949.

The control unit 949 is configured by using a CPU, a memory, and the like. The memory stores programs that are executed by the CPU and various kinds of data that is necessary for the process performed by the CPU. A program stored in the memory is read and executed by the CPU at predetermined timing such as the start-up of the recording and reproducing device 940. The CPU executes programs, thereby performing control of each unit such that the recording and reproducing device 940 operates in accordance with a user operation.

In the recording and reproducing device configured in this way, the function of the decoding device (decoding method) according to the present application is implemented in the decoder 947. Accordingly, a coded stream having improved coding efficiency of an image of a plurality of viewpoints can be decoded.

Eighth Embodiment

<Configuration Example of Imaging Apparatus>

Figure 43:
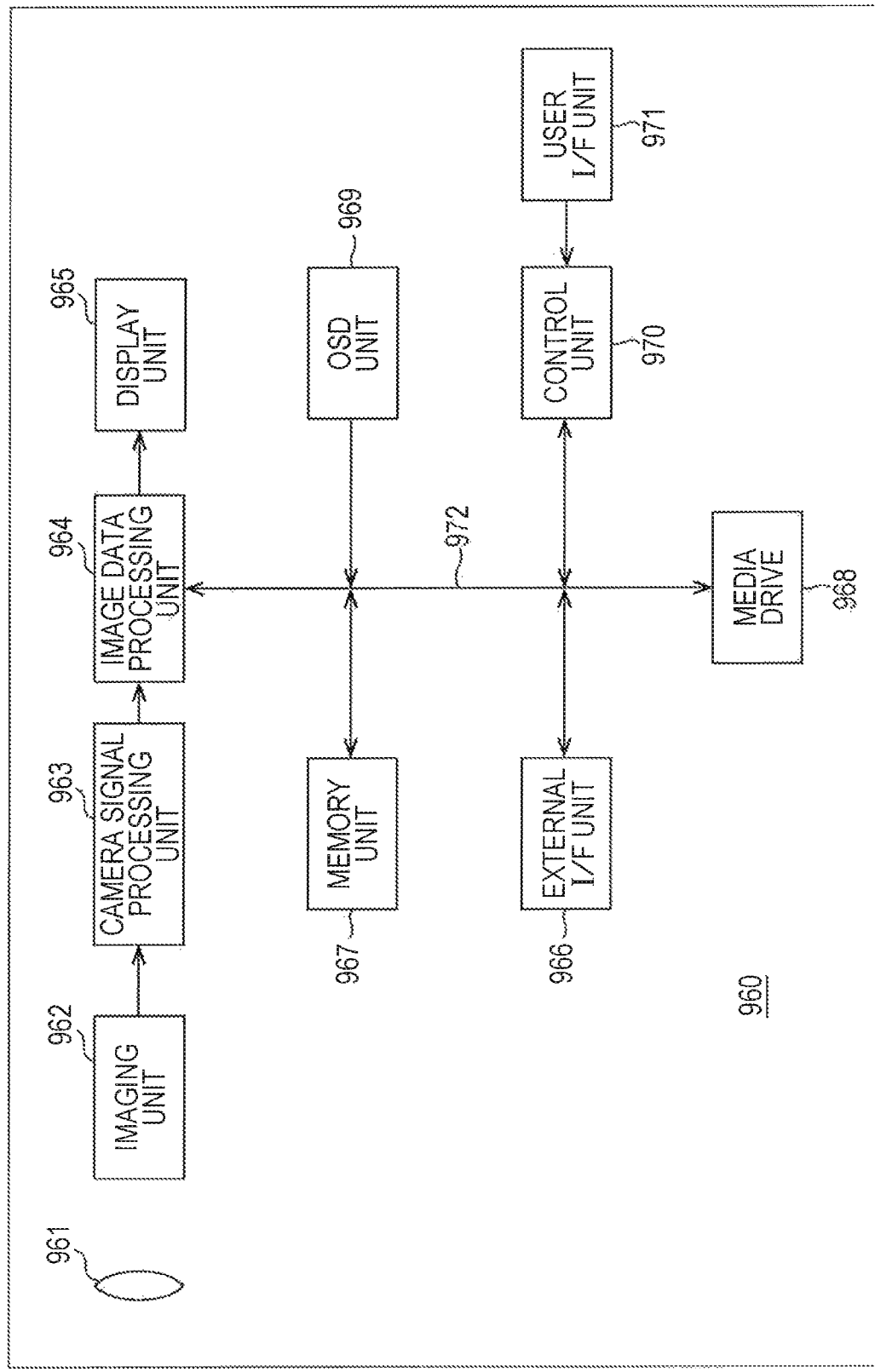
FIG. 43 illustrates an example of the schematic configuration of an imaging apparatus to which the present technology is applied.

FIG. 43 is a diagram that illustrates an example of the schematic configuration of an imaging apparatus to which the present technology is applied. An imaging apparatus 960 images a subject and displays the image of the subject on a display unit or records the image of the subject on a recording medium as image data.

The imaging apparatus 960 includes: an optical block 961; an imaging unit 962; a camera signal processing unit 963; an image data processing unit 964; a display unit 965; an external interface unit 966; a memory unit 967; a media drive 968; an OSD unit 969; and a control unit 970. In addition, a user interface unit 971 is connected to the control unit 970. Furthermore, the image data processing unit 964, the external interface unit 966, the memory unit 967, the media drive 968, the OSD unit 969, the control unit 970, and the like are interconnected through a bus 972.

The optical block 961 is configured by using a focusing lens, a diaphragm mechanism, and the like. The optical block 961 forms the optical image of a subject on the imaging surface of the imaging unit 962. The imaging unit 962 is configured by using a CCD or CMOS image sensor and generates an electrical signal according to the optical image through a photoelectric conversion and supplies the generated electrical signal to the camera signal processing unit 963.

The camera signal processing unit 963 performs various kinds of camera signal processing such as a knee correction, a gamma correction, and a color correction for the electrical signal supplied from the imaging unit 962. The camera signal processing unit 963 supplies image data after the camera signal processing to the image data processing unit 964.

The image data processing unit 964 performs a coding process of the image data supplied from the camera signal processing unit 963. The image data processing unit 964 supplies coded data that is generated by performing the coding process to the external interface unit 966 or the media drive 968. In addition, the image data processing unit 964 performs a decoding process of the coded data supplied from the external interface unit 966 or the media drive 968. The image data processing unit 964 supplies the image data generated by performing the decoding process to the display unit 965. In addition, the image data processing unit 964 performs the process of supplying the image data supplied from the camera signal processing unit 963 to the display unit 965 and supplies display data acquired from the OSD unit 969 to the display unit 965 with being overlapped with the image data.

The OSD unit 969 generates display data such as a menu screen or an icon that is configured by symbols, characters, or graphics and outputs the generated display data to the image data processing unit 964.

The external interface unit 966, for example, is configured by a USB input/output terminal and the like and is connected to the printer in a case where an image is printed. In addition, to the external interface unit 966, a drive is connected as is necessary, a removable medium such as a magnetic disk or an optical disc is appropriately installed, and a computer program read therefrom is installed as is necessary. Furthermore, the external interface unit 966 includes a network interface that is connected to a predetermined network such as a LAN or the Internet. For example, in accordance with an instruction from the user interface unit 971, the control unit 970 can read coded data from the media drive 968 and supply the read coded data from the external interface unit 966 to another device connected through a network. In addition, the control unit 970 can acquire coded data or image data, which is supplied from another device through a network, through the external interface unit 966 and supply the acquired data to the image data processing unit 964.

As the recording media driven by the media drive 968, for example, an arbitrary readable/writable removable medium such as a magnetic disk, a magneto-optical disc, an optical disc, or a semiconductor memory is used. In addition, the type of the recording medium as a removable medium is an arbitrary and thus, may be a tape device, a disk, or a memory card. Furthermore, a non-contact IC (Integrated Circuit) card or the like may be used as the recording medium.

In addition, by integrating the media drive 968 and the recording medium together, for example, the recording medium may be configured by a non-portable recording medium such as a built-in type hard disk drive or an SSD (Solid State Drive).

The control unit 970 is configured by using a CPU. The memory unit 967 stores programs that are executed by the control unit 970, various kinds of data that is necessary for the process performed by the control unit 970, and the like. A program stored in the memory unit 967 is read and executed by the control unit 970 at predetermined timing such as the start-up of the imaging apparatus 960. The control unit 970 executes programs, thereby performing control of each unit such that the imaging apparatus 960 operates in accordance with a user operation.

In the imaging apparatus configured in this way, the functions of the encoding device and the decoding device (an encoding method and a decoding method) according to the present application are implemented in the image data processing unit 964. Accordingly, the coding efficiency of an image of a plurality of viewpoints can be improved. In addition, a coded stream having improved coding efficiency of an image of a plurality of viewpoints can be decoded.

Ninth Embodiment

Other Examples

In the description presented above, while the examples of the devices to which the present technology is applied have been described, the present technology is not limited thereto. Thus, the present technology may be applied as all the configurations mounted to a device configuring such a device, for example, a processor as a system LSI (Large Scale Integration) or the like, a module that uses a plurality of processors or the like, a unit that uses a plurality of modules or the like, or a set or the like (in other words, a part of the configuration of the device) acquired by adding other functions to the unit.

(Configuration Example of Video Set)

Figure 44:
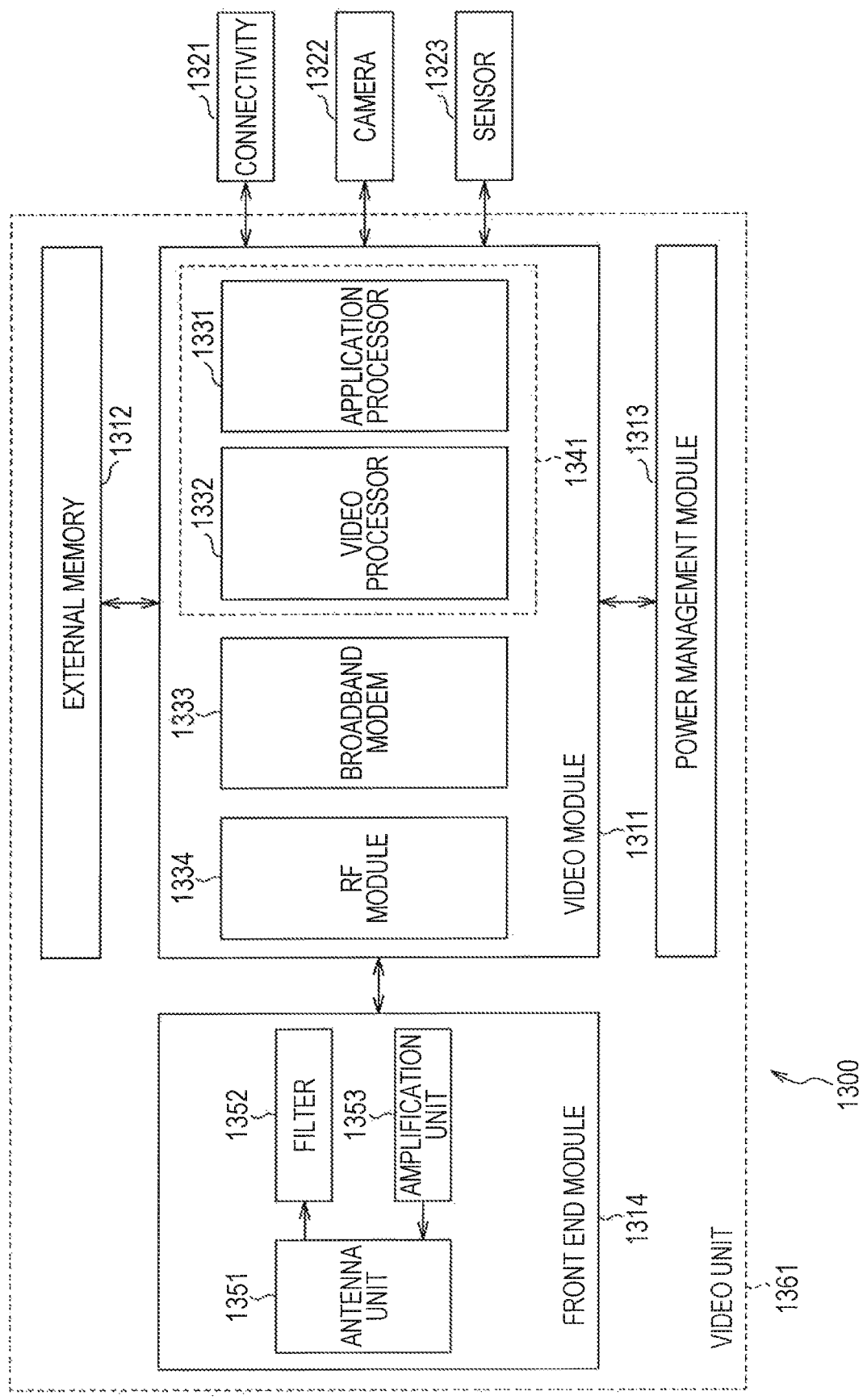
FIG. 44 is a block diagram that illustrates an example of the schematic configuration of a video set to which the present technology is applied.

An example of a case where the present technology is applied as a set will be described with reference to FIG. 44. FIG. 44 illustrates an example of the schematic configuration of a video set to which the present technology is applied.

Recently, the implementation of multiple functions of an electronic device is in progress, and, in the development or the manufacturing thereof, in a case where a part of the configuration is provided for sale, provision, or the like, there are not only a case where the configuration having one function is applied but also a case where one set having a plurality of functions, which is acquired by combining a plurality of configurations having relating function, is applied, which is widely used.

A video set 1300 illustrated in FIG. 44 has such a multi-function configuration and is acquired by combining a device having a function relating to image coding or image decoding (anyone thereof or both thereof) with devices having other functions relating to the function.

As illustrated in FIG. 44, the video set 1300 includes a module group that includes a video module 1311, an external memory 1312, a power management module 1313, a front end module 1314, and the like and devices having related functions of a connectivity 1321, a camera 1322, a sensor 1323, and the like.

A module is formed as a component having a function having unity by arranging several component functions relating to each other together. While a specific physical configuration is arbitrary, for example, a module acquired by arranging a plurality of processors each having a function, an electronic circuit component such as a resistor or a capacitor, and other devices or the like on a wiring board or the like so as to be integrated together may be considered. In addition, it may be considered to form a new module by combining a module with other modules, processors, and the like.

In the example illustrated in FIG. 44, the video module 1311 is acquired by combining configurations having functions relating to image processing and includes: an application processor; a video processor; a broadband modem 1333; and an RF module 1334.

The processor is acquired by integrating a configuration having a predetermined function on a semiconductor chip as SoC (System On a Chip) and, for example, there is also the processor that is called a system LSI (Large Scale Integration) or the like. The configuration having the predetermined function may be a logic circuit (hardware configuration), a configuration including a CPU, a ROM, a RAM, and the like and a program (software configuration) executed using them, or a configuration combining both the configurations described above. For example, it may be configured such that the processor includes logic circuits, a CPU, a ROM, a RAM, and the like, some functions are realized by the logic circuits (hardware configuration), and the other functions are realized by a program (software configuration) executed by the CPU.

An application processor 1331 illustrated in FIG. 44 is a processor that executes an application relating to image processing. In order to realize predetermined functions, the application executed by the application processor 1331 may not only perform a calculation process but also control the configurations of the inside and the outside of the video module 1311 such as a video processor 1332 as is necessary.

The video processor 1332 is a processor that has a function relating to image coding and image decoding (one thereof or both thereof).

The broadband modem 1333 is a processor (or a module) that performs the process relating to wired or wireless (or both thereof) broadband communication performed through a broadband line such as the Internet or a public telephone network. For example, the broadband modem 1333 converts data (digital signal) to be transmitted into an analog signal through digital modulation or the like or demodulates a received analog signal so as to be converted into data (digital signal). For example, the broadband modem 1333 can perform digital modulation/demodulation of arbitrary information such as image data processed by the video processor 1332, a stream in which the image data is coded, an application program, setting data, and the like.

The RF module 1334 is a module that performs frequency conversion, modulation/demodulation, amplification, a filter process, and the like for an RF (Radio Frequency) signal that is transmitted/received through an antenna. For example, the RF module 1334 generates an RF signal by performing frequency conversion and the like for a baseband signal generated by the broadband modem 1333. In addition, for example, the RF module 1334 generates a baseband signal by performing frequency conversion and the like for an RF signal received through the front end module 1314.

In addition, as denoted by a dotted line 1341 in FIG. 44, the application processor 1331 and the video processor 1332 may be integrated so as to be configured as one processor.

The external memory 1312 is a module that is disposed outside the video module 1311 and includes a storage device used by the video module 1311. The storage device of the external memory 1312 may be realized by a certain physical configuration. However, generally, since the storage device is frequently used for storing data having a large capacity such as image data configured in units of frames, the storage device is preferably realized by a semiconductor memory that has a large capacity at relatively low cost such as a DRAM (Dynamic Random Access Memory).

The power management module 1313 manages and controls the supply of power to the video module 1311 (each configuration within the video module 1311).

The front end module 1314 is a module that provides a front end function (a transmission/reception-end circuit on the antenna side) for the RF module 1334. As illustrated in FIG. 44, the front end module 1314, for example, includes an antenna unit 1351, a filter 1352, and an amplification unit 1353.

The antenna unit 1351 includes an antenna that transmits/receives a wireless signal and a peripheral configuration thereof. The antenna unit 1351 transmits a signal supplied from the amplification unit 1353 as a wireless signal and supplies a received wireless signal to the filter 1352 as an electric signal (RF signal). The filter 1352 performs a filter process and the like for the RF signal received through the antenna unit 1351 and supplies the RF signal after the process to the RF module 1334. The amplification unit 1353 amplifies the RF signal supplied from the RF module 1334 and supplies the amplified RF signal to the antenna unit 1351.

The connectivity 1321 is a module that has a function relating to a connection to the outside. The physical configuration of the connectivity 1321 is arbitrary. For example, the connectivity 1321 includes a configuration having a communication function other than the communication specification to which the broadband modem 1333 corresponds, external input/output terminals, and the like.

For example, the connectivity 1321 may be configured to include a module having communication functions that are compliant with radio communication specifications such as Bluetooth (registered trademark), IEEE 802.11 (for example, Wi-Fi (Wireless Fidelity; registered trademark)), NFC (Near Field Communication), and IrDA (InfraRed Data Association) and an antenna that transmits/receives signals that are compliant with the specifications. In addition, for example, the connectivity 1321 may be configured to include a module having communication functions that are compliant with wired communication specifications such as USB (Universal Serial Bus) and HDMI (registered trademark) (High-Definition Multimedia Interface) and terminals that are compliant with the specifications. Furthermore, for example, the connectivity 1321 may be configured to have an additional data (signal) transmission function and the like of analog input/output terminals or the like.

In addition, the connectivity 1321 may be configured to include a device that is the transmission destination of data (signal). For example, the connectivity 1321 may be configured to include a drive (including not only a drive of a removable medium but also a hard disk, an SSD (Solid State Drive), a NAS (Network Attached Storage), and the like) that performs data reading or data writing for a recording medium such as a magnetic disk, an optical disc, a magneto-optical disk, or a semiconductor memory. Furthermore, the connectivity 1321 may be configured to include an output device (a monitor, a speaker, or the like) of an image or an audio.

The camera 1322 is a module that has a function for acquiring image data of a subject by imaging the subject. The image data acquired by an imaging process performed by the camera 1322, for example, is supplied to the video processor 1332 and is coded.

The sensor 1323 is a module that has the function of an arbitrary sensor such as an audio sensor, an ultrasonic sensor, an optical sensor, an illuminance sensor, an infrared sensor, an image sensor, a rotation sensor, an angle sensor, an angular velocity sensor, a speed sensor, an acceleration sensor, a tilt sensor, a magnetic identification sensor, an impact sensor, or a temperature sensor. Data that is detected by the sensor 1323, for example, is supplied to the application processor 1331 and is used by the application and the like.

In the description presented above, each configuration described as a module may be realized by a processor, and each configuration described as a processor may be realized by a module.

As will be described later, the present technology may be applied to the video processor 1332 of the video set 1300 having the configuration as described above. Accordingly, the video set 1300 may be configured as the set to which the present technology is applied.

(Configuration Example of Video Processor)

Figure 45:
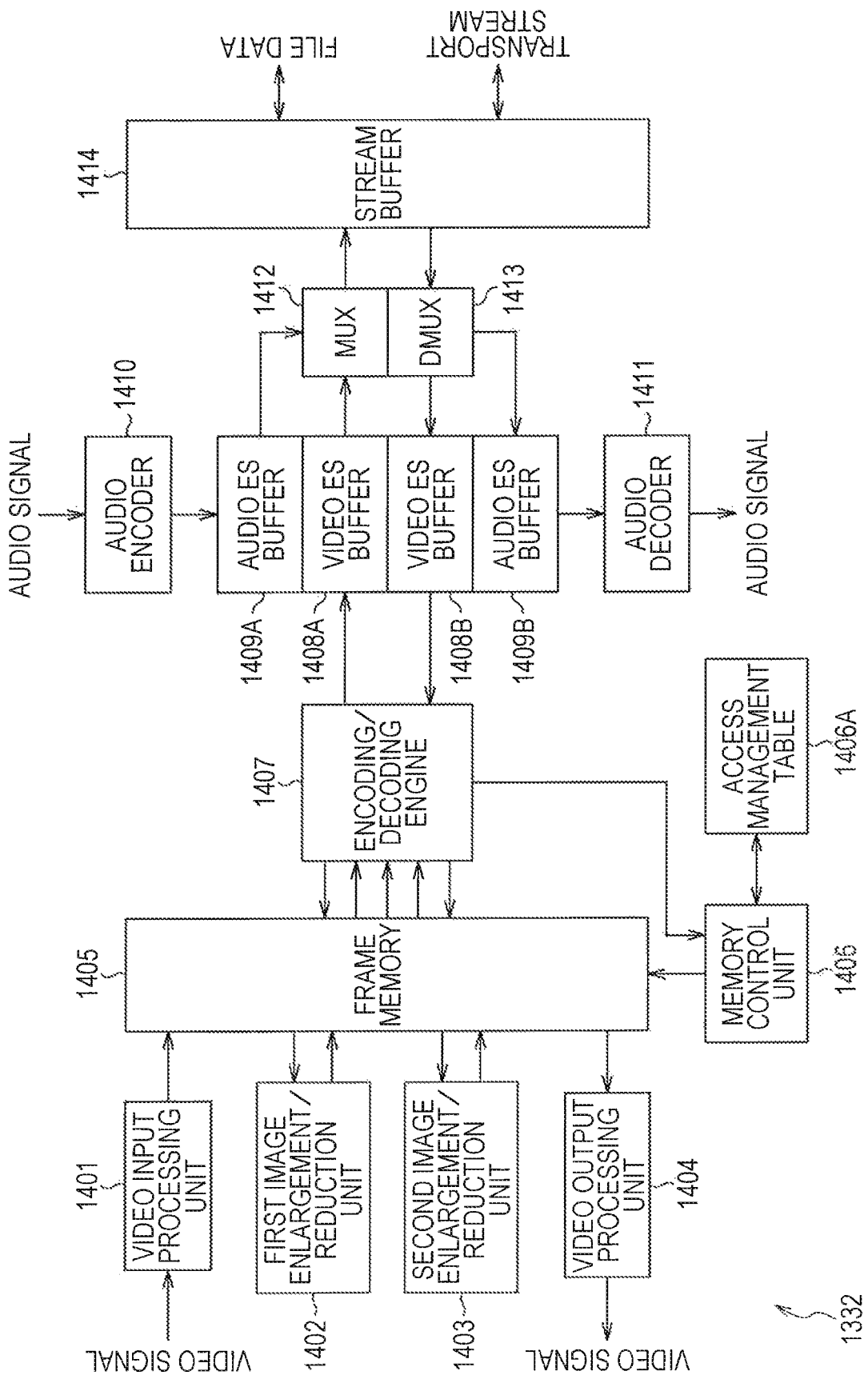
FIG. 45 is a block diagram that illustrates an example of the schematic configuration of a video processor to which the present technology is applied.

FIG. 45 illustrates an example of the schematic configuration of the video processor 1332 (FIG. 44) to which the present technology is applied.

In the example illustrated in FIG. 45, the video processor 1332 has a function for receiving an input of a video signal and an audio signal and coding the received signals in accordance with a predetermined system and a function for decoding coded video data and coded audio data and reproducing and outputting a video signal and an audio signal.

As illustrated in FIG. 45, the video processor 1332 includes: a video input processing unit 1401; a first image enlargement/reduction unit 1402; a second image enlargement/reduction unit 1403; a video output processing unit 1404; a frame memory 1405; and a memory control unit 1406. In addition, the video processor 1332 includes: an encoding/decoding engine 1407; video ES (Elementary Stream) buffers 1408A and 1408B, and audio ES buffers 1409A and 1409B. In addition, the video processor 1332 includes: an audio encoder 1410; an audio decoder 1411; a multiplexer (MUX) 1412; a demultiplexer (DMUX) 1413; and a stream buffer 1414.

The video input processing unit 1401, for example, acquires a video signal input from the connectivity 1321 (FIG. 44) or the like and converts the acquired video signal into digital image data. The first image enlargement/reduction unit 1402 performs format conversion and an image enlargement/reduction process for the image data. The second image enlargement/reduction unit 1403, for the image data, performs an image enlargement/reduction process in accordance with a format of the output destination through the video output processing unit 1404 or performs format conversion, an image enlargement/reduction process, which are similar to those of the first image enlargement/reduction unit 1402, and the like. The video output processing unit 1404 performs format conversion, conversion into an analog signal, and the like for the image data and outputs a resultant signal, for example, to the connectivity 1321 (FIG. 44) or the like as a reproduced video signal.

The frame memory 1405 is a memory for image data that is shared by the video input processing unit 1401, the first image enlargement/reduction unit 1402, the second image enlargement/reduction unit 1403, the video output processing unit 1404, and the encoding/decoding engine 1407. The frame memory 1405 is realized as a semiconductor memory such as a DRAM.

The memory control unit 1406 receives a synchronization signal supplied from the encoding/decoding engine 1407 and controls an access to the frame memory 1405 for writing/reading in accordance with an access schedule for the frame memory 1405 that is written into an access management table 1406A. The access management table 1406A is updated by the memory control unit 1406 in accordance with the process that is performed by the encoding/decoding engine 1407, the first image enlargement/reduction unit 1402, the second image enlargement/reduction unit 1403, and the like.

The encoding/decoding engine 1407 performs an encoding process of image data and performs a decoding process of a video stream that is acquired by coding the image data. For example, the encoding/decoding engine 1407 codes the image data read from the frame memory 1405 and sequentially writes the read image data into the video ES buffer 1408A as a video stream. In addition, for example, the encoding/decoding engine 1407 sequentially reads the video stream from the video ES buffer 1408B, decodes the read video stream, and sequentially writes the decoded video stream into the frame memory 1405 as image data. The encoding/decoding engine 1407 uses the frame memory 1405 as a work area in such coding or decoding processes. In addition, the encoding/decoding engine 1407, for example, at the timing of starting the process of each macroblock, outputs a synchronization signal to the memory control unit 1406.

The video ES buffer 1408A buffers the video stream generated by the encoding/decoding engine 1407 and supplies the video stream to the multiplexer (MUX) 1412. The video ES buffer 1408B buffers the video stream supplied from the demultiplexer (DMUX) 1413 and supplies the video stream to the encoding/decoding engine 1407.

The audio ES buffer 1409A buffers the audio stream generated by the audio encoder 1410 and supplies the audio stream to the multiplexer (MUX) 1412. The audio ES buffer 1409B buffers the audio stream supplied from the demultiplexer (DMUX) 1413 and supplies the audio stream to the audio decoder 1411.

The audio encoder 1410 converts an audio signal, for example, input from the connectivity 1321 (FIG. 44) or the like, for example, into a digital signal and codes the converted audio signal in accordance with a predetermined system such as an MPEG audio system or an AC3 (Audio-Code number 3) system. The audio encoder 1410 sequentially writes audio streams that are data acquired by coding the audio signals into the audio ES buffer 1409A. The audio decoder 1411 decodes the audio stream supplied from the audio ES buffer 1409B, performs conversion of the decoded audio stream, for example, into an analog signal and the like, and supplies the converted signal, for example, to the connectivity 1321 (FIG. 44) and the like as a reproduced audio signal.

The multiplexer (MUX) 1412 multiplexes the video stream and the audio stream. The multiplexing method (in other words, the format of a bitstream generated by the multiplexing) is arbitrary. In addition, at the time of multiplexing, the multiplexer (MUX) 1412 may add predetermined header information or the like to the bit stream. In other words, the multiplexer (MUX) 1412 can convert the format of the stream through the multiplexing process. For example, by multiplexing the video stream and the audio stream, the multiplexer (MUX) 1412 converts the video stream and the audio stream into a transport stream that is a bitstream having a format for transmission. In addition, for example, by multiplexing the video stream and the audio stream, the multiplexer (MUX) 1412 converts the video stream and the audio stream into data (file data) having a format for recording.

The demultiplexer (DMUX) 1413 demultiplexes the bit stream in which the video stream and the audio stream are multiplexed using a method corresponding to the multiplexing process performed by the multiplexer (MUX) 1412. In other words, the demultiplexer (DMUX) 1413 extracts a video stream and an audio stream from the bitstream read from the stream buffer 1414 (the video stream and the audio stream are separated). In other words, the demultiplexer (DMUX) 1413 can convert (inverse conversion of the conversion performed by the multiplexer (MUX) 1412) the format of the stream through the demultiplexing process. For example, the demultiplexer (DMUX) 1413 acquires the transport stream, for example, supplied from the connectivity 1321 (FIG. 44), the broadband modem 1333, or the like (FIG. 44) through the stream buffer 1414 and demultiplexes the acquired transport stream, thereby converting the transport stream into a video stream and an audio stream. In addition, for example, the demultiplexer (DMUX) 1413 acquires file data read from various recording media, for example, by the connectivity 1321 (FIG. 44) through the stream buffer 1414 and demultiplexes the acquired file data, thereby converting the file data into a video stream and an audio stream.

The stream buffer 1414 buffers the bitstream. For example, the stream buffer 1414 buffers the transport stream supplied from the multiplexer (MUX) 1412 and supplies the transport stream, for example, to the connectivity 1321 (FIG. 44), the broadband modem 1333 (FIG. 44), and the like at predetermined timing or based on a request transmitted from the outside.

In addition, for example, the stream buffer 1414 buffers the file data supplied from the multiplexer (MUX) 1412 and supplies the file data, for example, to the connectivity 1321 (FIG. 44) and the like at predetermined timing or based on a request transmitted from the outside so as to be recorded in any one of various recording media.

Furthermore, the stream buffer 1414 buffers the transport stream acquired, for example, through the connectivity 1321 (FIG. 44), the broadband modem 1333 (FIG. 44), or the like and supplies the transport stream to the demultiplexer (DMUX) 1413 at predetermined timing or based on a request from the outside, and the like.

In addition, the stream buffer 1414 buffers the file data read from various recording media, for example, by the connectivity 1321 (FIG. 44) or the like and supplies the file data to the demultiplexer (DMUX) 1413 at predetermined timing or based on a request from the outside or the like.

Next, an example of the operation of the video processor 1332 having such a configuration will be described. For example, a video signal input to the video processor 1332 from the connectivity 1321 (FIG. 44) or the like is converted into digital image data according to a predetermined system such as the 4:2:2Y/Cb/Cr system by the video input processing unit 1401 and is sequentially written into the frame memory 1405. This digital image data is read by the first image enlargement/reduction unit 1402 or the second image enlargement/reduction unit 1403, and a format conversion into a predetermined system such as the 4:2:0Y/Cb/Cr system or the like and the enlargement/reduction process is performed for the digital image data, and the processed digital image data is written again into the frame memory 1405. This image data is coded by the encoding/decoding engine 1407 and is written into the video ES buffer 1408A as a video stream.

In addition, the audio signal input from the connectivity 1321 (FIG. 44) or the like to the video processor 1332 is coded by the audio encoder 1410 and is written into the audio ES buffer 1409A as an audio stream.

The video stream stored in the video ES buffer 1408A and the audio stream stored in the audio ES buffer 1409A are read by the multiplexer (MUX) 1412, are multiplexed, and are converted into a transport stream, file data, or the like. The transport stream generated by the multiplexer (MUX) 1412 is buffered into the stream buffer 1414 and then is output to the external network, for example, through the connectivity 1321 (FIG. 44), the broadband modem 1333 (FIG. 44), or the like. In addition, the file data generated by the multiplexer (MUX) 1412 is buffered into the stream buffer 1414, then is output, for example, to the connectivity 1321 (FIG. 44) or the like, and is recorded in any one of various recording media.

In addition, the transport stream that is input from the external network to the video processor 1332, for example, through the connectivity 1321 (FIG. 44), the broadband modem 1333 (FIG. 44), or the like is buffered into the stream buffer 1414 and then is demultiplexed by the demultiplexer (DMUX) 1413. In addition, the file data that is read from any one of the various recording media, for example, by the connectivity 1321 (FIG. 44) or the like and is input to the video processor 1332 is buffered into the stream buffer 1414 and then is demultiplexed by the demultiplexer (DMUX) 1413. In other words, the transport stream or the file data input to the video processor 1332 is separated into a video stream and an audio stream by the demultiplexer (DMUX) 1413.

The audio stream is supplied to the audio decoder 1411 through the audio ES buffer 1409B and is decoded, and the audio signal is reproduced. In addition, the video stream is written into the video ES buffer 1408B, then is sequentially read by the encoding/decoding engine 1407, is decoded, and is written into the frame memory 1405. The decoded image data is processed to be enlarged or reduced by the second image enlargement/reduction unit 1403 and is written into the frame memory 1405. Then, the decoded image data is read by the video output processing unit 1404, has the format converted into a predetermined system such as the 4:2:2Y/Cb/Cr system, and is further converted into an analog signal, and the video signal is reproduced and output.

In a case where the present technology is applied to the video processor 1332 configured as such, the present technology according to each embodiment described above may be applied to the encoding/decoding engine 1407. In other words, for example, the encoding/decoding engine 1407 may be configured to have the functions of the encoding device and the decoding device according to any one of the first to third embodiments. By configuring as such, the video processor 1332 can acquire the same advantages as the advantages described above with reference to FIGS. 1 to 38.

In addition, in the encoding/decoding engine 1407, the present technology (in other words, the functions of the image encoding device and the image decoding device according to each embodiment described above) may be realized by hardware such as logic circuits, may be realized by software such as a built-in program, or may be realized by both the hardware and the software.

(Another Configuration Example of Video Processor)

Figure 46:
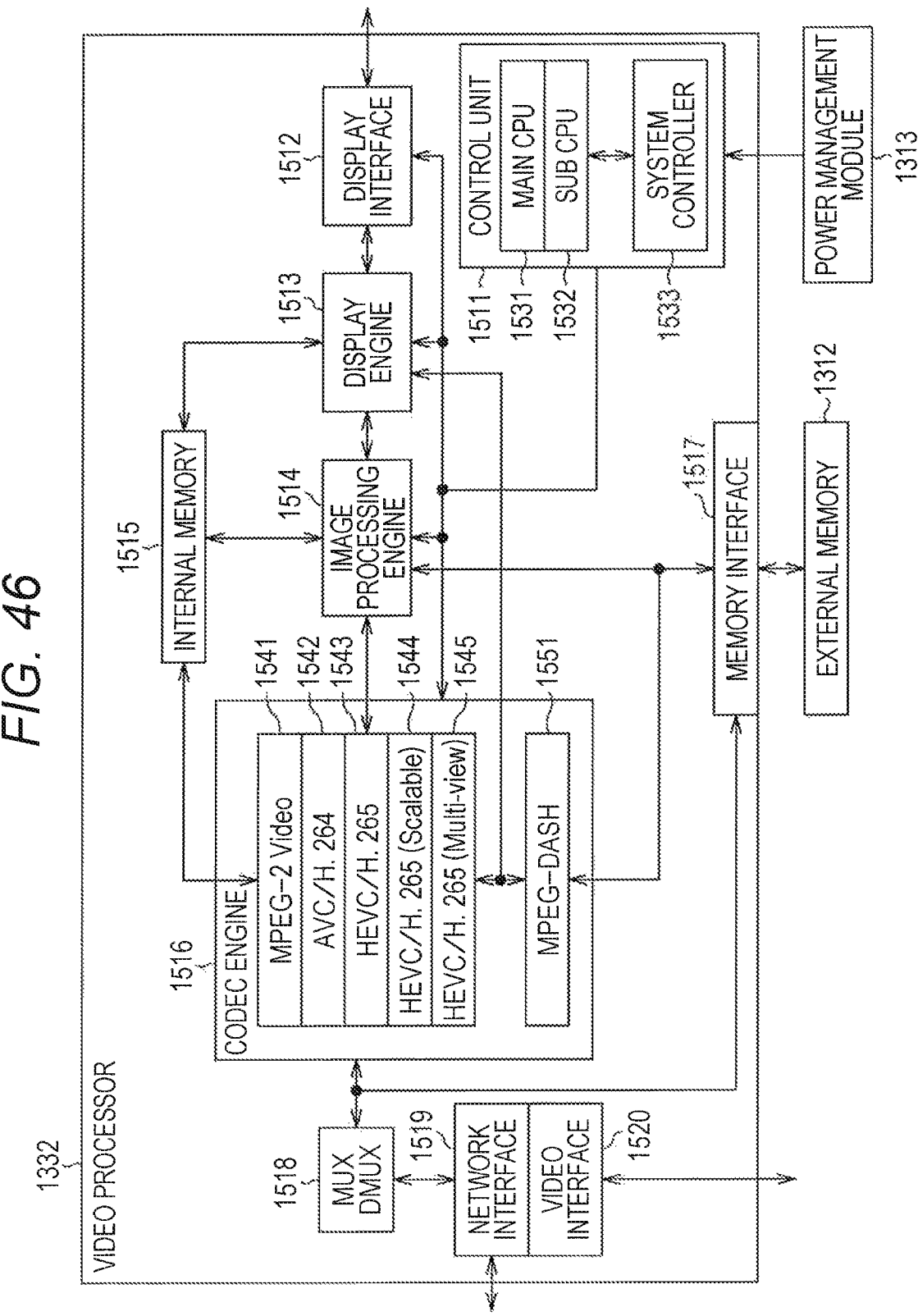
FIG. 46 is a block diagram that illustrates another example of the schematic configuration of the video processor to which the present technology is applied.

FIG. 46 is a diagram that illustrates another example of the schematic configuration of the video processor 1332 (FIG. 44) to which the present technology is applied. In the case of the example illustrated in FIG. 46, the video processor 1332 has a function for coding/decoding the video data in accordance with a predetermined system.

More specifically, as illustrated in FIG. 46, the video processor 1332 includes: a control unit 1511; a display interface 1512; a display engine 1513; an image processing engine 1514; and an internal memory 1515. In addition, the video processor 1332 includes: a codec engine 1516; a memory interface 1517; a multiplexer/demultiplexer (MUXDMUX) 1518; a network interface 1519; and a video interface 1520.

The control unit 1511 controls the operations of processing units arranged within the video processor 1332 such as the display interface 1512, the display engine 1513, the image processing engine 1514, and the codec engine 1516.

As illustrated in FIG. 46, the control unit 1511, for example, includes a main CPU 1531, a sub CPU 1532, and a system controller 1533. The main CPU 1531 executes a program that is used for controlling the operation of each processing unit disposed within the video processor 1332. The main CPU 1531 generates a control signal in accordance with the program or the like and supplies the control signal to each processing unit (in other words, controls the operation of each processing unit). The sub CPU 1532 achieves an auxiliary role for the main CPU 1531. For example, the sub CPU 1532 executes a child process, a sub routine, and the like of the program or the like executed by the main CPU 1531. The system controller 1533 controls the operations of the main CPU 1531 and the sub CPU 1532 such as designation of programs to be executed by the main CPU 1531 and the sub CPU 1532.

The display interface 1512 outputs the image data, for example, to the connectivity 1321 (FIG. 44) or the like under the control of the control unit 1511. For example, the display interface 1512 converts the image data that is digital data into an analog signal and outputs the image data to the monitoring device or the like of the connectivity 1321 (FIG. 44) as a reproduced video signal or the image data that is the digital data.

The display engine 1513, under the control of the control unit 1511, performs various conversion processes such as a format conversion, a size conversion, and a color gamut conversion for the image data so as to be adjusted to the hardware specifications of the monitoring device displaying the image or the like.

The image processing engine 1514, under the control of the control unit 1511, performs predetermined image processing such as a filter process for improving the image quality or the like for the image data.

The internal memory 1515 is a memory disposed inside the video processor 1332 that is shared by the display engine 1513, the image processing engine 1514, and the codec engine 1516. The internal memory 1515, for example, is used for data interchange performed among the display engine 1513, the image processing engine 1514, and the codec engine 1516. For example, the internal memory 1515 stores data supplied from the display engine 1513, the image processing engine 1514, or the codec engine 1516 and supplies the data to the display engine 1513, the image processing engine 1514, or the codec engine 1516 as is necessary (for example, in accordance with a request). While this internal memory 1515 may be realized by any storage device, generally, the internal memory 1515 is frequently used for storing data having a small capacity such as image data configured in units of blocks or parameters, and accordingly, it is preferably realized by a semiconductor memory having a relatively small capacity (for example, compared to the external memory 1312) and a high response speed such as a SRAM (Static Random Access Memory).

The codec engine 1516 performs the process relating to coding or decoding image data. The coding/decoding system to which the codec engine 1516 corresponds is arbitrary, and the number thereof may be one or two or more. For example, the codec engine 1516 may include a codec function of a plurality of coding/decoding systems and perform the coding of image data or the decoding of coded data by using selected one of the plurality of coding/decoding systems.

In the example illustrated in FIG. 46, the codec engine 1516, for example, includes MPEG-2 Video 1541, AVC/H.264 1542, HEVC/H.265 1543, HEVC/H.265 (Scalable) 1544, HEVC/H.265 (Multi-view) 1545, and MPEG-DASH 1551 as functional blocks of the process relating to the codec.

The MPEG-2 Video 1541 is a functional block used for coding or decoding image data in accordance with the MPEG-2 system. The AVC/H.264 1542 is a functional block used for coding or decoding image data in accordance with the AVC system. In addition, the HEVC/H.265 1543 is a functional block used for coding or decoding image data in accordance with the HEVC system. The HEVC/H.265 (Scalable) 1544 is a functional block used for scalable coding or scalable decoding image data in accordance with the HEVC system. The HEVC/H.265 (Multi-view) 1545 is a functional block used for multiple viewpoint coding or multiple viewpoint decoding image data in accordance with the HEVC system.

The MPEG-DASH 1551 is a functional block used for transmitting/receiving image data in accordance with an MPEG-DASH (MPEG-Dynamic Adaptive Streaming over HTTP) system. The MPEG-DASH is a technology for streaming a video by using an HTTP (HyperText Transfer Protocol) and has a feature that one is selected from among a plurality of pieces of coded data having mutually-different resolutions and the like, which are prepared in advance, in units of segments and is transmitted. The MPEG-DASH 1551 performs generation of a stream, transmission control of the stream, and the like that are compliant with the specification, and, for coding/decoding image data, uses MPEG-2 Video 1541 or HEVC/H.265 (Multi-view) 1545 described above.

The memory interface 1517 is an interface used for the external memory 1312. Data supplied from the image processing engine 1514 or the codec engine 1516 is supplied to the external memory 1312 through the memory interface 1517. In addition, the data read from the external memory 1312 is supplied to the video processor 1332 (the image processing engine 1514 or the codec engine 1516) through the memory interface 1517.

The multiplexer/demultiplexer (MUX DMUX) 1518 multiplexes or demultiplexes various kinds of data relating to an image such as a bitstream of coded data, image data, or a video signal. The multiplexing/demultiplexing method is arbitrary. For example, at the time of the multiplexing process, the multiplexer/demultiplexer (MUX DMUX) 1518 may not only arrange a plurality of pieces of data into one but also add predetermined header information or the like to the data. In addition, at the time of the demultiplexing process, the multiplexer/demultiplexer (MUX DMUX) 1518 may not only divide one piece of data into a plurality of parts but add predetermined header information or the like to the divided data. In other words, the multiplexer/demultiplexer (MUX DMUX) 1518 can convert the format of data through a multiplexing/demultiplexing process. For example, the multiplexer/demultiplexer (MUX DMUX) 1518 can convert the bitstream into a transport stream that is a bitstream in the format for transmission or data (file data) that is in the file format for recording by multiplexing the bitstream. It is apparent that the inverse conversion can be performed through a demultiplexing process.

The network interface 1519 is a dedicated interface such as the broadband modem 1333 (FIG. 44) or the connectivity 1321 (FIG. 44). The video interface 1520 is a dedicated interface such as the connectivity 1321 (FIG. 44) or the camera 1322 (FIG. 44).

Next, an example of the operation of such a video processor 1332 will be described. For example, when a transport stream is received from the external network, for example, through the connectivity 1321 (FIG. 44), the broadband modem 1333 (FIG. 44), or the like, the transport stream is supplied to the multiplexer/demultiplexer (MUX DMUX) 1518 through the network interface 1519, is demultiplexed, and is decoded by the codec engine 1516. For the image data acquired by the decoding process performed by the codec engine 1516, for example, predetermined image processing is performed by the image processing engine 1514, and predetermined conversion is performed by the display engine 1513, the resultant image data is supplied, for example, to the connectivity 1321 (FIG. 44) or the like through the display interface 1512, and the image is displayed on the monitor. In addition, for example, the image data acquired by the decoding process performed by the codec engine 1516 is re-coded by the codec engine 1516, is multiplexed by the multiplexer/demultiplexer (MUX DMUX) 1518, is converted into file data, is output, for example, to the connectivity 1321 (FIG. 44) or the like through the video interface 1520, and is recorded on anyone of the various recording media.

In addition, for example, file data of coded data that is acquired by coding the image data read from a recording medium not illustrated in the figure by the connectivity 1321 (FIG. 44) or the like is supplied to the multiplexer/demultiplexer (MUX DMUX) 1518 through the video interface 1520, is demultiplexed, and is decoded by the codec engine 1516. For the image data acquired by the decoding process performed by the codec engine 1516, predetermined image processing is performed by the image processing engine 1514, and a predetermined conversion is performed by the display engine 1513, and the resultant image data is supplied, for example, to the connectivity 1321 (FIG. 44) or the like through the display interface 1512, and the image is displayed on the monitor. Furthermore, for example, the image data acquired by the decoding process performed by the codec engine 1516 is re-coded by the codec engine 1516, is multiplexed by the multiplexer/demultiplexer (MUX DMUX) 1518, is converted into a transport stream, is supplied, for example, to the connectivity 1321 (FIG. 44), the broadband modem 1333 (FIG. 44), or the like through the network interface 1519, and is transmitted to another device not illustrated in the figure.

In addition, the interchange of image data or other data between processing units disposed within the video processor 1332, for example, is performed using the internal memory 1515 or the external memory 1312. In addition, the power management module 1313, for example, controls the supply of power to the control unit 1511.

In a case where the present technology is applied to the video processor 1332 configured as such, the present technology according to each embodiment described above may be applied to the codec engine 1516. In other words, for example, the codec engine 1516 may include a functional block that realizes the encoding device and the decoding device according to any one of the first to third embodiments. In addition, for example, by configuring the codec engine 1516 as such, the video processor 1332 can acquire the same advantages as the advantages described above with reference to FIGS. 1 to 38.

In addition, in the codec engine 1516, the present technology (in other words, the functions of the image encoding device and the image decoding device according to each embodiment described above) may be realized by hardware such as logic circuits, may be realized by software such as a built-in program, or may be realized by both the hardware and the software.

As above, while two configurations of the video processor 1332 have been described as examples, the configuration of the video processor 1332 is arbitrary and may be a configuration other than the two configurations described above. In addition, this video processor 1332 may be configured by either one semiconductor chip or a plurality of semiconductor chips. For example, the video processor 1332 may be configured by a three-dimensional laminated LSI in which a plurality of semiconductors are laminated. In addition, the video processor 1332 may be realized by a plurality of LSI's.

(Example of Application to Device)

The video set 1300 may be built in various devices that process image data. For example, the video set 1300 may be built in the television apparatus 900 (FIG. 40), the mobile phone 920 (FIG. 41), the recording and reproducing device 940 (FIG. 42), the imaging apparatus 960 (FIG. 43), and the like. By building the video set 1300 therein, the devices can acquire advantages that are the same as the advantages described above with reference to FIGS. 1 to 38.

In addition, some of the configurations of the video set 1300 described above may be configurations to which the present technology is applied in a case where the video processor 1332 is included therein. For example, only the video processor 1332 may be configured as a video processor to which the present technology is applied. In addition, for example, as described above, the processor, the video module 1311, and the like denoted by the dotted line 1341 may be configured as a processor, a module, and the like to which the present technology is applied. Furthermore, for example, the video module 1311, the external memory 1312, the power management module 1313, and the front end module 1314 may be combined so as to be configured as a video unit 1361 to which the present technology is applied. In any of the configurations, the same advantages as those described above with reference to FIGS. 1 to 38 can be acquired.

In other words, any configuration that includes the video processor 1332, similar to the case of the video set 1300, may be built in various devices that process image data. By building any configuration to which the present technology is applied therein, similar to the case of the video set 1300, the devices can acquire the same advantages as those described above with reference to FIGS. 1 to 38.

Embodiments of the present technology are not limited to the embodiments described above, but various changes can be made in the range not departing from the concept of the present technology therein.

For example, the present technology may take a configuration of cloud computing in which one function is divided and processed cooperatively by a plurality of devices through a network.

In addition, each step described in each flowchart described above may be either executed by one device or executed by a plurality of devices in a shared manner.

Furthermore, in a case where a plurality of processes are included in one step, the plurality of processes included in the one step may be either executed by one device or executed by a plurality of devices in a shared manner.

In addition, the present technology may employ a configuration described as below.

(1)

An encoding device including:

a setting unit that sets first image specifying information specifying a first image of a viewpoint present in a first direction from a viewpoint of a current coding image and second image specifying information specifying a second image of a viewpoint present in a second direction opposite to the first direction in a first reference list in first order and sets the first image specifying information and the second image specifying information in a second reference list in second order that is different from the first order; and an encoding unit that generates coded data by coding the current coding image based on the first reference list and the second reference list set by the setting unit.

(2)

The encoding device according to (1), wherein the setting unit sets the first image specifying information and the second image specifying information in the first reference list in order of the first image specifying information and the second image specifying information and sets the first image specifying information and the second image specifying information in the second reference list in order of the second image specifying information and the first image specifying information.

(3)

The encoding device according to (1) or (2), further including:

a transmission unit that transmits identification information identifying viewpoints, which is assigned to the viewpoints of the first image, the second image, and the current coding image such that values are sequentially increased from the viewpoint present most in the first direction, and the coded data generated by the encoding unit, wherein the setting unit sets an image of a viewpoint to which the identification information having a value smaller than the identification information of the current coding image is assigned as the first image and sets an image of a viewpoint to which the identification information having a value larger than the identification information of the current coding image is assigned as the second image based on the identification information.

(4)

The encoding device according to (3), wherein the setting unit sets the first reference list and the second reference list based on order reliability information identifying that the viewpoint identification information is assigned to the viewpoints of the first image, the second image, and the current coding image such that values are sequentially increased from the viewpoint present most in the first direction.

(5)

The encoding device according to (3) or (4), wherein the setting unit sets the first image specifying information in the first reference list and the second reference list in order of largest to smallest value of the identification information and sets the second image specifying information in the first reference list and the second reference list in order of smallest to largest value of the identification information.

(6)

An encoding method using an encoding device, the encoding method including:

a setting step of setting first image specifying information specifying a first image of a viewpoint present in a first direction from a viewpoint of a current coding image and second image specifying information specifying a second image of a viewpoint present in a second direction opposite to the first direction in a first reference list in first order and setting the first image specifying information and the second image specifying information in a second reference list in second order that is different from the first order; and a coding step of generating coded data by coding the current coding image based on the first reference list and the second reference list set in the setting step of the first image specifying information and the second image specifying information.

(7)

A decoding device including:

a setting unit that sets first image specifying information specifying a first image of a viewpoint present in a first direction from a viewpoint of a current decoding image and second image specifying information specifying a second image of a viewpoint present in a second direction opposite to the first direction in a first reference list in first order and sets the first image specifying information and the second image specifying information in a second reference list in second order that is different from the first order; and a decoding unit that decodes coded data of the current decoding image based on the first reference list and the second reference list set by the setting unit.

(8)

The decoding device according to (7), wherein the setting unit sets the first image specifying information and the second image specifying information in the first reference list in order of the first image specifying information and the second image specifying information and sets the first image specifying information and the second image specifying information in the second reference list in order of the second image specifying information and the first image specifying information.

(9)

The decoding device according to (7) or (8), wherein the setting unit, based on identification information identifying viewpoints, which is assigned to the viewpoints of the first image, the second image, and the current decoding image such that values are sequentially increased from the viewpoint present most in the first direction, sets an image of a viewpoint to which the identification information having a value smaller than the identification information of the current decoding image is assigned as the first image and sets an image of a viewpoint to which the identification information having a value larger than the identification information of the current decoding image is assigned as the second image.

(10)

The decoding device according to (9), wherein the setting unit sets the first reference list and the second reference list based on order reliability information identifying that the viewpoint identification information is assigned to the viewpoints of the first image, the second image, and the current decoding image such that values are sequentially increased from the viewpoint present most in the first direction.

(11)

The decoding device according to (9) or (10), wherein the setting unit sets the first image specifying information in the first reference list and the second reference list in order of largest to smallest value of the identification information and sets the second image specifying information in the first reference list and the second reference list in order of smallest to largest value of the identification information.

(12)

A decoding method using a decoding device, the decoding method including:

a setting step of setting first image specifying information specifying a first image of a viewpoint present in a first direction from a viewpoint of a current decoding image and second image specifying information specifying a second image of a viewpoint present in a second direction opposite to the first direction in a first reference list in first order and setting the first image specifying information and the second image specifying information in a second reference list in second order that is different from the first order; and a decoding step of decoding coded data of the current decoding image based on the first reference list and the second reference list set in the setting step of the first image specifying information and the second image specifying information.

REFERENCE SIGNS LIST

50 Encoding device
51 Setting unit
52 Encoding unit
200 Decoding device
201 Extraction unit
202 Decoding unit
400 Encoding device 401 Setting unit
402 Encoding unit
500 Decoding device
501 Decoding unit
600 Encoding device
601 Setting unit
602 Encoding unit
700 Decoding device
701 Decoding unit

The invention claimed is:

1. An apparatus comprising:
an encoding device configured to encode a coding image; and
circuitry configured to:
assign, via the encoding device, viewpoint identification information for identifying viewpoints to viewpoints of a first image, a second image, and a current coding image such that values of the viewpoint identification information are sequentially increased from a viewpoint present most in a first direction;
set, via the encoding device, an image of a viewpoint having a smaller viewpoint identification information than the viewpoint identification information of the current coding image as the first image;
set, via the encoding device, an image of a viewpoint having a larger viewpoint identification information than the viewpoint identification information of the current coding image as the second image;
register, via the encoding device, image specifying information sequentially in a first reference list, in order of:
first image specifying information specifying the first image present in the first direction from the viewpoint of the current coding image; and then
second image specifying information, specifying the second image present in a second direction opposite to the first direction, in an order after the first image specifying information is registered in the first reference list;
register, via the encoding device, the image specifying information sequentially in a second reference list, in order of:
the second image specifying information; and then
the first image specifying information in an order after the second image specifying information is registered in the second reference list such that the registration order of first image specifying information and the second image specifying information in the first reference list is different than the registration order of the first image specifying information and the second image specifying information in the second reference list; and
encode, via the encoding device, the current coding image using the first reference list and the second reference list to generate coded data.

2. The apparatus according to claim 1, wherein the circuitry is further configured to:
set, via the encoding device, the first reference list and the second reference list based on an order of reliability information identifying that the viewpoint identification information is assigned to the viewpoints of the first image, the second image, and the current coding image such that values of the viewpoint identification information are sequentially increased from the viewpoint present most in the first direction.

3. The apparatus according to claim 1, wherein the first image specifying information is registered in the first reference list in an order of largest to smallest value of the viewpoint identification information of the viewpoints of the first image, and
wherein the second image specifying information is registered in the first reference list in an order of smallest to largest value of the viewpoint identification information of the viewpoints of the second image.

4. An encoding method, the method being executed via at least one processor having circuitry, and comprising:
assigning viewpoint identification information for identifying viewpoints to viewpoints of a first image, a second image, and a current coding image such that values of the viewpoint identification information are sequentially increased from a viewpoint present most in a first direction;
setting an image of a viewpoint having a smaller viewpoint identification information than the viewpoint identification information of the current coding image as the first image;
setting an image of a viewpoint having a larger viewpoint identification information than the viewpoint identification information of the current coding image as the second image;
registering, image specifying information sequentially in a first reference list, in order of:
first image specifying information specifying the first image present in the first direction from the viewpoint of the current coding image; and then
second image specifying information, specifying the second image present in a second direction opposite to the first direction, in an order after the first image specifying information is registered in the first reference list;
registering, the image specifying information sequentially in a second reference list, in order of:
the first image specifying information; and then
the second image specifying information in an order after the second image specifying information is registered in the second reference list such that the registration order of first image specifying information and the second image specifying information in the first reference list is different than the registration order of the first image specifying information and the second image specifying information in the second reference list; and
encoding the current coding image using the first reference list and the second reference list to generate coded data including identification information identifying viewpoints, which is assigned to the viewpoints of the first image, the second image, and the current coding image in an order of sequentially increasing values as from the viewpoint present most in the first direction.

5. The apparatus according to claim 1, wherein values of the viewpoint identification information are sequentially increased from the viewpoint present most in the first direction.

6. The encoding method according to claim 4, wherein the first image specifying information is registered in the first reference list in an order of largest to smallest value of the viewpoint identification information of the viewpoints of the first image, and
wherein the second image specifying information is registered in the first reference list in an order of smallest to largest value of the viewpoint identification information of the viewpoints of the second image.

7. The apparatus according to claim 1, wherein the circuitry is further configured to:

transmit, via the encoding device, the viewpoint identification information and the coded data.

8. The apparatus according to claim 1, wherein the circuitry is further configured to:
register, via the encoding device, in the first reference list, the first image specifying information having the viewpoint identification information smaller than the viewpoint identification information of the current coding image in an order of highest degree of closeness of respective viewpoint identification information to the viewpoint identification information of the current coding image; and
register, via the encoding device, in the first reference list, the second image specifying information having the viewpoint identification information larger than the viewpoint identification information of the current coding image in an order of highest degree of closeness of respective viewpoint identification information to the viewpoint identification information of the current coding image,
wherein the second image specifying information is registered in the first reference list in an order after the first image specifying information is registered in the first reference list, and
wherein the first image specifying information is registered in the second reference list in an order after the second image specifying information is registered in the second reference list.

9. The apparatus according to claim 1, wherein the circuitry is further configured to:
assign, via the encoding device, the viewpoint identification information starting at a viewpoint disposed at an end from among a plurality of viewpoints aligned in parallel in a one-dimensional arrangement.

* * * * *